United States Patent
Henderson et al.

(10) Patent No.: US 7,309,943 B2
(45) Date of Patent: *Dec. 18, 2007

(54) MECHANISM COMPRISED OF ULTRASONIC LEAD SCREW MOTOR

(75) Inventors: David Henderson, Farmington, NY (US); James Guelzow, Victor, NY (US); Conrad Hoffman, Canandaigua, NY (US); Robert Culhane, Manchester, NY (US)

(73) Assignee: New Scale Technologies, Inc., Victor, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/262,137

(22) Filed: Oct. 28, 2005

(65) Prior Publication Data

US 2006/0049720 A1    Mar. 9, 2006

Related U.S. Application Data

(63) Continuation-in-part of application No. 11/152,805, filed on Jun. 14, 2005, now Pat. No. 7,170,214, which is a continuation-in-part of application No. 10/918,041, filed on Aug. 13, 2004, which is a continuation-in-part of application No. 10/657,325, filed on Sep. 8, 2003, now Pat. No. 6,940,209.

(51) Int. Cl.
*H01L 41/08* (2006.01)

(52) U.S. Cl. .................. 310/323.02; 310/328; 310/331

(58) Field of Classification Search .......... 310/323.02, 310/323.03, 323.04, 323.05
See application file for complete search history.

(56) References Cited

U.S. PATENT DOCUMENTS

| | | | |
|---|---|---|---|
| 2,439,499 | A | 4/1948 | Williams |
| 3,176,167 | A | 3/1965 | Vosseler |
| 3,582,540 | A | 6/1971 | Adler |
| 3,612,664 | A | 10/1971 | Berman |
| 3,736,532 | A | 5/1973 | Armenakas |

(Continued)

FOREIGN PATENT DOCUMENTS

DE    2815391 A    10/1979

(Continued)

OTHER PUBLICATIONS

Petri, Patrick "Vibration-Induced Rotation", Massachusetts Institute of Technology, Department of Mechanical Engineering, May 14, 2001 (56 pages).

(Continued)

*Primary Examiner*—Mark Budd
(74) *Attorney, Agent, or Firm*—Nixon Peabody LLP

(57) ABSTRACT

An optical assembly that contains an optical device movably attached to a apparatus for driving a threaded shaft assembly. The apparatus contains of a threaded shaft with an axis of rotation and, engaged therewith, a threaded nut. The assembly contains a device for subjecting the threaded nut to ultrasonic vibrations and thereby causing said the shaft to simultaneously rotate and translate in the axial direction.

45 Claims, 76 Drawing Sheets

U.S. PATENT DOCUMENTS

| | | | |
|---|---|---|---|
| 3,902,084 A | 8/1975 | May, Jr. | |
| 3,958,117 A | 5/1976 | Stauffer | |
| 4,184,759 A | 1/1980 | Ito | |
| 4,236,794 A | 12/1980 | Gordon | |
| 4,277,948 A | 7/1981 | Horn | |
| 4,352,300 A | 10/1982 | Esch | |
| 4,354,203 A | 10/1982 | Koyama | |
| 4,482,828 A | 11/1984 | Vergues et al. | |
| 4,629,308 A | 12/1986 | Landa | |
| 4,734,610 A * | 3/1988 | Okumura et al. | 313/23 |
| 4,757,223 A | 7/1988 | Ueyama | |
| 4,776,156 A | 10/1988 | Brown | |
| 4,781,053 A | 11/1988 | Stewart | |
| 4,857,791 A | 8/1989 | Uchino | |
| 4,871,240 A | 10/1989 | Suda | |
| 4,994,698 A | 2/1991 | Kliman | |
| 5,036,245 A | 7/1991 | Ohnishi | |
| 5,045,747 A | 9/1991 | Chen | |
| 5,091,781 A | 2/1992 | An | |
| 5,127,982 A | 7/1992 | Kotake | |
| 5,134,334 A | 7/1992 | Onishi | |
| 5,144,187 A | 9/1992 | Culp | |
| 5,157,435 A | 10/1992 | Min | |
| 5,211,101 A | 5/1993 | Letsch | |
| 5,237,234 A | 8/1993 | Jebens et al. | |
| 5,237,236 A * | 8/1993 | Culp | 310/317 |
| 5,296,943 A | 3/1994 | Goebel | |
| 5,316,319 A | 5/1994 | Suggs | |
| 5,357,308 A | 10/1994 | Goo | |
| 5,387,835 A | 2/1995 | Tsukimoto | |
| 5,398,163 A | 3/1995 | Sano | |
| 5,408,332 A | 4/1995 | Murakami | |
| 5,410,206 A | 4/1995 | Luecke | |
| 5,426,336 A | 6/1995 | Jacobsen et al. | |
| 5,434,621 A | 7/1995 | Yu | |
| 5,446,330 A | 8/1995 | Eda | |
| 5,453,653 A | 9/1995 | Zumeris | |
| 5,461,442 A | 10/1995 | Ohshita | |
| 5,528,429 A | 6/1996 | Hagimori | |
| 5,605,659 A | 2/1997 | Moynihan | |
| 5,635,782 A | 6/1997 | Jacobsen et al. | |
| 5,654,757 A | 8/1997 | Murakami | |
| 5,663,606 A | 9/1997 | Beurrier | |
| 5,739,624 A | 4/1998 | Kleiman | |
| 5,739,626 A | 4/1998 | Kojima | |
| 5,763,983 A | 6/1998 | Huang | |
| 5,769,554 A | 6/1998 | Slocum | |
| 5,774,282 A | 6/1998 | Kohmoto | |
| 5,792,379 A | 8/1998 | Dai | |
| 5,814,917 A | 9/1998 | Isobe | |
| 5,894,371 A | 4/1999 | Wrobel | |
| 5,917,158 A | 6/1999 | Takao | |
| 5,943,513 A | 8/1999 | Kim | |
| 5,966,248 A | 10/1999 | Kurokawa et al. | |
| 5,969,886 A | 10/1999 | Sato | |
| 5,982,075 A | 11/1999 | Hayasaka | |
| 6,101,840 A | 8/2000 | Watanabe | |
| 6,125,701 A | 10/2000 | Sugitani | |
| 6,142,749 A | 11/2000 | Jack | |
| 6,145,805 A | 11/2000 | Smith, III | |
| 6,147,435 A | 11/2000 | Fujimura | |
| 6,170,202 B1 | 1/2001 | Davoodi | |
| 6,236,448 B1 | 5/2001 | Ota | |
| 6,257,845 B1 | 7/2001 | Jack | |
| 6,308,113 B1 | 10/2001 | Nowlin | |
| 6,311,020 B1 | 10/2001 | Torikoshi | |
| 6,321,016 B1 | 11/2001 | Tirloni et al. | |
| 6,325,351 B1 | 12/2001 | Hale | |
| 6,366,004 B1 | 4/2002 | Yano | |
| 6,430,369 B2 | 8/2002 | Lee | |
| 6,439,282 B1 | 8/2002 | Kimura | |
| 6,445,514 B1 | 9/2002 | Ohnstein | |
| 6,483,713 B2 | 11/2002 | Samant | |
| 6,525,456 B1 | 2/2003 | Kim | |
| 6,532,331 B1 | 3/2003 | Kato et al. | |
| 6,548,926 B2 | 4/2003 | Dobson | |
| 6,591,608 B2 | 7/2003 | Langenfeld | |
| 6,606,426 B2 | 8/2003 | Laor | |
| 6,664,711 B2 * | 12/2003 | Baudendistel | 310/323.02 |
| 6,678,240 B2 | 1/2004 | Geh | |
| 6,799,483 B2 * | 10/2004 | Petri | 74/25 |
| 6,911,763 B2 * | 6/2005 | Ziegler et al. | 310/323.02 |
| 6,927,344 B1 | 8/2005 | Gall | |
| 6,940,209 B2 * | 9/2005 | Henderson | 310/323.02 |
| 6,949,836 B2 | 9/2005 | Oya | |
| 6,954,985 B2 | 10/2005 | Lee | |
| 6,983,667 B2 * | 1/2006 | Cuerden et al. | 74/89.23 |
| 7,170,214 B2 | 1/2007 | Henderson et al. | |
| 2002/0187020 A1 | 12/2002 | Julien | |
| 2003/0049095 A1 | 3/2003 | Boyer | |
| 2004/0126074 A1 | 7/2004 | Bickham et al. | |
| 2005/0052098 A1 | 3/2005 | Henderson | |
| 2005/0063663 A1 | 3/2005 | Anderson et al. | |
| 2005/0185906 A1 | 8/2005 | Bickham et al. | |

FOREIGN PATENT DOCUMENTS

| | | |
|---|---|---|
| DE | 3303745 A | 8/1984 |
| JP | 919131 | 1/1997 |
| RU | 529063 A | 4/1977 |
| RU | 597548 A | 3/1978 |
| RU | 954203 A | 9/1982 |
| RU | 977144 A | 11/1982 |

OTHER PUBLICATIONS

Vinogradov et al. "On a High Frequency Mechanism of Self-loosening of Fasteners", American Society of Mechanical Engineers, Design Engineering Division (Publication) DE Publ. by American Society of Mechanical Engineers (ASME), New York NY USA 18-4, pp. 131-137 (1989) (7 pages).

Fujita et al., "A threaded Wobble Motors. A Micro Generating Large Linear Displacement", The 8th International conference on Solid-State Sensors and Actuators, and Eurosensors IX, Stockholm, Sweden, Jun. 25-29, 1995, pp. 408-411 (4 pages).

Sybil P. Parker, McGraw-Hill Dictionary of Scientific and Technical Terms, 4th Edition, McGraw-Hill Book Company, New York, USA, pp. 1253 (1989).

Eugene A. Avallone et al., Mark's Standard Handbook for Mechanical Engineers, 9th Edition, McGraw-Hill Book Company, New York, USA, pp. 5-59 to 5-70 (1978).

Eugene A. Avallone et al., Mark's Standard Handbook for Mechanical Engineers, 9th Edition, McGraw-Hill Book Company, New York, USA, pp. 8-9 to 8-90 (1978).

Bolt Science, "Vibration Loosening of Bolts and Threaded Fasteners," at http://www.boltscience.com/pages/vibloose.htm (accessed Nov. 29, 2006).

Holland & Tran, "Finite Element Modelling of Threaded Fastener Loosening Due to Dynamic Forces," Proceeding of the 8th International Conference on the Application of Artificial Intelligence to Civil and Structural Engineering Computing, Stirling, Scotland, pp. 125-126 (2001) (abstract only).

Arnot Q, Custom Cues, "The Arnot Q Euro Custom Cue. Purchased by Gerherdt Junker," at http://arnotq.com/pages/60/60.html (Google Cache Search "Gerhardt Junker" accessed Sep. 23, 2006).

Zadoks & Yu, "An Investigation of the Self-Loosening Behavior of Bolts Under Transverse Vibration," *Journal of Sound and Vibration* 208(2):189-209 (1997) (abstract only).

Hess et al., "Dynamic Loosening and Tightening of a Single-Bolt Assembly," J of Vibration and Acoustics 119 (3):311-316 (1997).

* cited by examiner

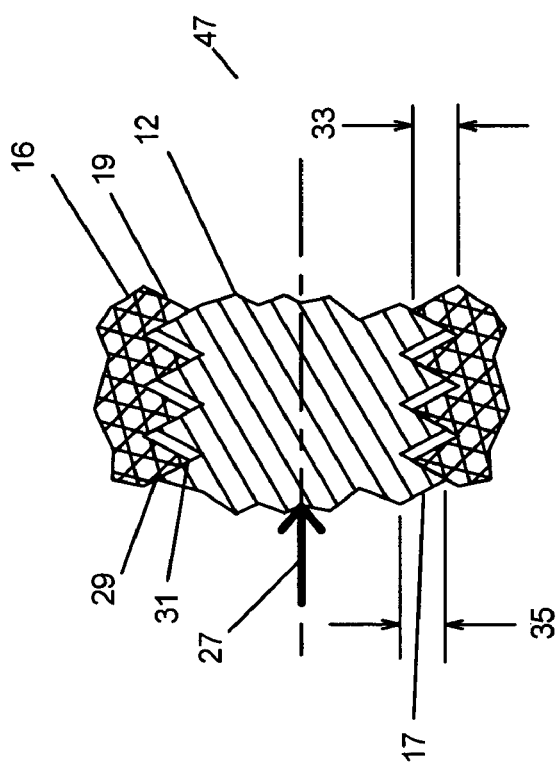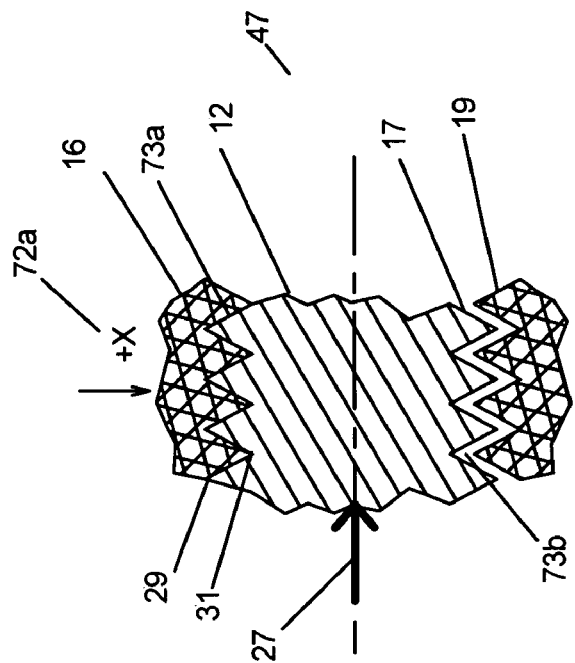

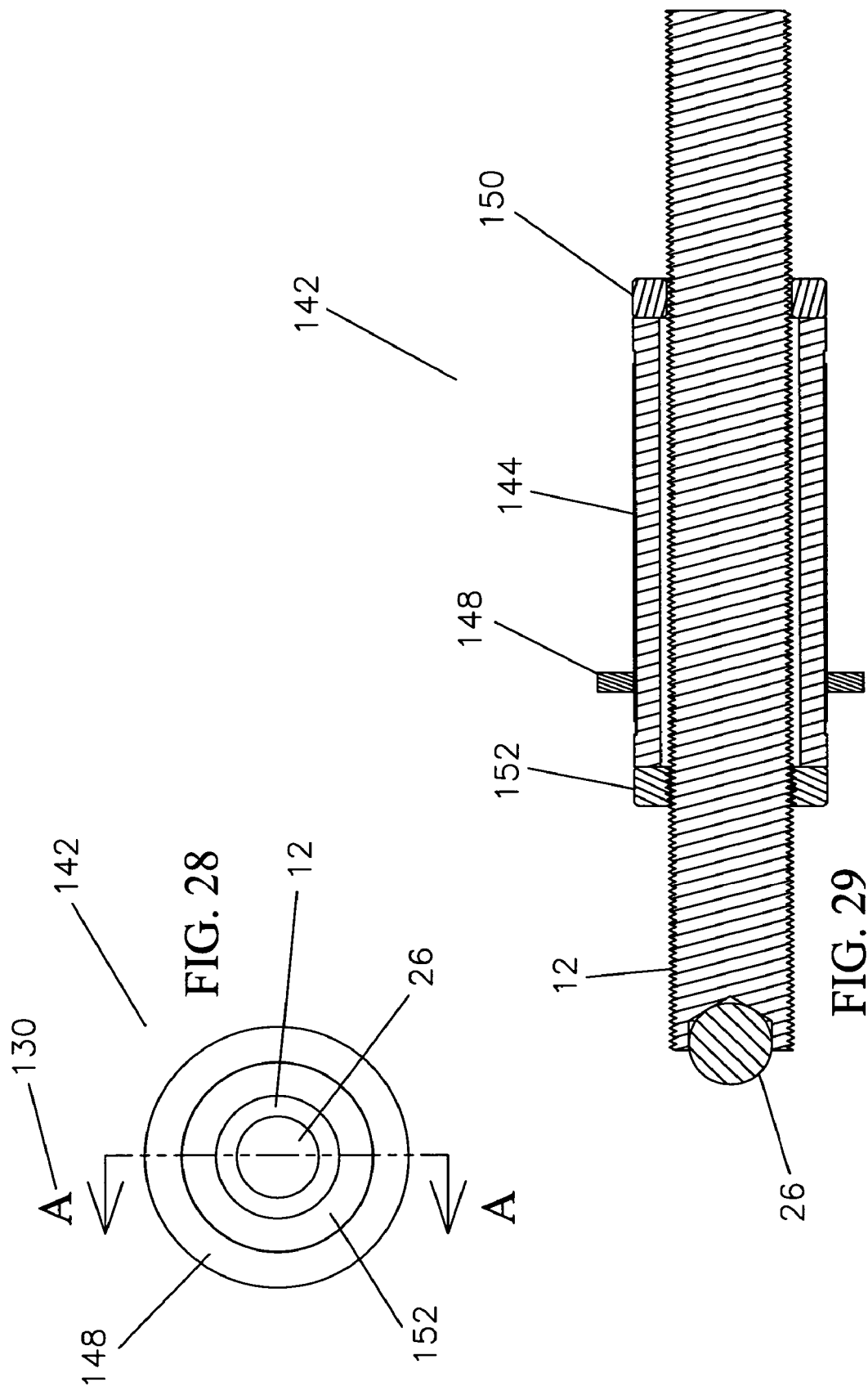

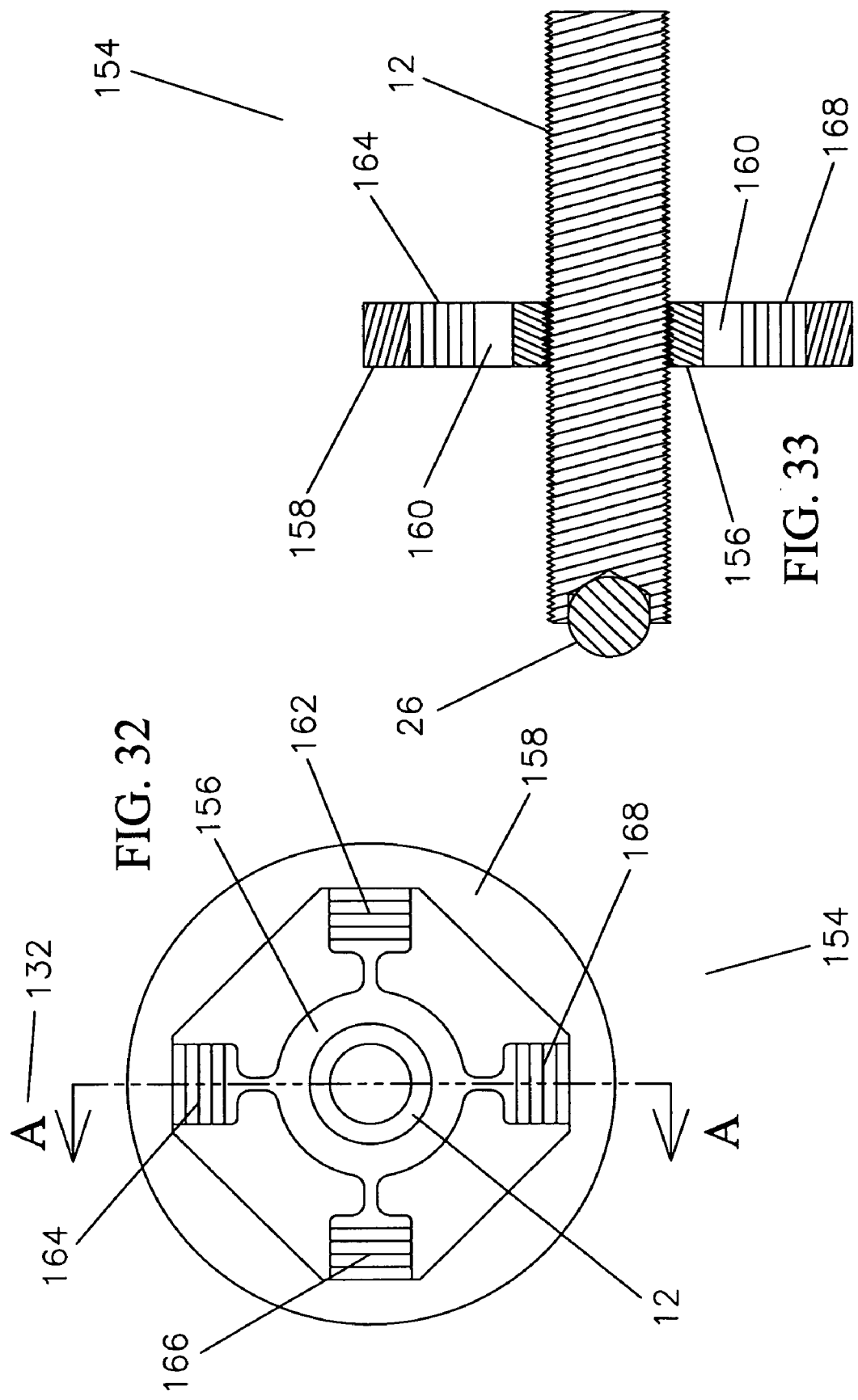

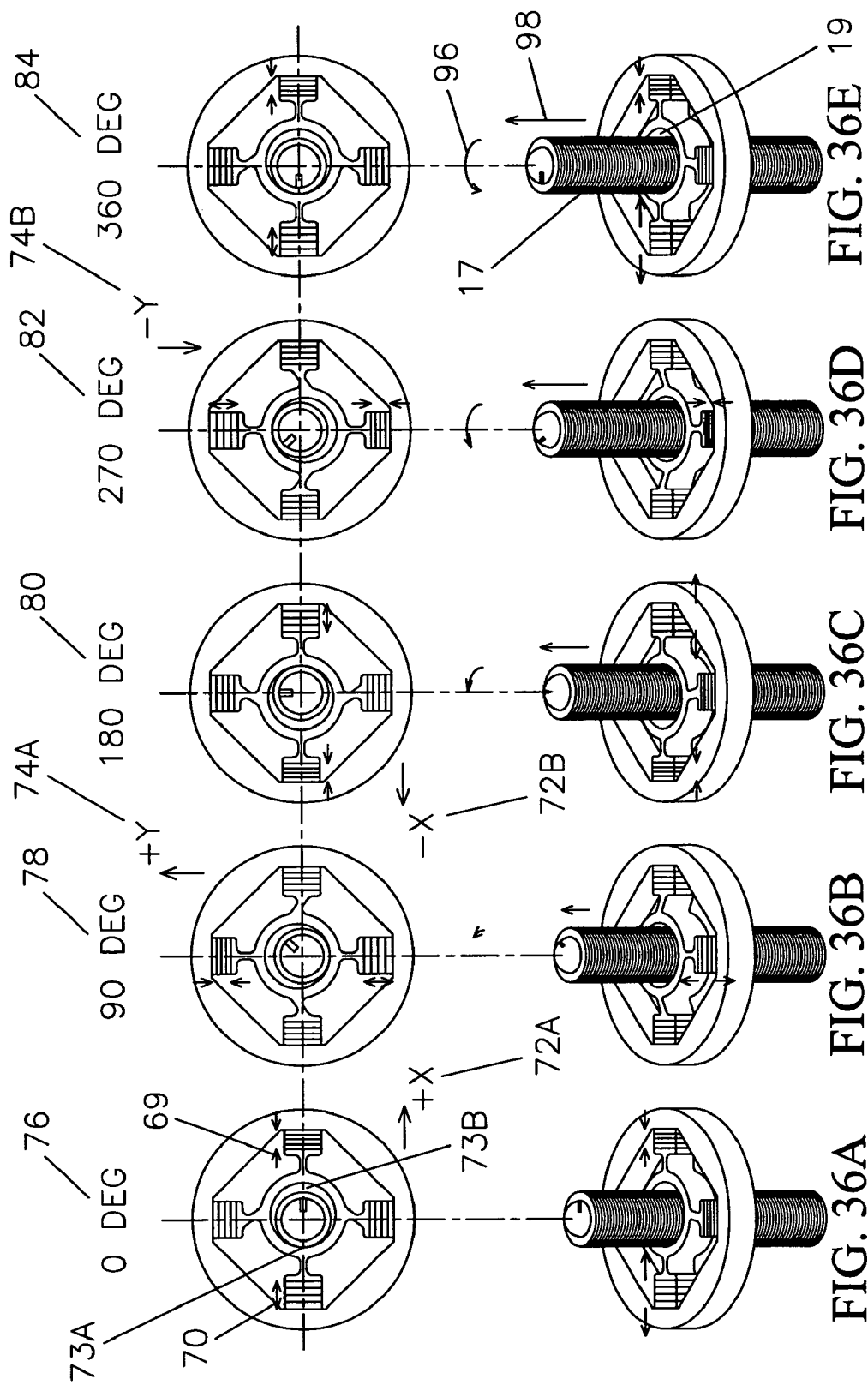

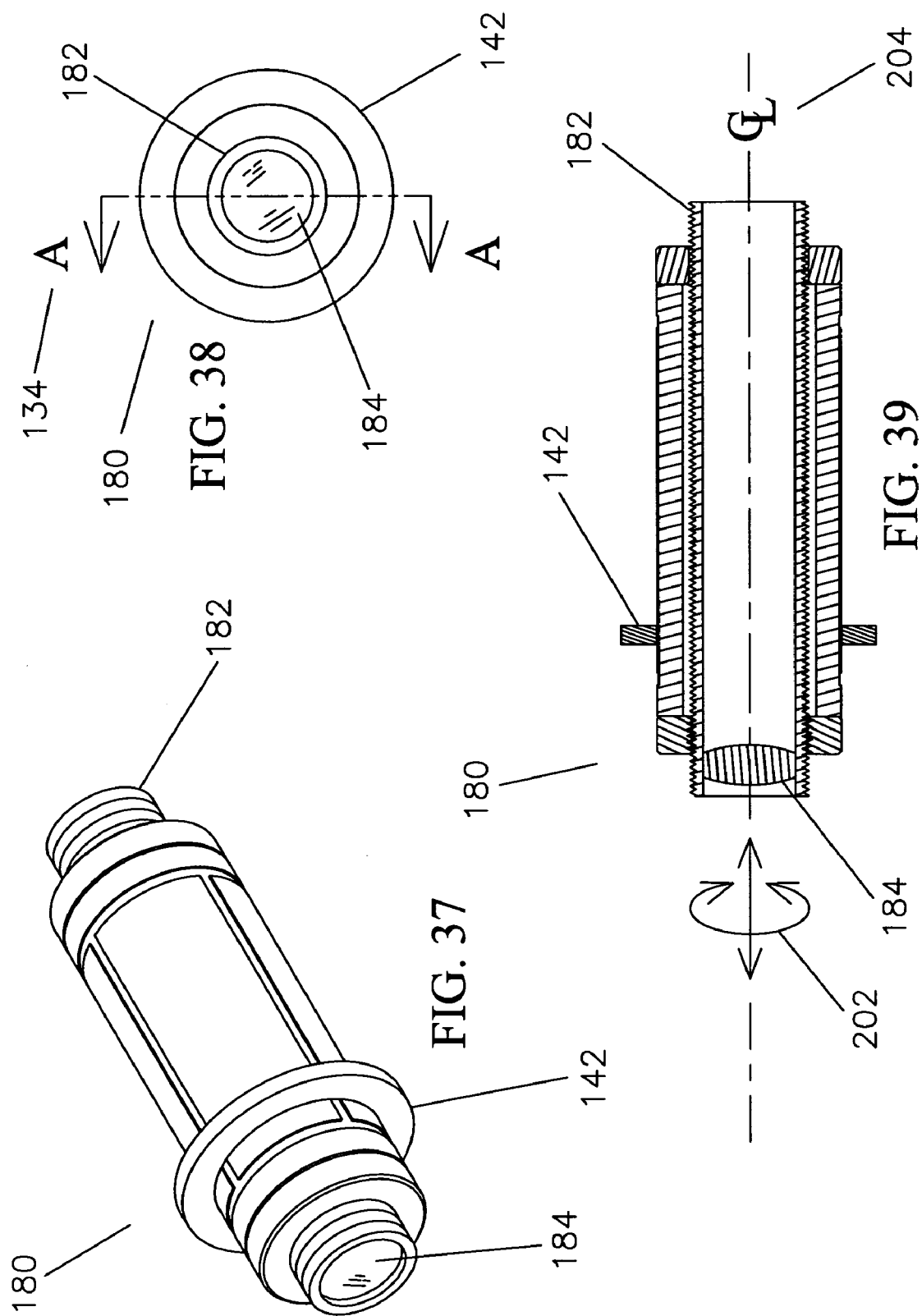

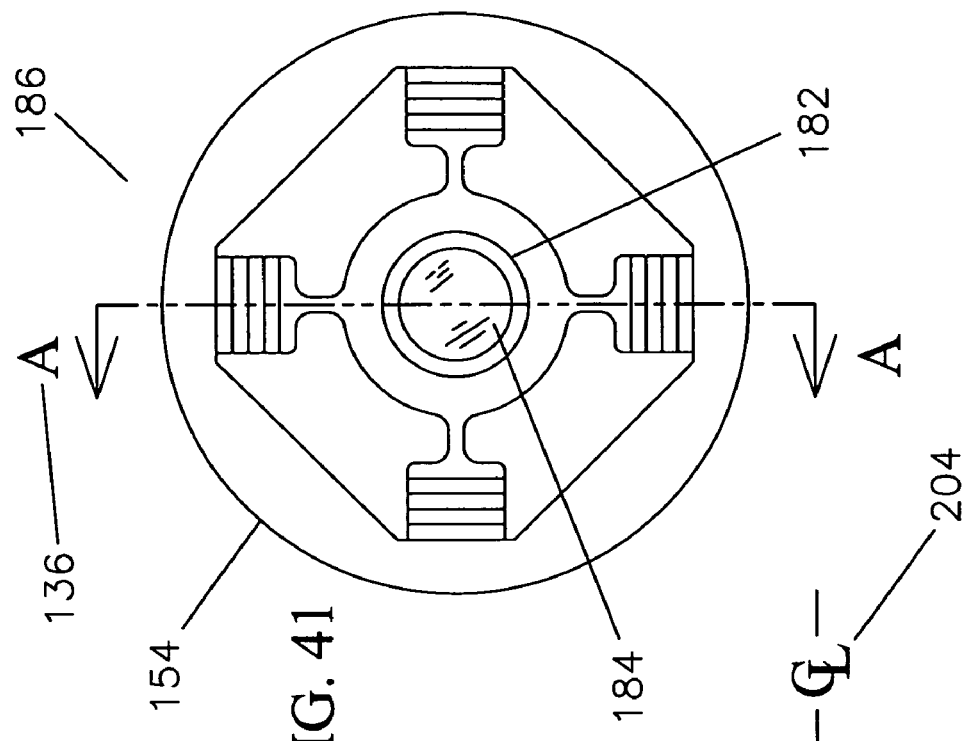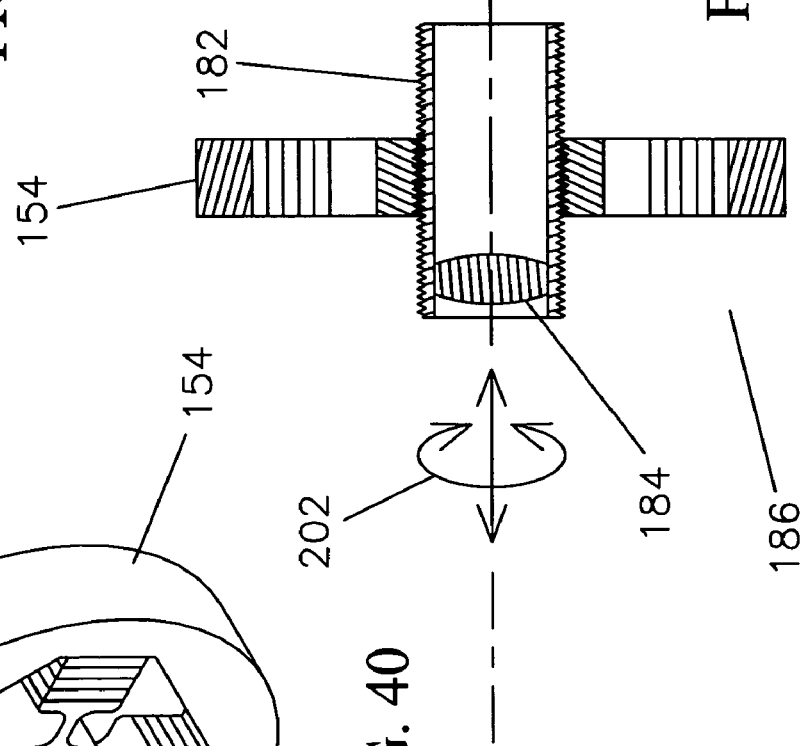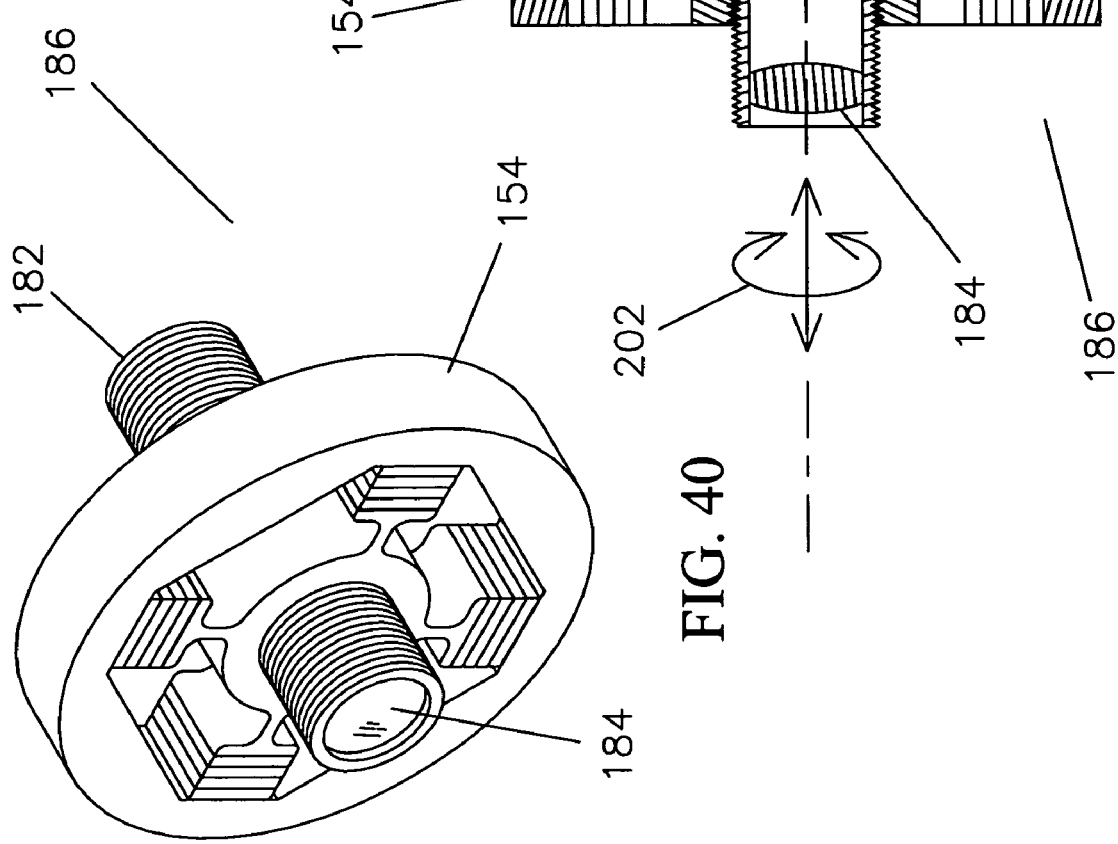

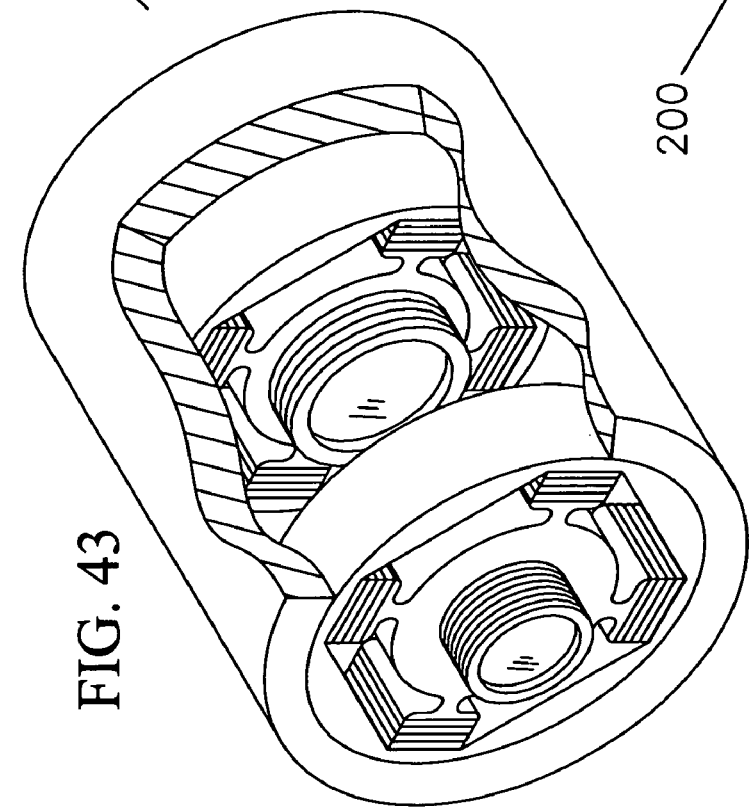
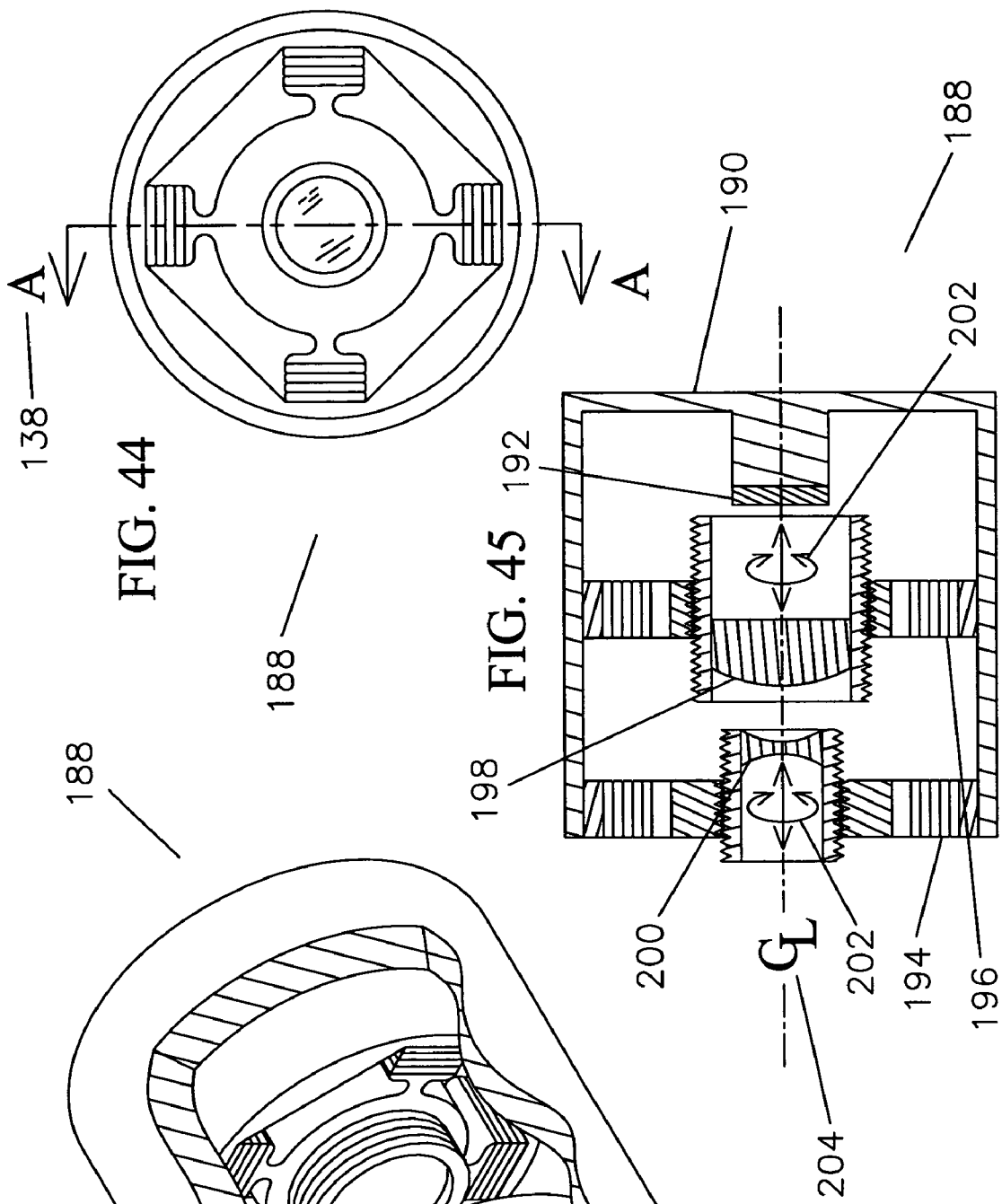
FIG. 43
FIG. 44
FIG. 45

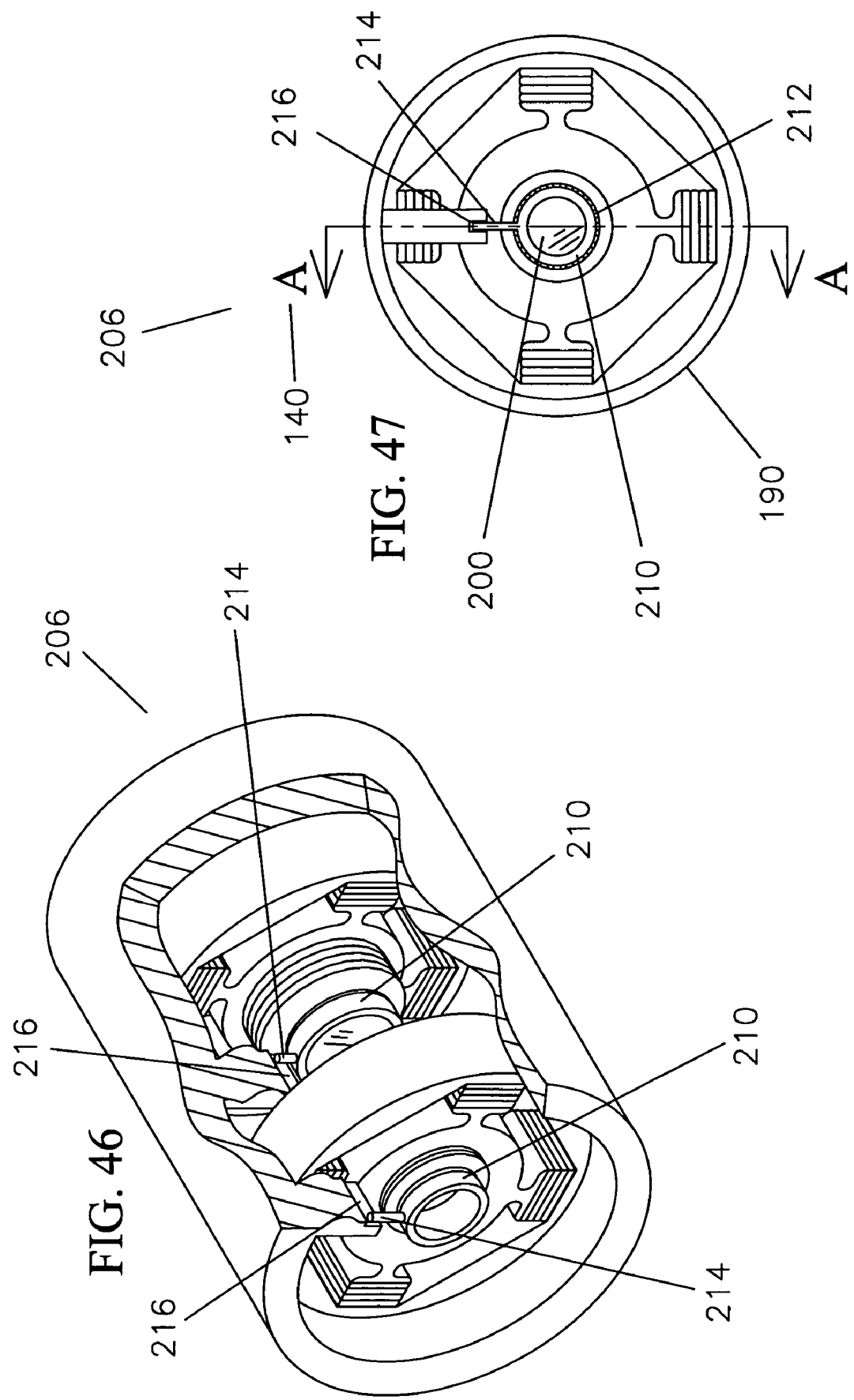

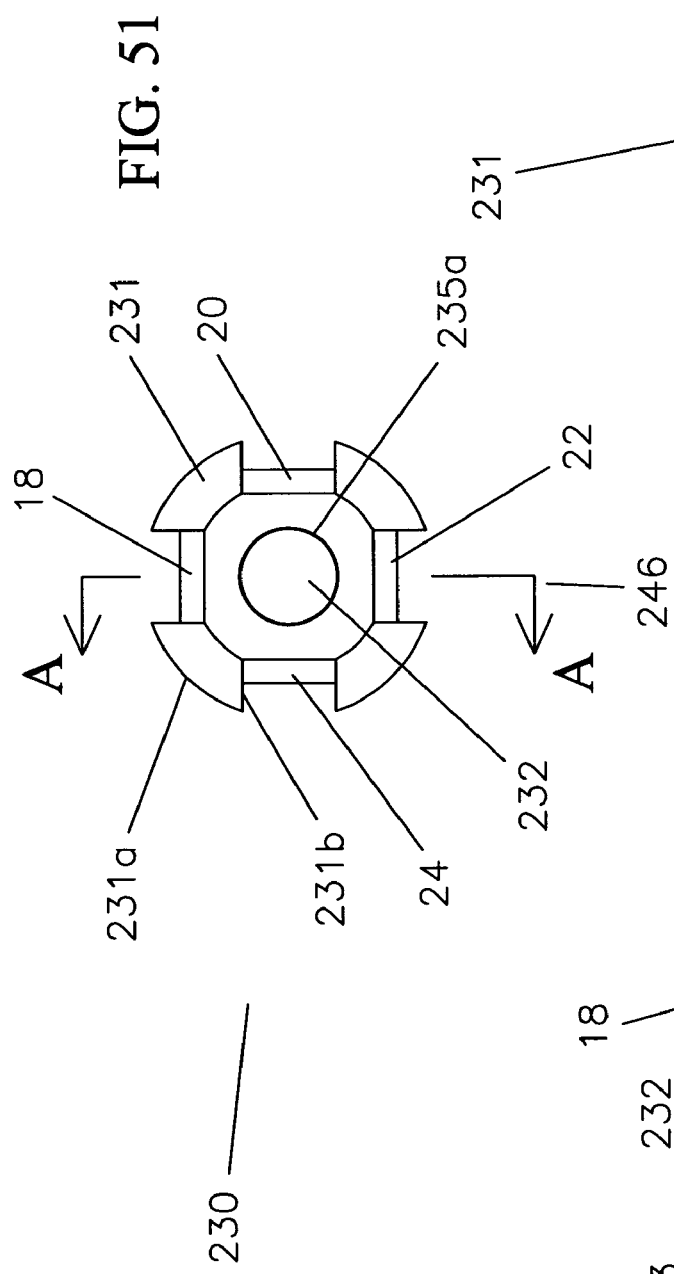
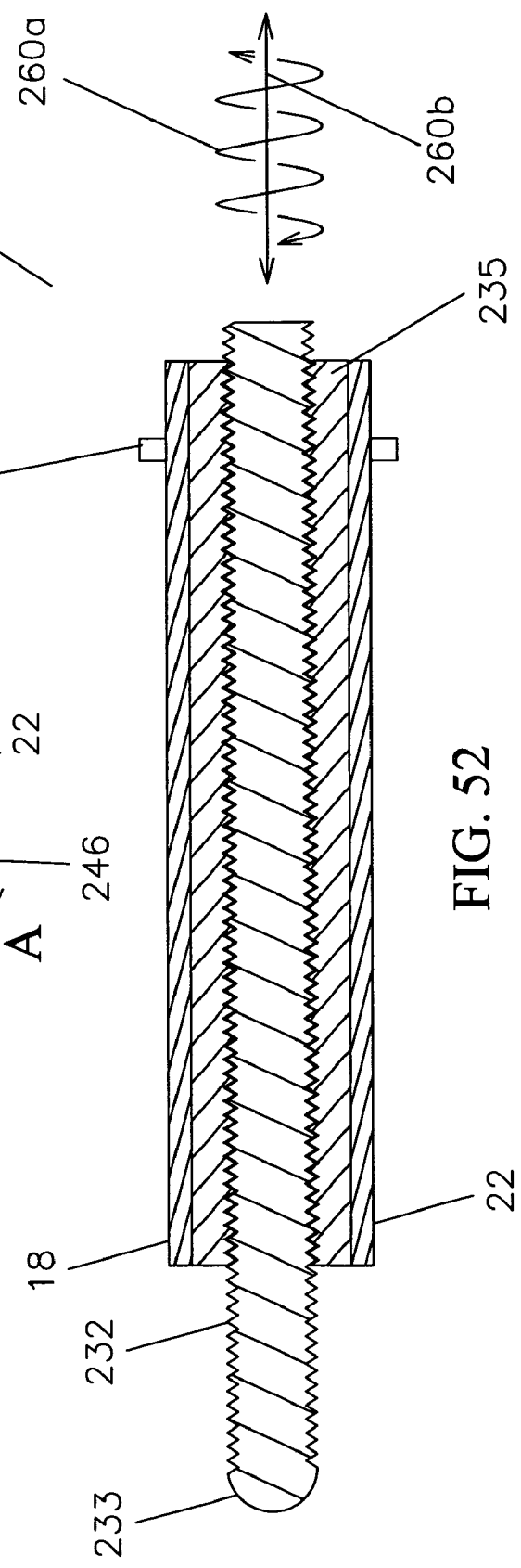
FIG. 51
FIG. 52

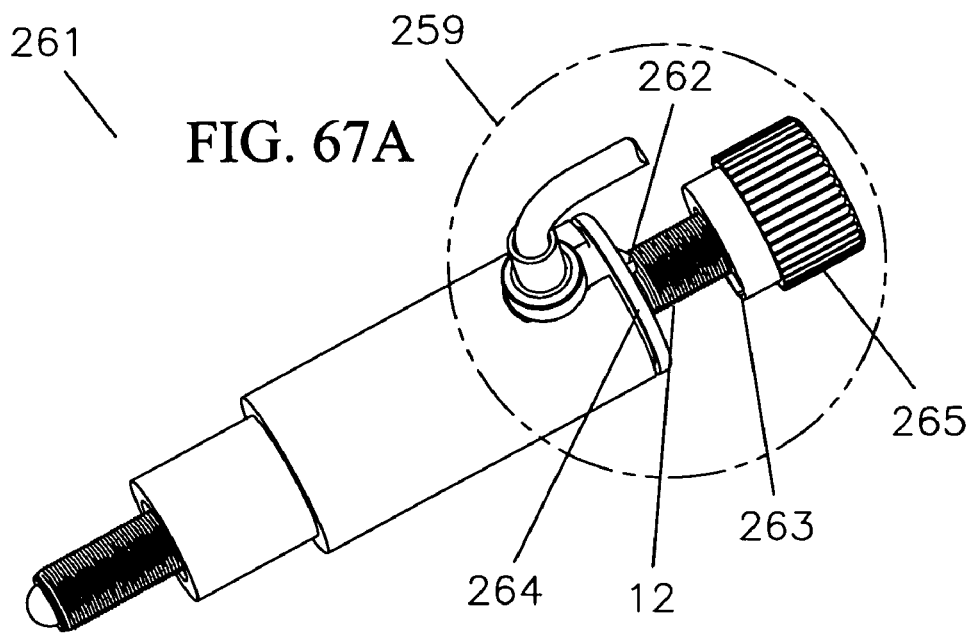
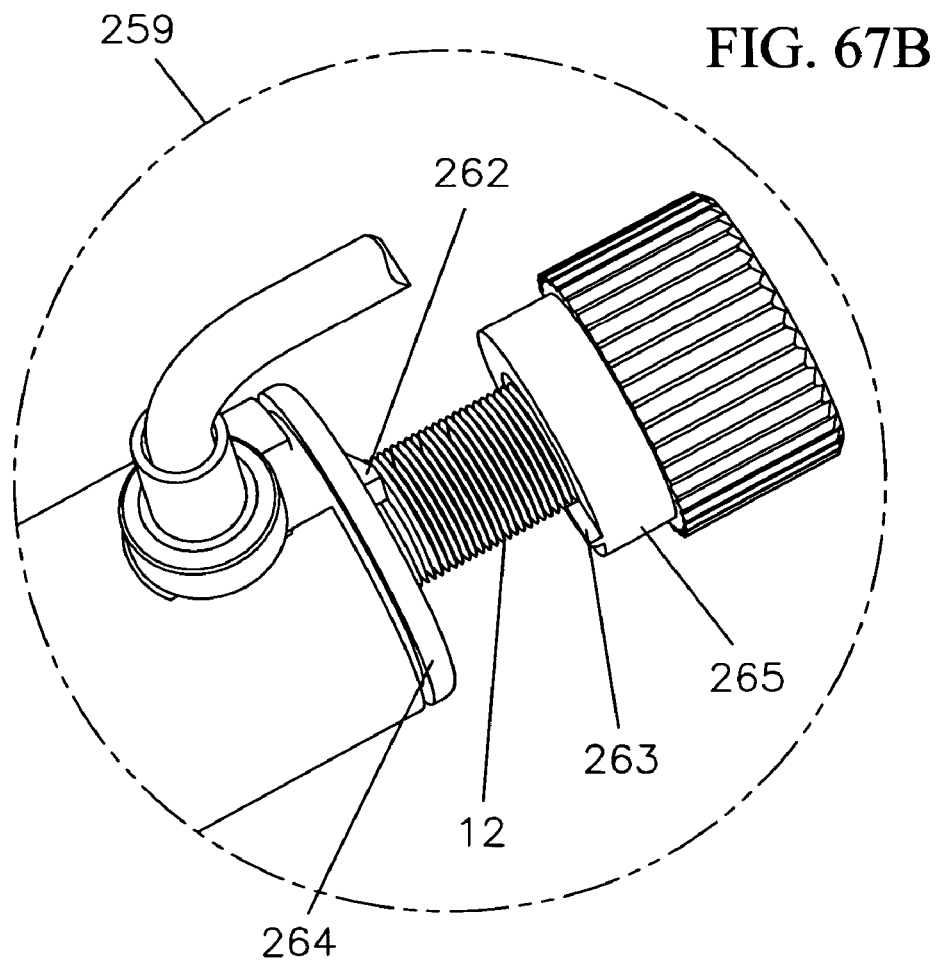

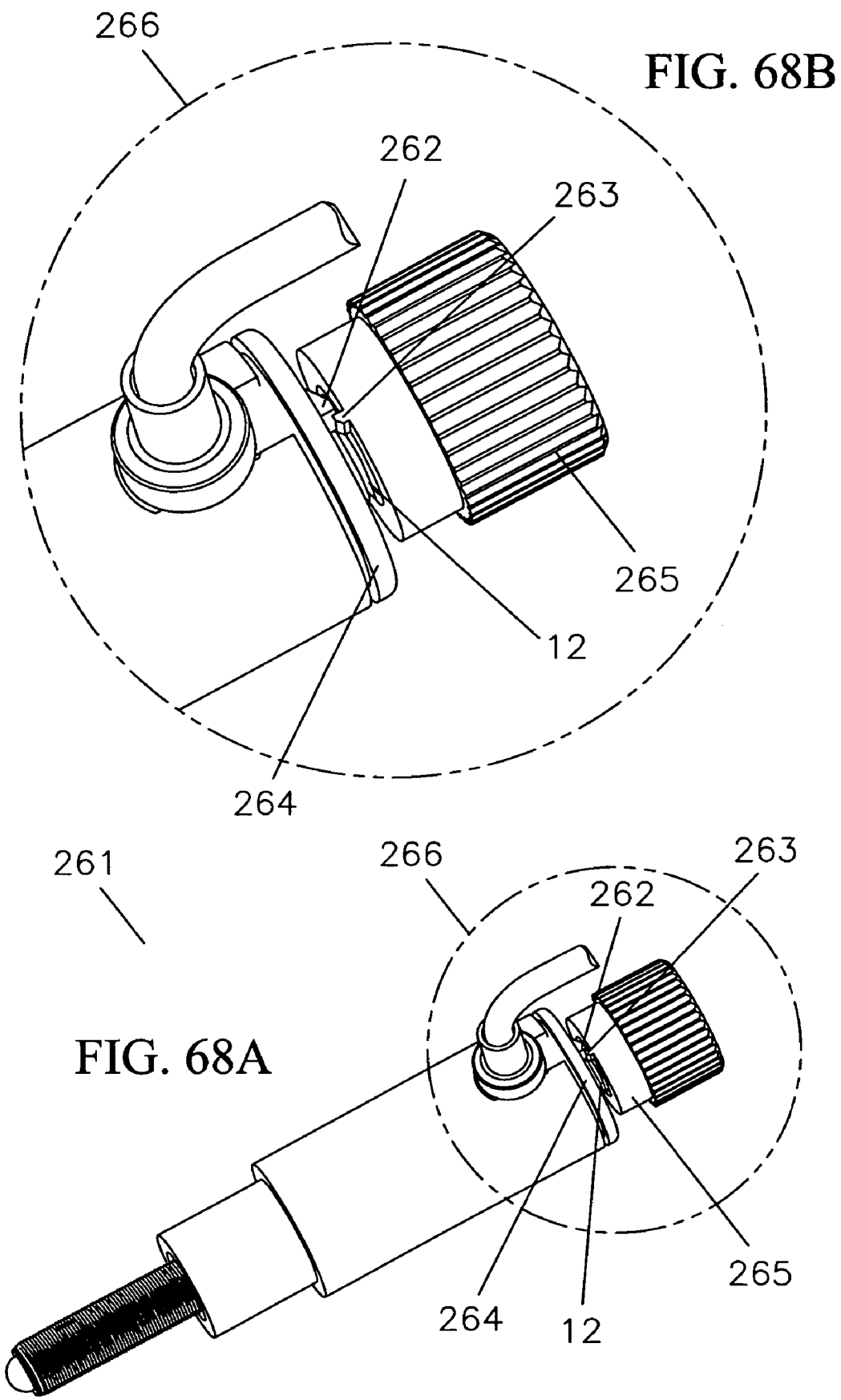

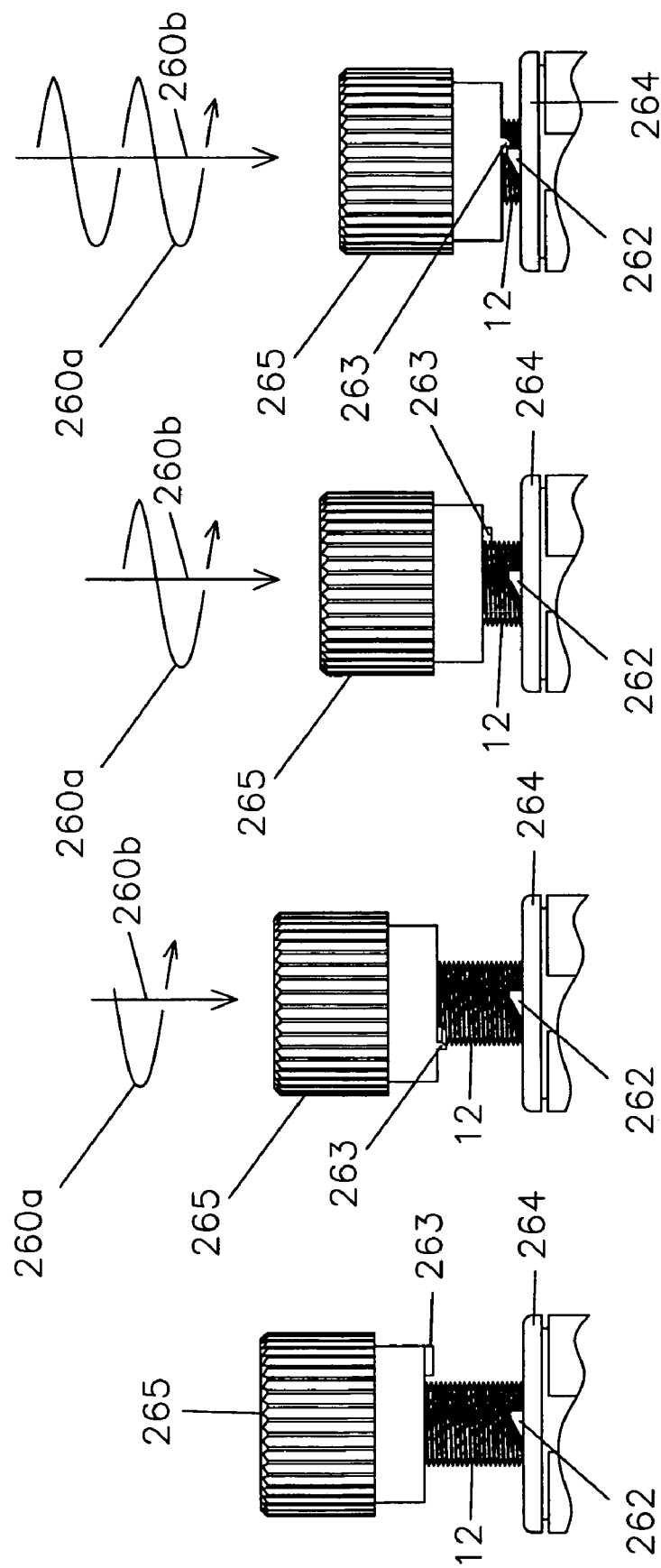

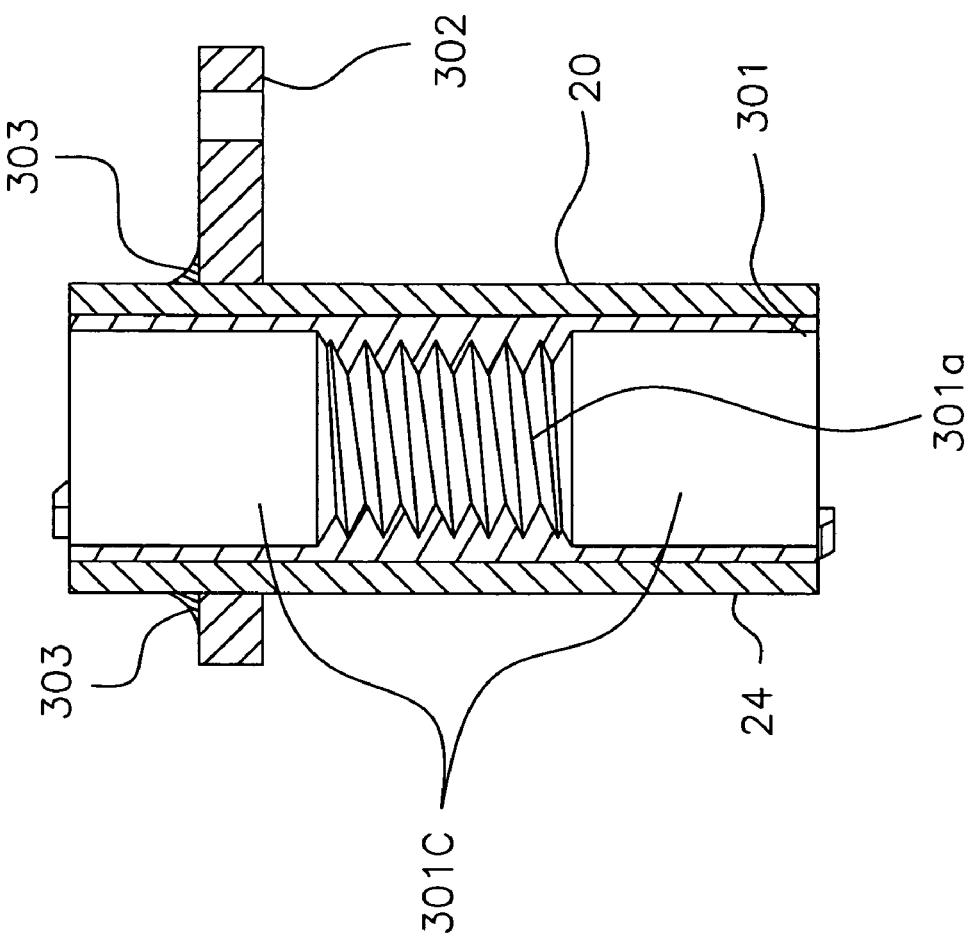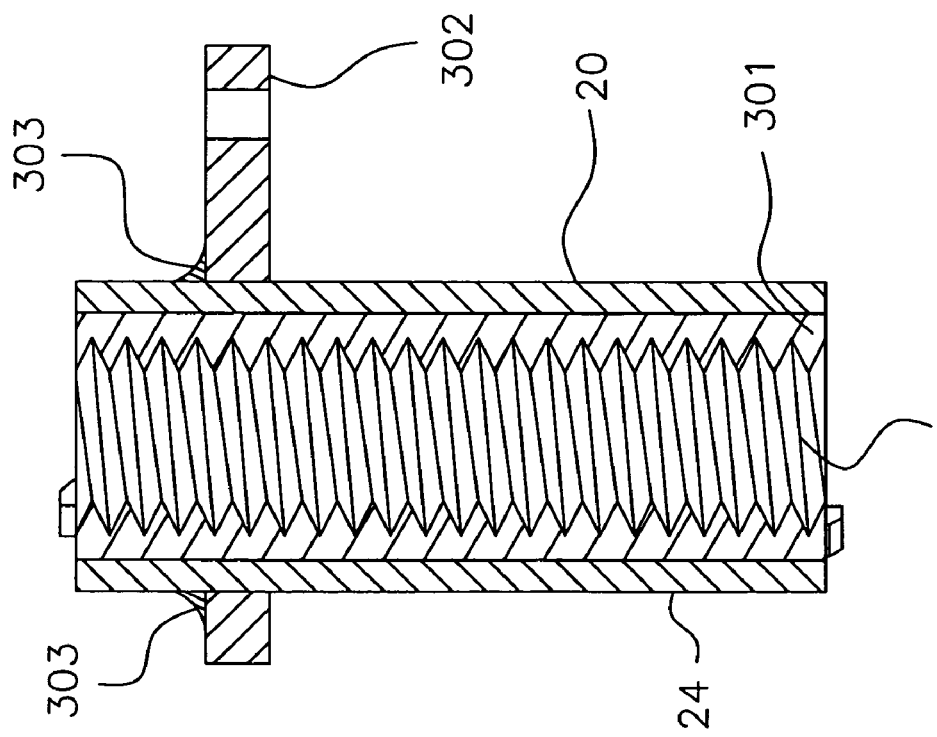

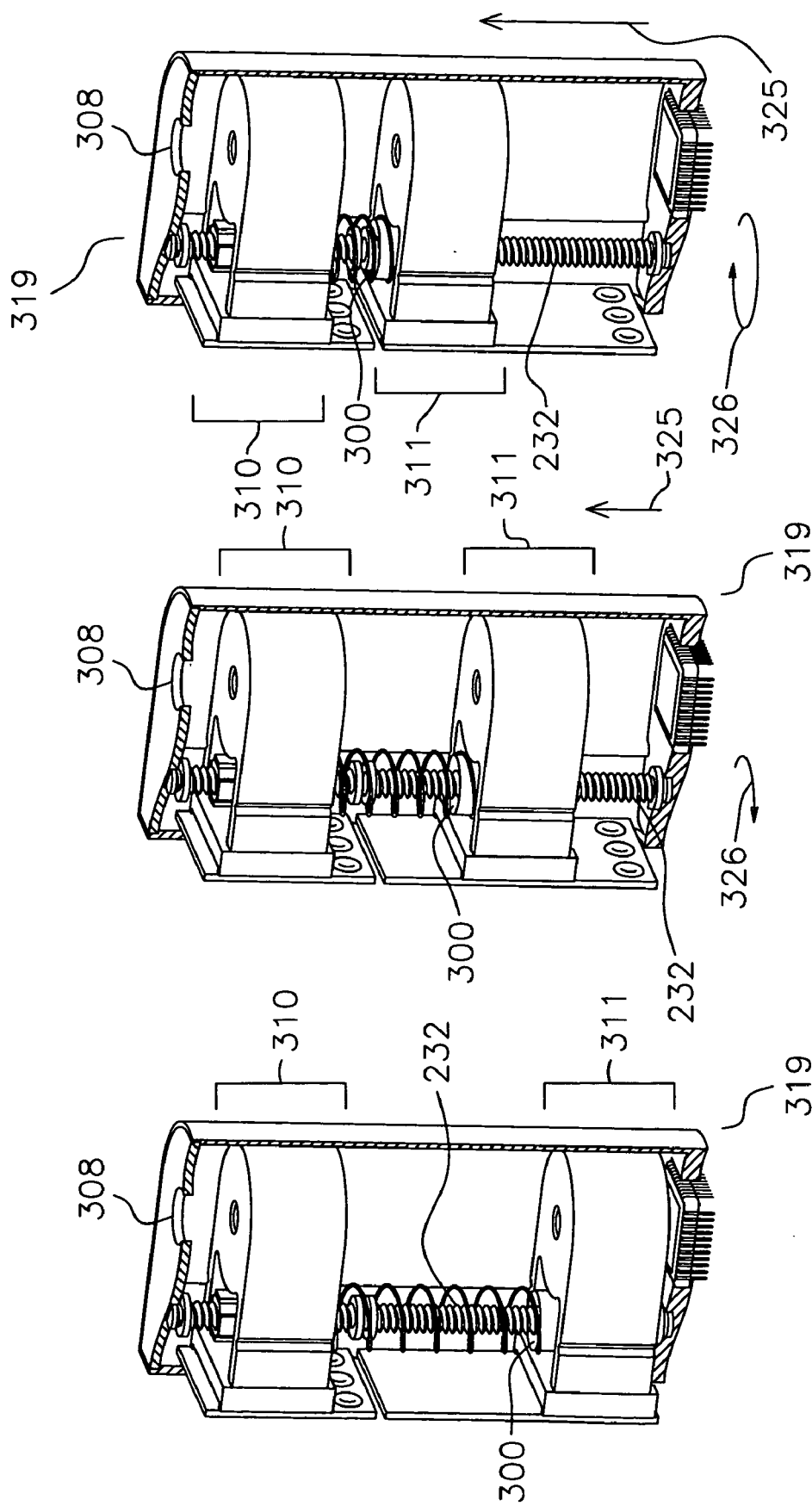

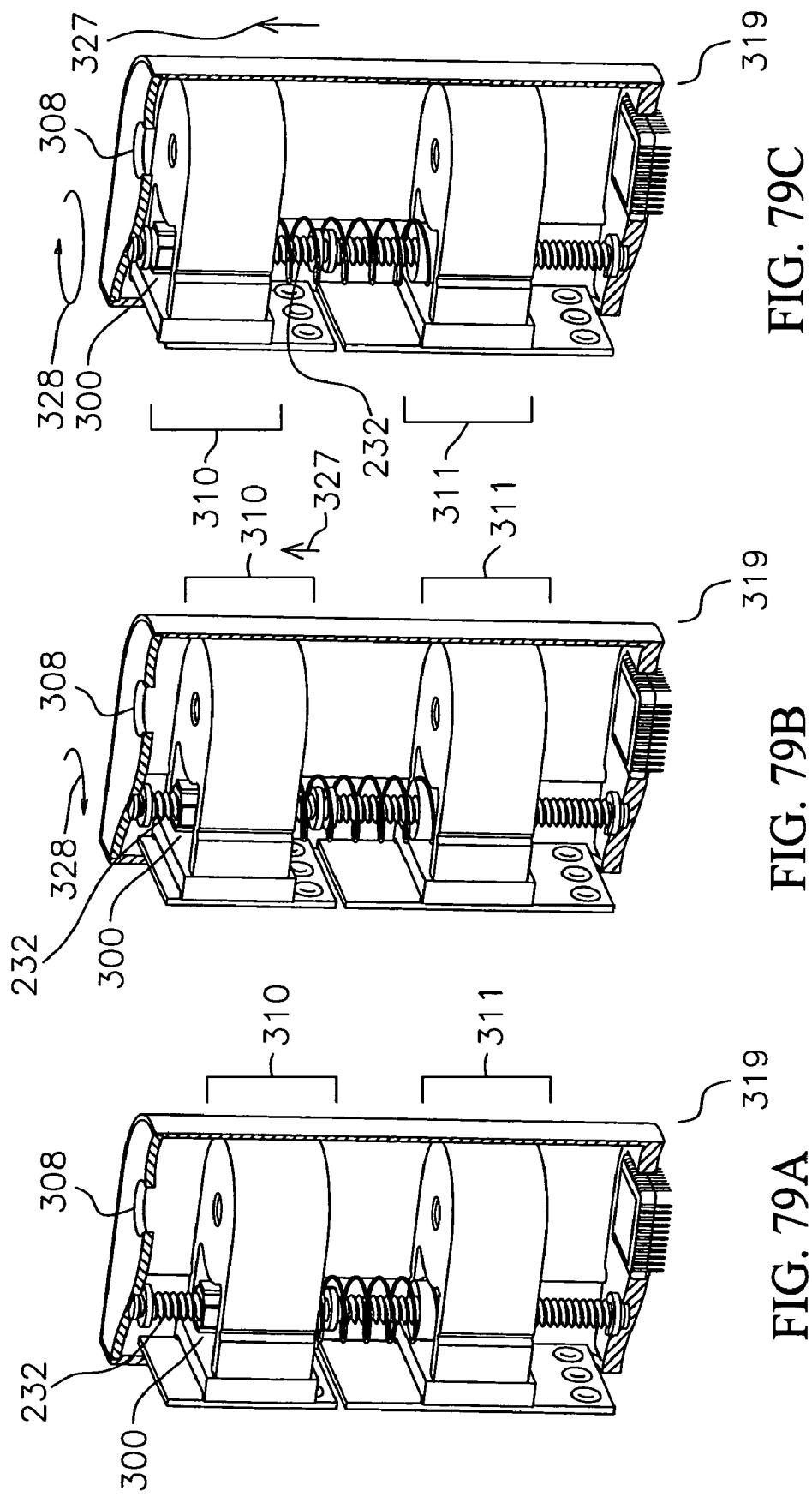

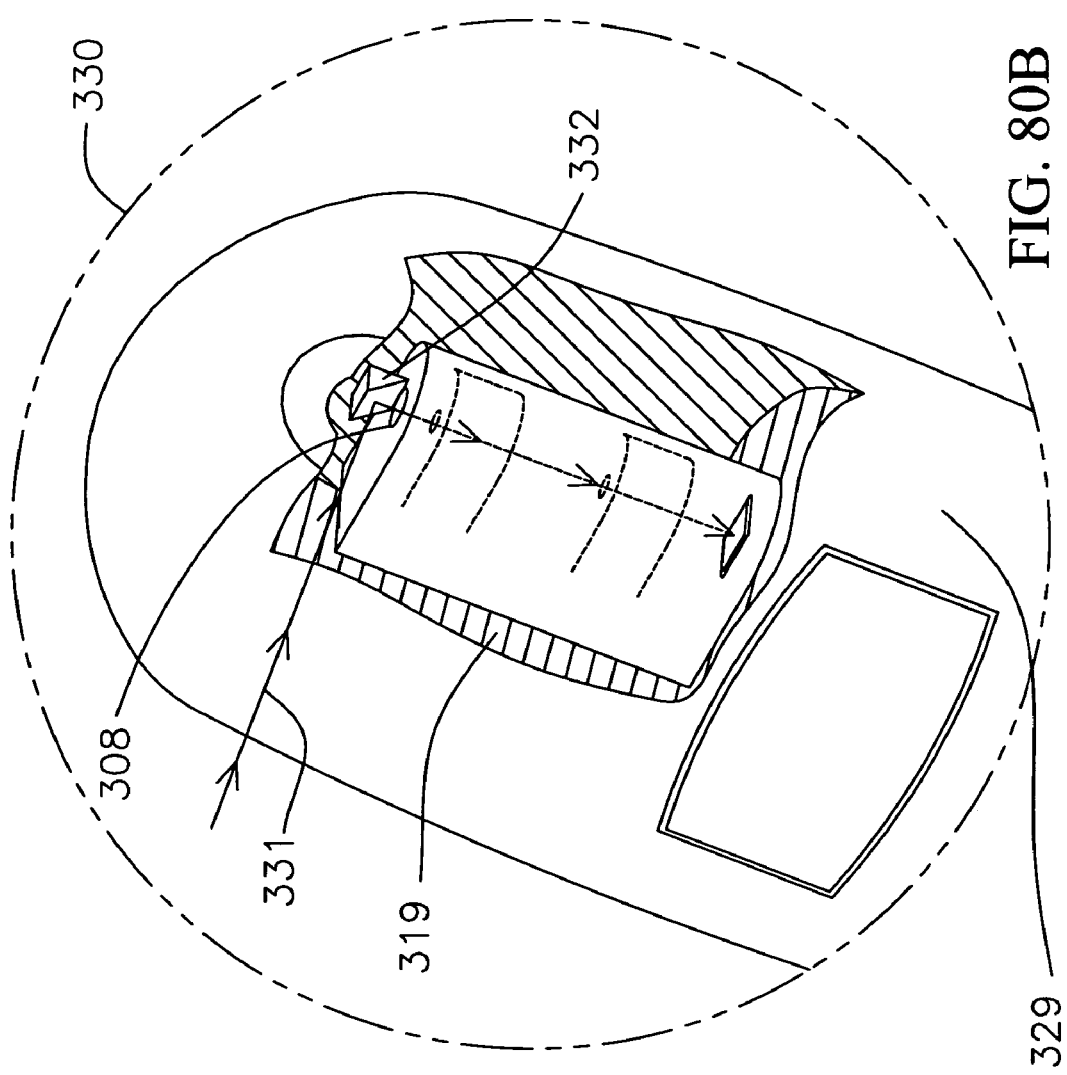
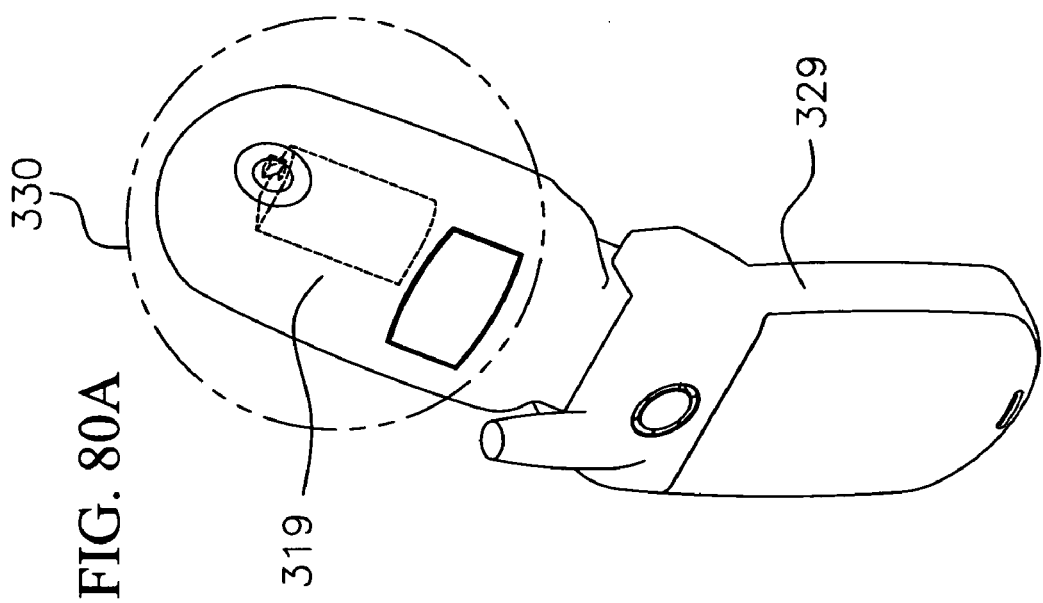
FIG. 80A
FIG. 80B

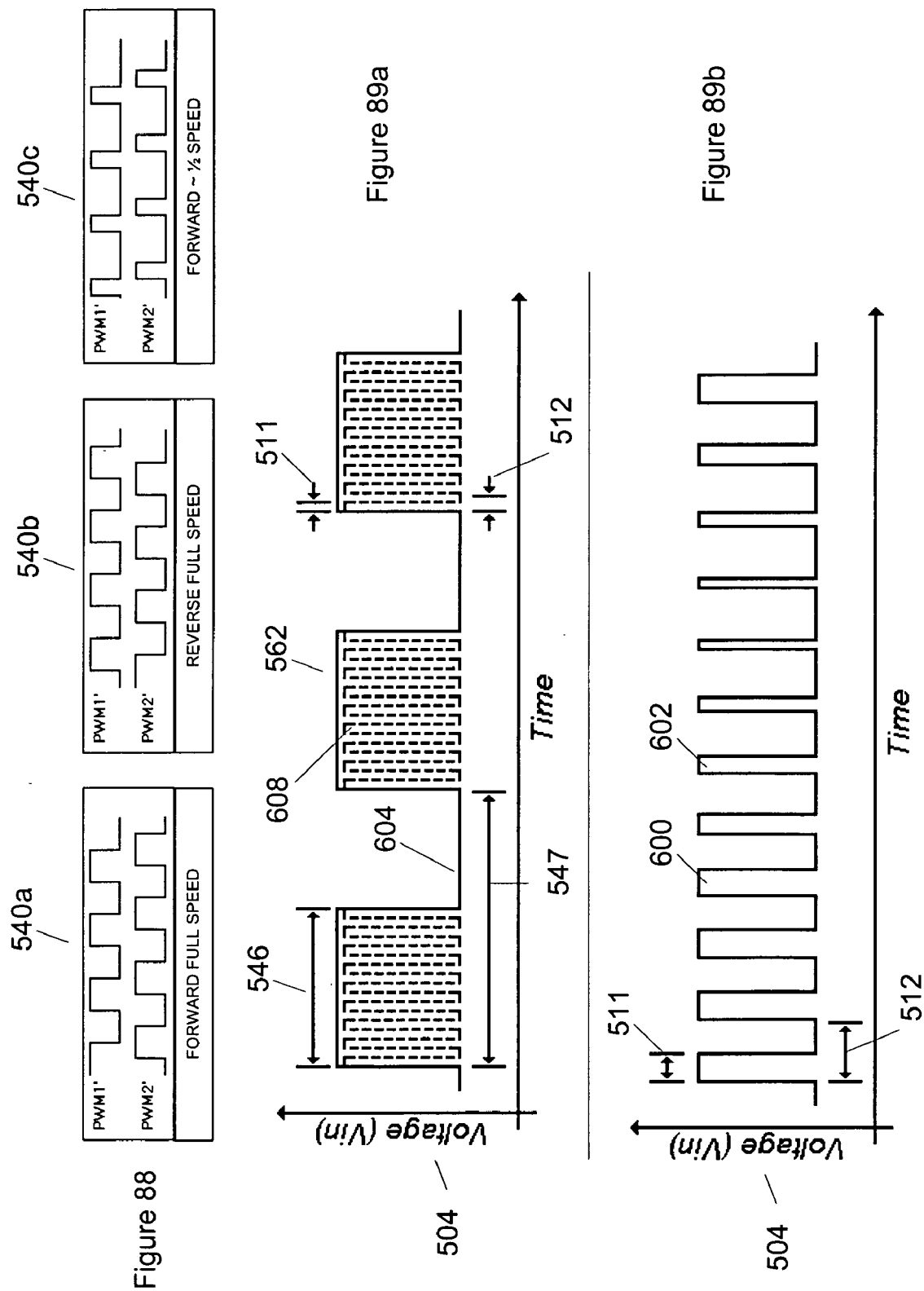

MECHANISM COMPRISED OF ULTRASONIC LEAD SCREW MOTOR

CROSS-REFERENCE TO RELATED PATENT APPLICATIONS

This application is a continuation-in-part of applicant's application U.S. Ser. No. 11/152,805, filed on Jun. 14, 2005, now U.S. Pat. No. 7,170,214 which is a continuation-in-part of U.S. Ser. No. 10/918,041, filed on Aug. 13, 2004, which in turn is a continuation-in-part of U.S. Ser. No. 10/657,325, filed on Sep. 8, 2003 now U.S. Pat. No. 6,940,209. The content of each of the aforementioned patent applications is hereby incorporated by reference into this specification.

FIELD OF THE INVENTION

An imaging device that contains a miniature ultrasonic linear motor assembly comprised of a threaded shaft and, engaged, therewith, a nut.

BACKGROUND OF THE INVENTION

Transducers using piezoelectric electrostrictive, electrostatic, or electromagnetic technologies are very useful for precise positioning at the nanometer scale. In the case of a piezoelectric device, the ceramic is formed into a capacitor that changes shape when charged and discharged creating a force transducer or position actuator. When used as a position actuator, the shape change of the piezoelectric ceramic is approximately proportional to the applied voltage. Piezoelectric actuators are limited in range to about 0.1 percent of the length of the ceramic which corresponds to typical stroke lengths of tens of micrometers. While the high stiffness and nanometer precision of piezoelectric actuators is very useful, more stroke is needed for many applications.

Numerous piezoelectric motor designs have been developed to "rectify" small ceramic shape changes and generate longer stroke.

A PZT stepping motor is described in U.S. Pat. No. 3,902,084; the entire disclosure of this United States patent is hereby incorporated by reference into this specification. This motor uses a clamp-extend-clamp-retract operating sequence to add together many short PZT actuator cycles. This stepping linear actuator operates at frequencies from DC to several kilohertz, which produces loud noise and vibration. Position is not maintained when power is off. Resolution better than one nanometer is achieved over 200 millimeters of travel.

A PZT inertial stick-slip motor is described in U.S. Pat. No. 5,410,206; the entire disclosure of this United States patent is hereby incorporated by reference into this specification. This motor rotates a fine-threaded shaft using a split nut, which forms "jaws" that grip the shaft on opposite sides. A PZT actuator rapidly moves the jaws in opposite directions with an asymmetric alternating current drive signal. Fast jaw movements overcome the clamping friction and create slippage. Slower jaw movements do not slip and rotate the shaft. This stick-slip motor makes similar noise and vibration as the above stepping motor but moves 100 times slower and holds position when power is turned off. Resolution better than 50 nanometers is achieved over 25 millimeters of travel.

Ultrasonic motors use piezoelectric-generated vibrations to create continuous movement with high speed, high torque, small size and quiet operation.

One of the earliest ultrasonic piezoelectric motors is described in U.S. Pat. No. 3,176,167; the entire disclosure of this United States patent is hereby incorporated by reference into this specification. This unidirectional rotary motor uses a quartz crystal oscillator to move a thin rod and drive a ratchet wheel with the objective of driving a clock mechanism.

An example of a standing wave ultrasonic motor is described in U.S. Pat. No. 5,453,653; the entire disclosure of this United States patent is hereby incorporated by reference into this specification. This motor uses a rectangular PZT plate to generate ultrasonic oscillations of a contact point that is preloaded against a moving surface. The electrode pattern on the PZT plate is connected to an alternating current signal and generates two-dimensional oscillations of the contact tip with the required amplitude and phase to generate a net force against the mating surface. This ultrasonic motor is quiet and 100 times faster than a stepping motor while producing about one third of the force. Generally ultrasonic motors are difficult to stop and start which limits precision. An encoder with closed-loop control is typically required to achieve sub-micrometer resolution.

A device for driving a threaded rod using ultrasonic vibrations is described, e.g., in U.S. Pat. No. 6,147,435 of Katsuyuki Fujimura; the entire disclosure of this patent is hereby incorporated by reference into this specification. This patent discloses and claims: " . . . A mechanism for driving a screw rod by supersonic vibration, comprising: a screw rod provided with a groove portion formed helically along an axial direction thereof; a pair of stands rotatably holding opposite ends of said screw rod; a work rack partially surrounding said screw rod and slidable in the axial direction of said screw rod; at least one first screw rod rotation device secured on one side of said work rack and extending from said work rack to said screw rod, said at least one first screw rod rotation device comprising a first vibrator contacting with said groove portion of said screw rod at a first specific angle, a first spring urging said first vibrator toward said groove portion of said screw rod at a specific pressure and a first piezoelectric actuator for vibrating said first vibrator upon electrical activation to rotate said screw rod in a first rotational direction; and at least one second screw rod rotation device secured on another side of said work rack and extending from said work rack to said screw rod, said at least one second screw rod rotation device comprising a second vibrator contacting with said groove portion of said screw rod at a second specific angle opposite said first specific angle, a second spring urging said second vibrator toward said groove portion of said screw rod at a specific pressure and a second piezoelectric actuator for vibrating said second vibrator upon electrical activation to rotate said screw rod in a second direction."

The device of U.S. Pat. No. 6,147,435 requires both a "first screw rod rotation device" and a "second screw rod rotation device"; these are illustrated in FIG. 3, e.g., as elements 16a' and 16d' (which comprise such first screw rod rotation device), and as elements 16b' and 16c' (which comprise such second screw rod rotation device). Referring again to U.S. Pat. No. 6,147,435, when elements 16a' and 16d' are activated by ultrasonic vibration, the screw rod 2 is caused to rotate in one direction; and when elements 16b' and 16c' are activated by ultrasonic vibration, the screw rod 2 is caused to rotate in the opposite direction.

The elements 16a'/16d', and 16b'/16c' are never activated simultaneously; to do so would waste energy and cause the screw rod 2 to remain stationary.

However, even when such elements 16a'/16d' and 16b'/16c' are not activated simultaneously, there is a waste of energy. The inactive pair of elements still are contiguous with the threads on screw rod 2 and, thus, cause drag friction.

This drag friction is a problem with the device of U.S. Pat. No. 6,147,435. As is described in claim 2 of the patent, and in order to somewhat solve this problem, with the device of such patent " . . . when one of said first and second piezoelectric actuators is electrically activated, a very small amount of electric current is supplied to the other of said first and second piezoelectric actuators." The efficiency of the device of U.S. Pat. No. 6,147,435 is not very high.

It is an object of this invention to provide a mechanism for driving a threaded shaft by ultrasonic vibration that has a substantially higher efficiency than that of U.S. Pat. No. 6,147,435 while providing higher precision, force, and speed than is typically achieved by other ultrasonic motors of a similar size.

It is another object of this invention to provide an imaging device comprised of the aforementioned mechanism for driving a threaded shaft.

SUMMARY OF THE INVENTION

In accordance with this invention, there is provided an optical assembly comprised of optical elements for focusing and zooming that are connected to at least one apparatus for driving threaded shaft assemblies, wherein said at least one apparatus for driving threaded shaft assemblies are comprised of a threaded shaft and, engaged therewith, a nut. The assembly contains means for subjecting said nut to ultrasonic vibration and thereby causing said shafts to rotate and said nuts translate in the axial direction. The assembly also is comprised of means for applying an axial forces upon said shafts.

BRIEF DESCRIPTION OF THE DRAWINGS

The invention will be described by reference to this specification, the appended claims, and the drawings, wherein like numerals refer to like element, and wherein:

FIGS. 1 through 6 show a motor containing four rectangular piezoelectric plates wherein FIG. 1 is a perspective view of such motor, FIG. 2 is an exploded view of such motor, FIG. 3 is an end view of such motor, FIG. 4 shows the electrical connections to such motor, FIG. 5 is cross sectional view of motor taken along lines A-A (30) of FIG. 3, FIG. 5A shows a magnified scale view (47 on FIG. 5) of the thread engagement with external preload and the motor off, FIG. 5B show the same magnified scale view in FIG. 5A with the motor operating, and FIG. 6 is a cross section view taken along lines B-B (32) of FIG. 3;

FIGS. 7 through 12 illustrate a motor containing four piezoelectric stacks wherein:

FIG. 7 is a perspective view of such motor, FIG. 8 is an exploded view of such motor, FIG. 9 is an end view of such motor, FIG. 10 shows the electrical connections to such motor, FIG. 11 is cross section view taken along lines A-A (48) of FIG. 9, and FIG. 12 is cross section view taken along lines B-B (46) of FIG. 9;

FIGS. 13 through 17 illustrate a motor containing a piezoelectric tube with four outer electrodes wherein: FIG. 13 is a perspective view of such motor, FIG. 14 is an exploded view of such motor, FIG. 15 is an end view of such motor, FIG. 16 shows the electrical connections to such motor, FIG. 17 is cross sectional view taken along lines A-A (56) of FIG. 15;

FIG. 19 shows a two phase drive signal 86 88 for actuating the piezo elements of motors 10, 30, 50, 142, 154, 230 and 300;

FIG. 20 through 25 show applications of the motor of FIG. 1 packaged and integrated with linear stages, wherein: FIG. 20 is a perspective view of the motor assembly, FIG. 21 is an exploded view of the motor assembly, FIG. 22 is a cross section view of the motor assembly, FIG. 24B shows the motor assembly integrated in a linear stage operating in the reverse direction and FIG. 25 shows the motor assembly integrated in a three-axis stage system;

FIGS. 26 through 29 illustrate a motor containing a piezoelectric tube with four outer electrodes which is similar to FIGS. 13 through 17 wherein: FIG. 26 is a perspective view of such motor, FIG. 27 is an exploded view of such motor, FIG. 28 is an end view of such motor, FIG. 29 is cross sectional view taken along lines A-A (130) of FIG. 28.

FIGS. 30 through 36 illustrate a motor containing four piezoelectric stacks in a planar arrangement wherein: FIG. 30 is a perspective view of such motor, FIG. 31 is an exploded view of such motor, FIG. 32 is an end view of such motor, FIG. 33 is cross section view taken along lines A-A (132) of FIG. 32, FIG. 34 shows the electrical connections to a single piezoelectric stack in such motor, FIG. 35 shows the electrical connections to the four stacks in such motor, and FIG. 36A through 36E are a schematic illustration of the orbital movement of threaded nut for such motor of FIG. 30 showing the rotation of the threaded shaft, which is similar to the dynamic operation shown in FIG. 18.

FIGS. 37 through 42 illustrate an optical alignment mechanism integrating a motor and lens wherein: FIG. 37 is a perspective view of the motor in FIG. 26 with a hollow shaft with a lens installed inside said shaft, FIG. 38 is an end view of such motor, FIG. 39 is a cross section view taken along lines A-A (134) of FIG. 38, FIG. 40 is a perspective view of the motor in FIG. 30 with a hollow shaft with a lens installed inside said shaft, FIG. 41 is an end view of such motor, and FIG. 42 is a cross section view taken along lines A-A (136) of FIG. 41;

FIGS. 43 through 45 illustrate a camera auto focus and auto zoom assembly integrating two optical alignment mechanisms shown in FIG. 40 with an focal plane imaging device wherein: FIG. 43 is a perspective view of the camera assembly, FIG. 44 is an end view of such assembly, and FIG. 45 is a cross section view taken along lines A-A (138) of FIG. 44.

FIGS. 46 through 48 illustrate a camera assembly, as shown in FIG. 43, where the optical lens are mounted on bearings with anti-rotation pins so that the lens translate but do not rotate wherein: FIG. 46 is a perspective view of the camera assembly, FIG. 47 is an end view of such assembly, and FIG. 48 is a cross section view taken along A-A (140) of FIG. 47;

FIG. 49 through 52 illustrate a motor, (similar to FIGS. 1 through 5), containing four rectangular piezoelectric plates fixedly attached to a central member whose entire internal length is comprised of engaged thread, wherein: FIG. 49 is a perspective view of such motor, FIG. 50 is an exploded view of such motor, FIG. 51 is an end view of such motor, FIG. 52 is a cross sectional view of motor taken along lines A-A (246) of FIG. 51;

FIG. 53 through 59B show an application of the motor of FIG. 49 packaged and integrated within an optical assembly providing automatic focus as used in digital cameras and mobile phones, wherein: FIG. 53 is a perspective view of the motor assembly packaged in an automatic focus lens assembly, FIG. 54 is a partial section view of the motor assembly package, FIG. 55 is an exploded view of the motor assembly package, FIG. 56 is a partial section view that depicts the motor assembly and the accompanying lens mechanism fully retracted, FIG. 57 is a partial section view illustrating how the motor assembly translates in a forward direction thus moving the lens mechanism accordingly, FIG. 58 is a partial section view demonstrating how the motor assembly can fully translate and maneuver the lens mechanism, FIG. 59A, a perspective view showing the motor assembly package of FIG. 53 integrated in a mobile phone, FIG. 59B is a magnified partial section scale view of the motor assembly package (247 on FIG. 59A);

FIG. 60 through 66 exhibit an application of the motor of FIG. 26 packaged and integrated within a dispensing syringe providing a means for controlled fluid dispensing as employed in medical fluid pumps, wherein: FIG. 60 is a perspective view of the motor assembly packaged in a syringe fluid dispensing system, FIG. 61 is a partial section view of the motor assembly package, FIG. 62 is an exploded view of the motor assembly package, FIG. 63 is a perspective view detailing the motor assembly fully retracted along with the plunger of the syringe, allowing fluid volume to remain internal to the syringe body, FIG. 64 is a perspective view of the motor assembly fully translated with its accompanying plunger, forcing all fluid volume from the syringe body, FIG. 65 is a perspective view of the motor assembly packaged within a medical fluid pump, FIG. 66 is a partial section view of FIG. 65 showing the motor assembly within the medical fluid pump housing; and FIG. 67A through 71D illustrate a tangent motion limiting feature that can be utilized on all motors contained herein, FIG. 67A shows a perspective view of a typical motor assembly with integrated tangent motion limiting feature in a non-engaged state, FIG. 67B is a magnified scale view of the tangent motion limiting feature (259 on FIG. 67A), FIG. 68A shows a perspective view of a typical motor assembly with integrated tangent motion limiting feature in an engaged state, FIG. 68B is a magnified scale view of the tangent motion limiting feature (266 on FIG. 68A), FIG. 71A through 71D depicts the stages of operation of the tangent motion limiting feature as the motor rotates and translates.

FIGS. 72, 73, and 74A through 74C illustrate a motor containing four rectangular piezoelectric plates fixedly attached to a central member attached to a printed circuit board as a means of electronic control and physical mounting and whose internal length is comprised of engaged thread, wherein: FIG. 72 is a perspective view of such motor, FIG. 73 is an exploded view of such motor, FIG. 74A is an end view of such motor, FIG. 74B is a cross sectional view of motor taken along lines F-F (333) of FIG. 74A illustrating a full length of engaged thread, FIG. 74C is a cross-sectional view of motor taken along lines F-F (333) of FIG. 74A illustrating a partial length of engaged thread;

FIGS. 75, 76, 76A, 77, 78A through 78C, 79A through 79C, and 80A through 80B show an application of the motor of FIG. 72 packaged and integrated into a camera assembly providing automatic focus and optical zoom functions similar to those used in digital cameras and in mobile phone cameras, wherein: FIG. 75 is a perspective view of the camera assembly integrating automatic focus and optical zoom lens assembly, FIG. 76 is a partial section view of the camera assembly package, FIG. 76a is a partially exploded perspective view of the camera assembly package of FIG. 76, FIG. 77 is an exploded view of the camera assembly package, FIG. 78A is a partial section view of the camera assembly with the optical zoom lens fully retracted, FIG. 78B is a partial section view of the camera assembly with the optical zoom lens partially extended, FIG. 78C is a partial section view of the camera assembly with the optical zoom lens fully extended, FIG. 79A is a partial section view of the camera assembly with the auto focus lens assembly fully retracted, FIG. 79B is a partial section view of the camera assembly with the auto focus lens partially extended, FIG. 79C is a partial section view of the camera assembly with the accompanying auto focus lens fully extended, FIG. 80A is a perspective view showing a typical application and packaging of the camera assembly of FIG. 75 integrated in a mobile phone, FIG. 80B is a magnified partial section scale view of the camera assembly (330 on FIG. 80A);

FIGS. 81 through 90 illustrate several embodiments of electronic drive circuits for motors 10, 30, 50, 142, 154, 230 and 300. The requirements for drive signals are illustrated in FIG. 19 showing two phases 86, 88 that connect to the piezo elements of motors, for example 18, 20, 22 and 24;

FIGS. 81 through 90 illustrate the theory and implementation of a series resonant circuit using square wave (Pulse Width Modulated—PWM) input signals;

FIG. 81 shows a single phase series resonant circuit;

FIG. 82 shows a square wave (PWM) signal that, in one embodiment, is used as the input to the series resonant circuit;

FIG. 83 shows the relationship between duty cycle of the PWM signal and the peak to peak output voltage (Vout) at a fixed frequency;

FIG. 84 illustrates one embodiment of a half bridge circuit combined with the series resonant circuit;

FIG. 85 illustrates one embodiment of a full bridge circuit that combines two half bridge circuits with a series resonant circuit;

FIG. 86 illustrates one embodiment of a complete resonant motor drive circuit that generates two drive signals 86, 88;

FIG. 87 illustrates one embodiment of PWM processing circuit 531 that produces phase shift and direction control;

FIG. 88 illustrates examples of PWM signals for various speeds and directions;

FIG. 89A illustrates an additional example of PWM signal in a burst mode that is used to control motor speed by rapidly turning the motor on and off;

FIG. 89B illustrates an additional example of PWM signal that is used to control motor speed using duty cycle to change voltage amplitude; and FIG. 90 illustrates one embodiment of a closed-loop control system combining motor, position sensor, motor drive circuit and PID control loop.

DESCRIPTION OF THE PREFERRED EMBODIMENTS

Figure 1:
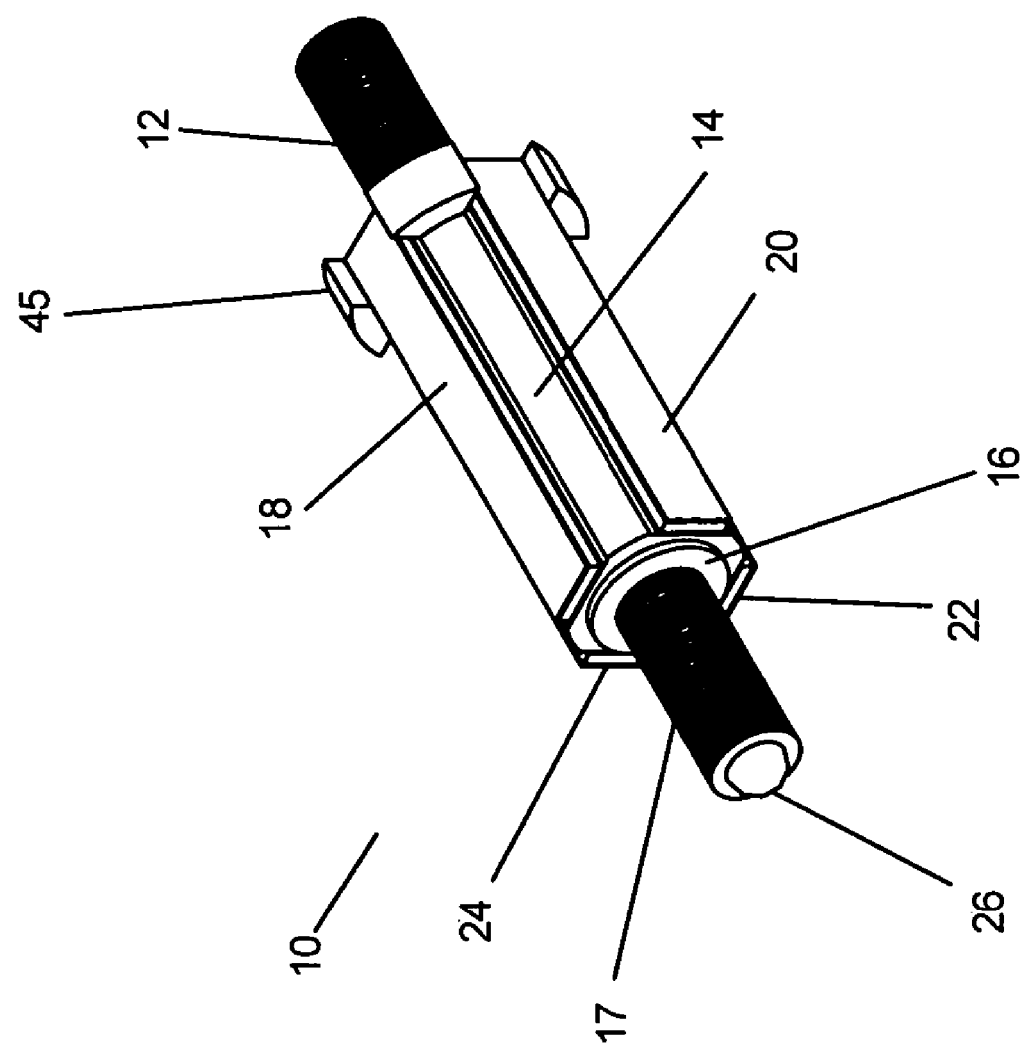

In the first part of this specification, applicant will describe a miniature ultrasonic linear motor. In the second part of this specification, applicant will describe an optical assembly comprised of an optical device connected to such motor.

In one embodiment of this invention, a miniature ultrasonic linear motor rotates a lead screw to produce linear movement. A cylinder supports a threaded nut with a first bending mode resonant frequency in the ultrasonic range. The cylinder and nut are excited at this resonant frequency by transducers that cause the nut to orbit at the end of the cylinder. The transducers may be piezoelectric, electrostrictive, electrostatic, electromagnetic or any device that can stimulate the resonant vibration. At least two transducers are required to simultaneously excite the orthogonal bending modes of the cylinder with a plus or minus 90-degree phase shift and create a circular orbit. A close-fitting threaded shaft is installed inside the nut. A resilient axial load is applied to the shaft through a low friction coupling. The nut orbits at its resonant frequency, and the shaft's inertia keeps it centered. The orbit of the nut generates torque that rotates the shaft and creates linear movement. At least two alternating current drive signals are required for the transducers. The drive frequency must excite the mechanical frequency and control phase to achieve a circular nut orbit. Modulation of drive signal amplitude and duration control velocity. Phase shift between the drive signals may be positive or negative, which reverses the direction of the nut orbit and the shaft rotation/translation. This embodiment, and other preferred embodiments, will be described in greater detail in the remainder of this specification.

Without wishing to be bound to any particular theory, applicant believes that the operating principle of one of his ultrasonic linear actuators is the excitation of the first bending resonance of a cylindrical tube, which causes one or both ends of the tube to orbit around the cylindrical axis without rotating. In this embodiment, one end of the tube houses a threaded nut that also orbits around a mating threaded shaft and imparts a tangential force via friction thus rotating the threaded shaft as it orbits. The friction in the threads is helpful because it directly drives the screw. This is in strong contrast to conventional lead screw drives, where the thread contact friction is parasitic and creates windup, backlash and slow response. Another significant advantage of helical threads used in this embodiment is the direct conversion of rotation to translation with large mechanical advantage, which magnifies axial force and reduces linear speed and, as a result, increases precision.

In this embodiment, a transducer both either within or outside of the load path is preferably used to excite the first bending mode. Examples of transducers that can be used are, e.g., piezoelectric elements and stacks, magnetostrictive materials, and electrostatic materials to name a few. This list does not include all transducer materials, but it should be understood that any such material or mechanism that could be used to excite the first bending resonance of a cylindrical tube or similarly shaped block and achieve the orbit of one or both tube ends is embodied in this patent. The embodiments described herein use piezoelectric material but could just as easily be embodied with an alternate transducer material described above.

Referring to FIGS. 1 through 6, and in the preferred embodiment depicted therein, an ultrasonic linear motor 10 is depicted. In the embodiment depicted, four rectangular piezoelectric plates are used to generate ultrasonic vibrations. In another embodiment, not shown in FIG. 1, other means may be used to generate ultrasonic vibrations.

As used in this specification, the term ultrasonic refers to an operating frequency in excess of 20,000 Hertz. In one embodiment, the operating frequency is at least about 25,000 Hertz. In another embodiment, the operating frequency is at least about 50,000 Hertz. In yet another embodiment, the operating frequency is at least about 100,000 Hertz.

As used in this specification, the term linear motor refers an actuator that produces movement in a substantially straight line by generating force and/or displacement. Reference may be had, e.g., to U.S. Pat. No. 5,982,075 (ultrasonic linear motor), U.S. Pat. No. 5,134,334 (ultrasonic linear motor), U.S. Pat. No. 5,036,245 (ultrasonic linear motor), U.S. Pat. No. 4,857,791 (linear motor), and the like. The entire disclosure of each of these United States patents is hereby incorporated by reference into this specification.

Referring again to FIGS. 1 through 6, and in the preferred embodiment depicted therein, it will be seen that a threaded shaft 12 with a spherical ball tip 26 rotates and produces axial force and motion The threaded shaft 12 is preferably movably disposed within a housing 14. The length 15 of threaded shaft 12 (see FIG. 5) preferably exceeds the length 13 of housing 14 by at least about 10 millimeters. In one embodiment, length 15 exceeds length 13 by at least 25 millimeters. In another embodiment, length 15 exceeds length 13 by at least 50 millimeters.

In one embodiment, the threaded shaft 12 has a first natural frequency that is less than about 0.2 times as great as the first natural frequency of the housing 14. In another embodiment, the first natural frequency of the threaded shaft 12 is less than about 0.1 times as great as the first natural frequency of the housing 14.

As used herein, the term first natural frequency refers to frequency of the first normal mode of vibration; see, e.g., page 1253 of the McGraw-Hill Dictionary of Scientific and Technical Terms, Fourth Edition (McGraw-Hill Book Company, New York, N.Y., 1989. Reference also may be had to pages 5-59 to 5-70 ("Natural Frequencies of Simple Systems) of Eugene A. Avallone et al.'s "Mark's Standard Handbook for Mechanical Engineers" (McGraw-Hill Book Company, New York, N.Y., 1978). Reference also may be had to U.S. Pat. Nos. 6,125,701, 6,591,608, 6,525,456, 6,439,282, 6,170,202, 6,101,840, and the like; the entire disclosure of each of these United States patents is hereby incorporated by reference into this specification.

Figure 18:
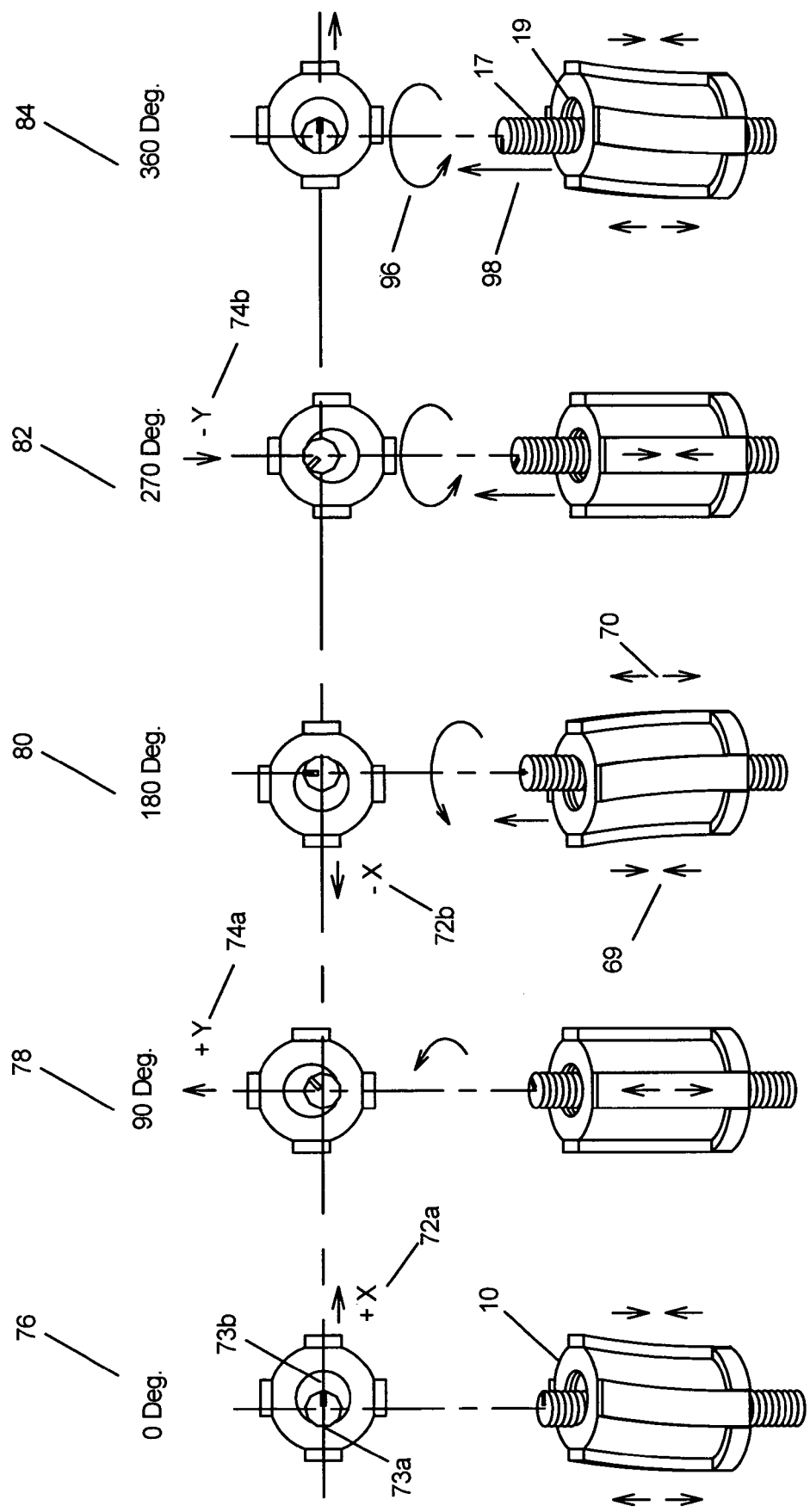
FIG. 18 is a schematic illustration of the orbital movement of threaded nut for the motor of FIG. 1 showing the rotation and translation of the threaded shaft.

In the embodiment depicted in the Figures, an orbital movement of nut 16 is created by the presence of two normal modes of vibration that are acting orthogonal to each other in planes parallel to the axis centerline (see FIG. 2), as is best illustrated in FIG. 18. These two orthogonal normal modes of vibration are provided by the interaction of the activated transducers (such as, e.g., plates 18, 20, 22, and 24) and the housing 14; and such interaction causes orbital movement of the nut 16 which, in turn, causes rotation and translation of threaded shaft 12.

In one embodiment, the first natural resonance frequency of nut 16 is preferably at least five times as great as the operating frequency of motor assembly 10. It is thus preferred that nut 16 be a substantially rigid body.

In one embodiment, the threaded shaft 12 is fabricated from metal that is substantially stainless steel. In this embodiment, the threaded shaft 12 engages with a threaded nut 16 which, is fabricated from metal that is substantially brass.

As will be apparent, it is preferred to use combinations of materials for the threaded shaft 12 and the threaded nut 16 so that abrasion and galling are minimized. Other combinations of materials that will also minimize such abrasion and galling may be used in the invention.

Referring again to FIG. 1, it will be seen that threaded shaft 12 is comprised of a multiplicity of threads 17, preferably in the form of a helical groove. In one embodiment, the threads 17 have a pitch lower than about 250 threads per inch and, preferably, less than about 200 threads per inch. In another embodiment, the threads 17 have pitch lower than about 100 threads per inch. In one aspect of this embodiment, the threads 17 have a pitch of from about 40 to about 80 threads per inch.

The threads 17 are preferably engaged with interior threads 19 of nut 16, as is best illustrated in FIG. 18 (also see FIG. 36). In one preferred embodiment, the pitch of interior threads 19 is substantially equal to the pitch of exterior threads 17.

Although, for the purposes of simplicity of illustration, the threads 17 and 19 are shown totally engaged, (except for FIGS. 5A, 5B, 18 and 36) there is preferably a diametrical clearance between threads 17 and 19 of less than about 0.5 times the thread depth 33/35 of threads 17 and/or threads 19. This diametrical clearance is best illustrated in FIG. 5A. Means for determining this diametrical clearance are well known. Reference may be had, e.g., to U.S. Pat. Nos. 6,145,805, 5,211,101, 4,781,053, 4,277,948, 6,257,845, 6,142,749, and the like; the entire disclosure of each of these United States patents is hereby incorporated by reference into this specification. Reference also may be had, e.g., to pages 8-9 et seq. ("Machine Elements") of the aforementioned "Marks Standard Handbook for Mechanical Engineers."

Referring to FIG. 5A, one preferred mode of engagement between threads 17 and 19 is illustrated. As will be seen from this Figure, each of threads 17 has a tip 29, and each of threads 19 has a tip 31. Additionally, each of threads 17 and 19 has a thread depth, 33 and 35, respectively.

Referring again to FIG. 1, and in the preferred embodiment depicted therein, it will be seen that rotation of the threaded shaft 12 is produced by ultrasonic orbits of the threaded nut 16 connected to a vibrating housing 14. In the embodiment depicted, the threaded nut 16 is preferably connected to the housing 14. This is best illustrated in FIG. 2.

Figure 2:
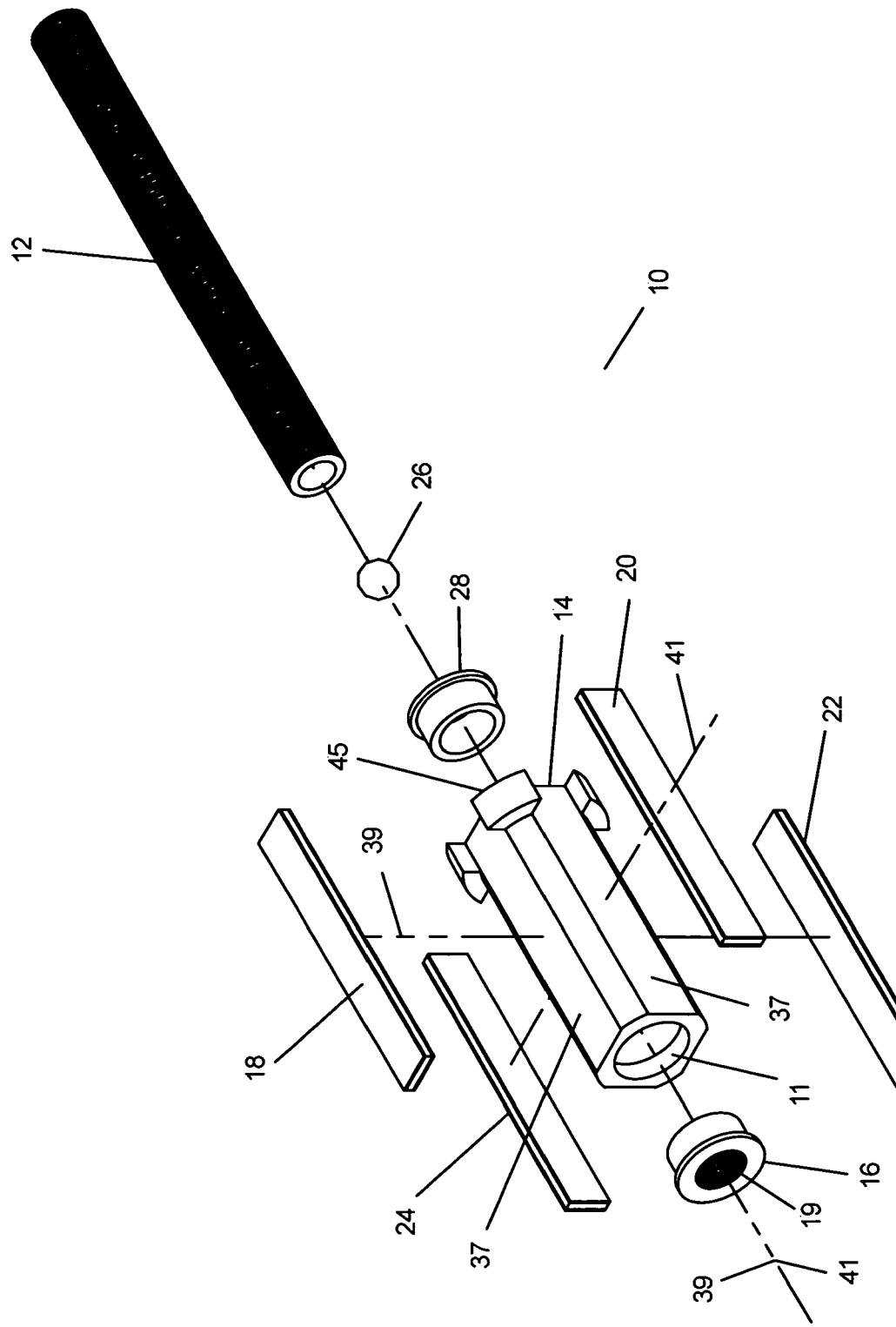
Figure 3:
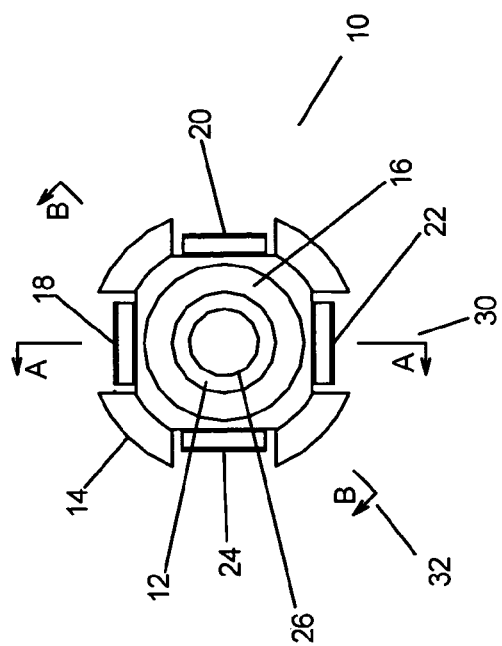

Referring to FIG. 2, and in the preferred embodiment depicted therein, it will be seen that nut 16 is disposed within orifice 11. The nut 16 is secured within orifice 11 by conventional means such as, e.g., a press fit, and/or adhesive means, etc.

In the preferred embodiment depicted in FIGS. 1 and 2, nut 16 is a cylindrical nut. In another embodiment, not shown, nut 16 is a polygonal nut that may have a square shape, a hexagonal shape, an octagonal shape, etc.

Referring again to FIGS. 1 and 2, and in the preferred embodiment depicted therein, it will be seen that a multiplicity of ceramic plates 18 et seq. are attached to the outside surface 37 of the housing 14.

It is preferred that the ceramic plates 18 et seq. change their respective lengths upon being subjected to a electrical voltage and, in particular, to a change in electrical voltage. As used therein, and as is described elsewhere in this specification, these ceramic plates may be described as "active ceramic plates." In one embodiment, the active ceramic plates 18 et seq. are selected from the group consisting of piezoelectric plates, electrostrictive plates, and mixtures thereof. For the sake of simplicity of discussion, the embodiments of at least FIGS. 1 and 2 will be described with reference to piezoelectric plates.

Figure 4:
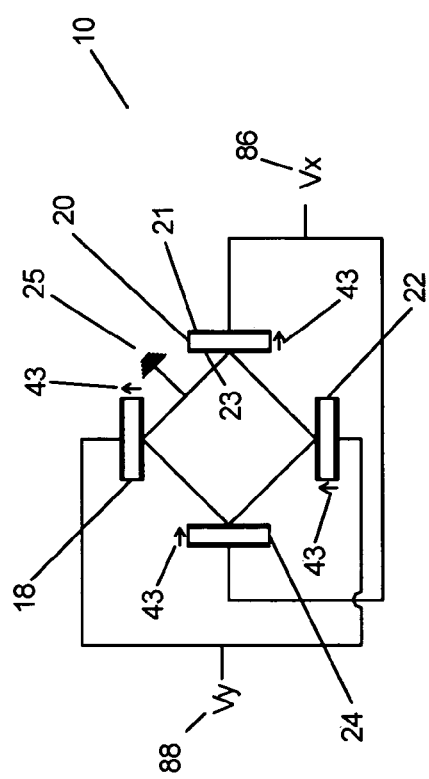
Figure 5:
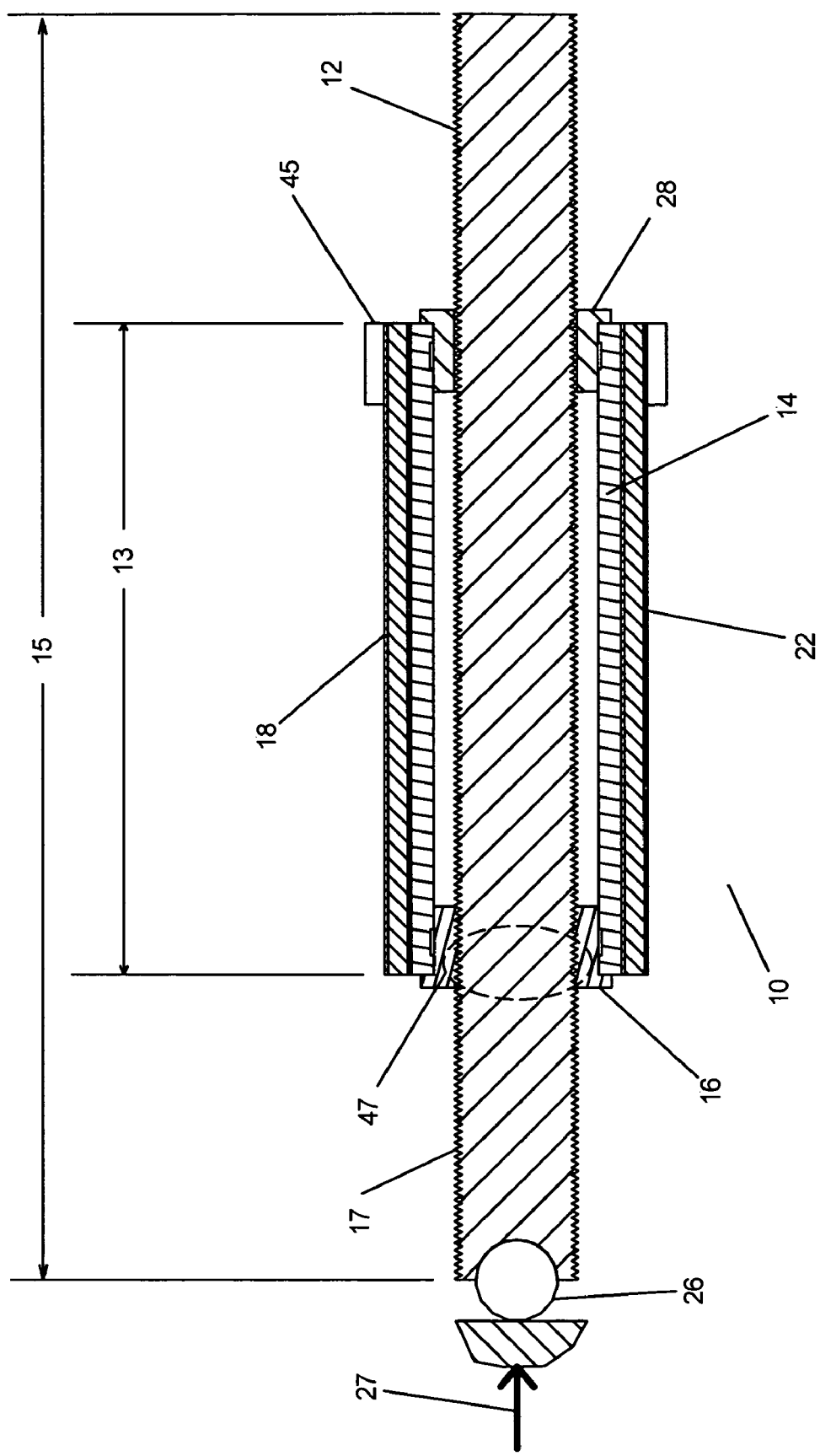
Figure 6:
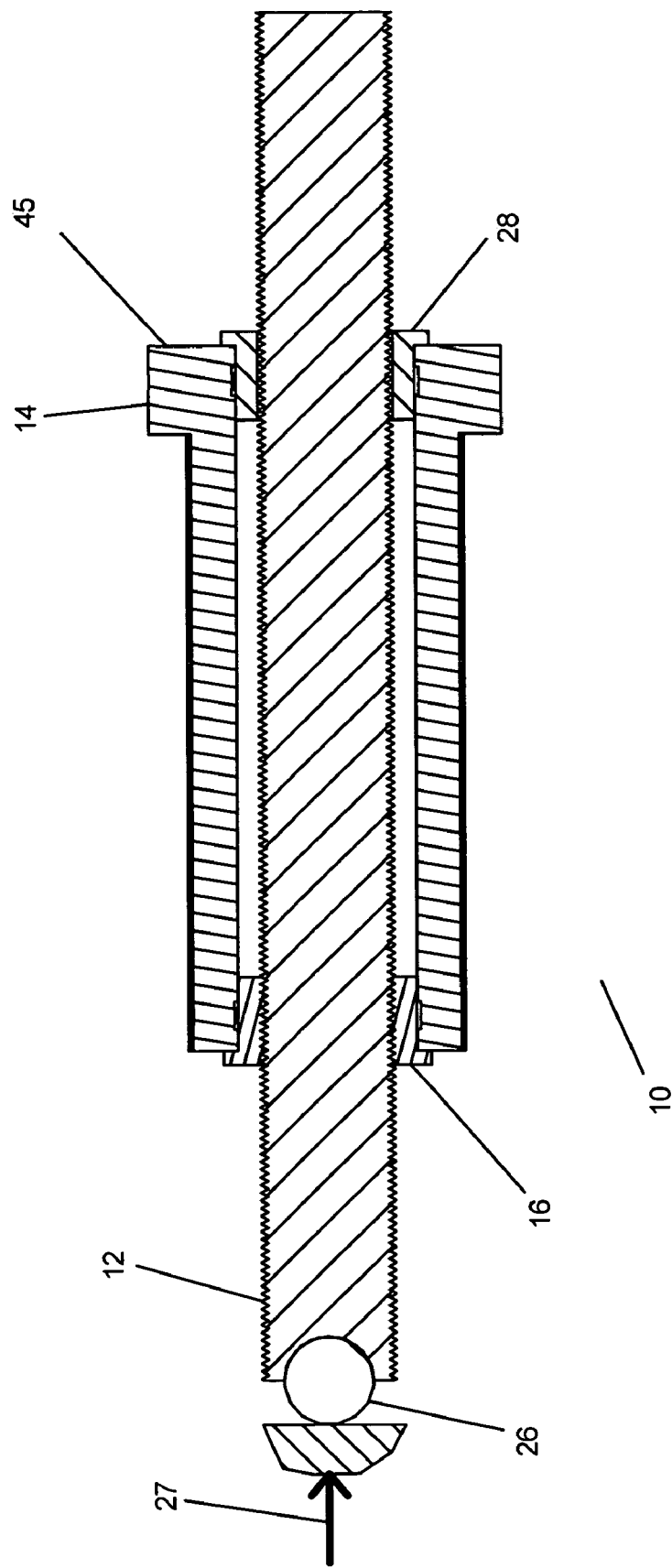
Figure 7:
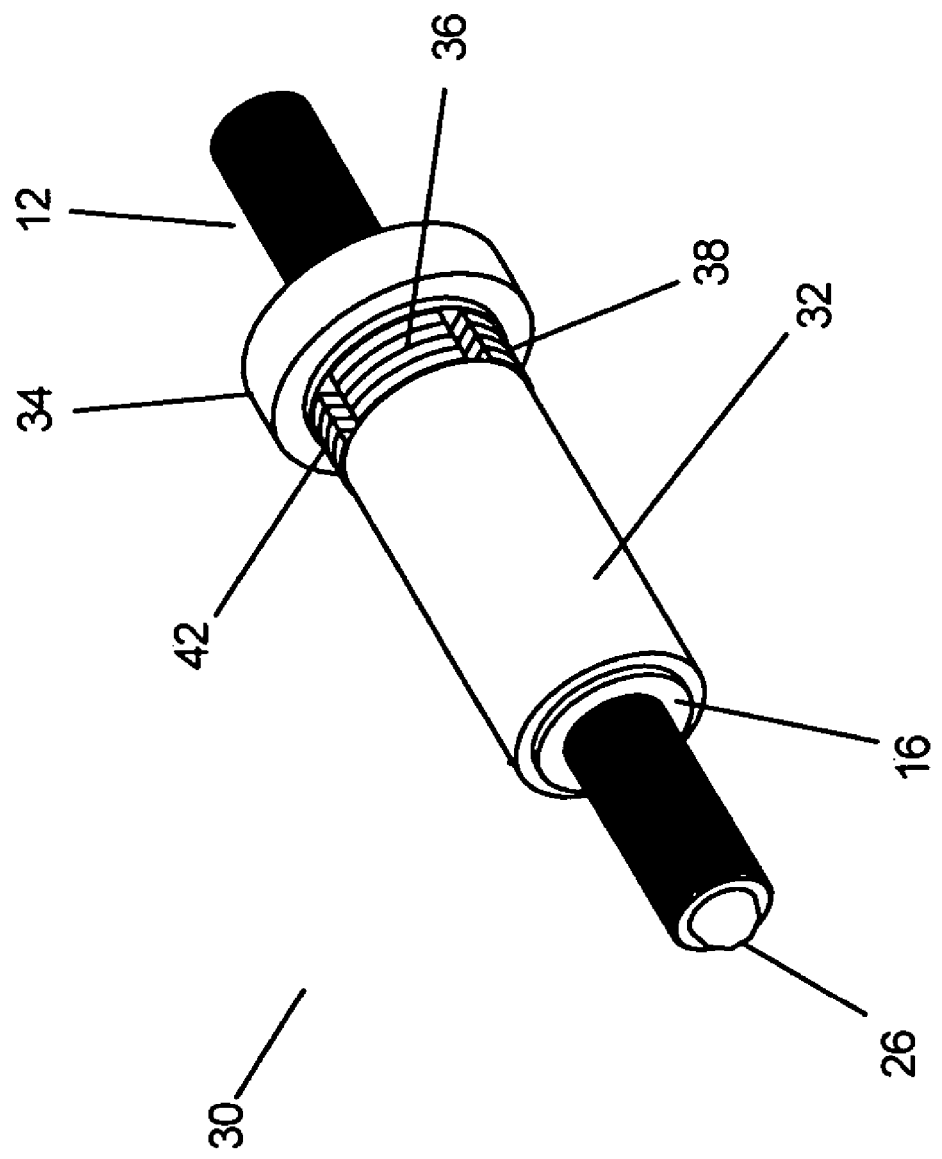
Figure 8:
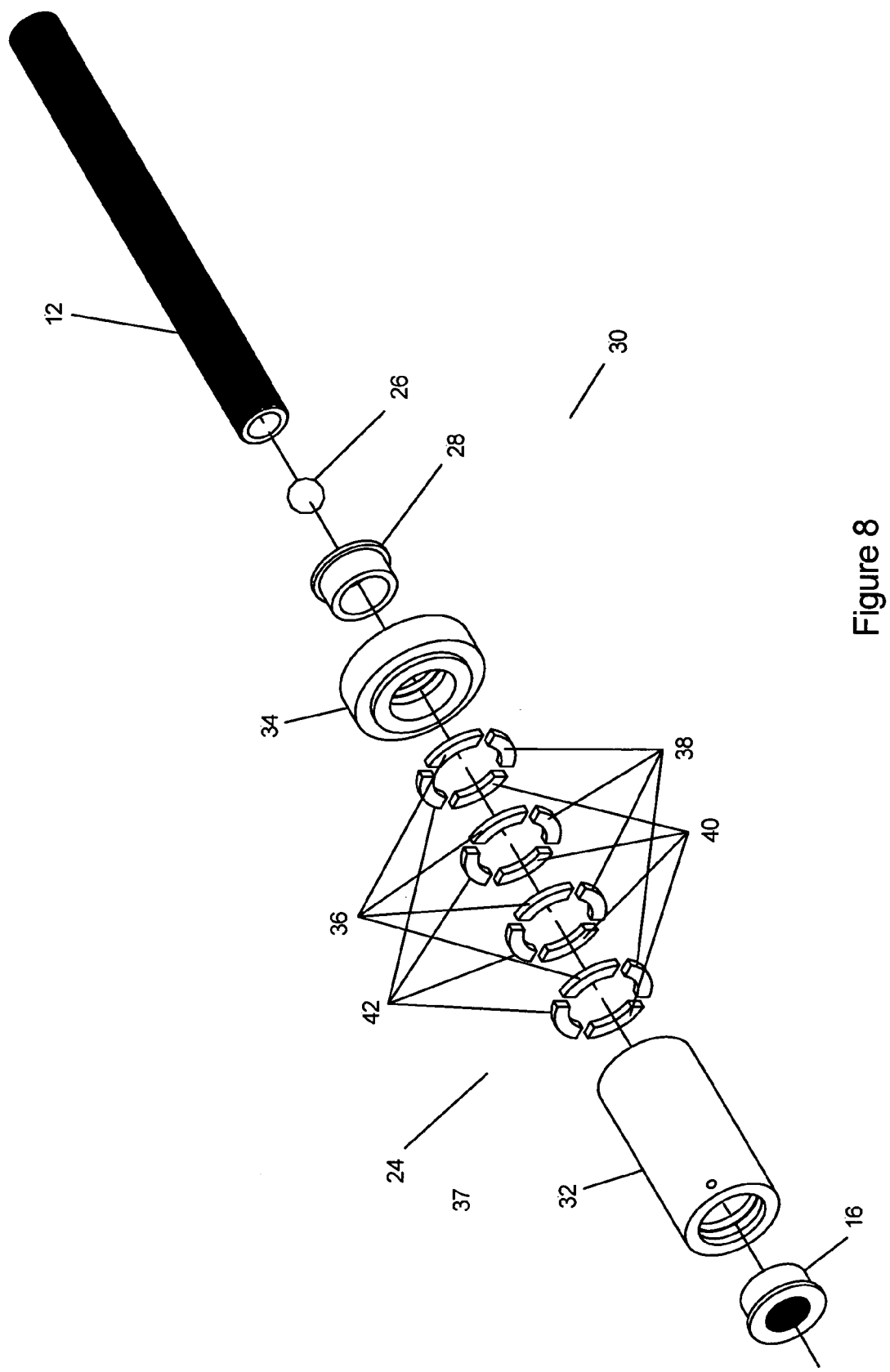
Figure 9:
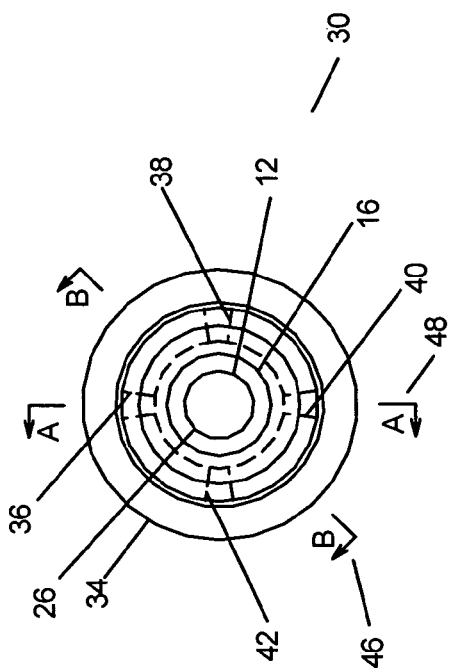
Figure 10:
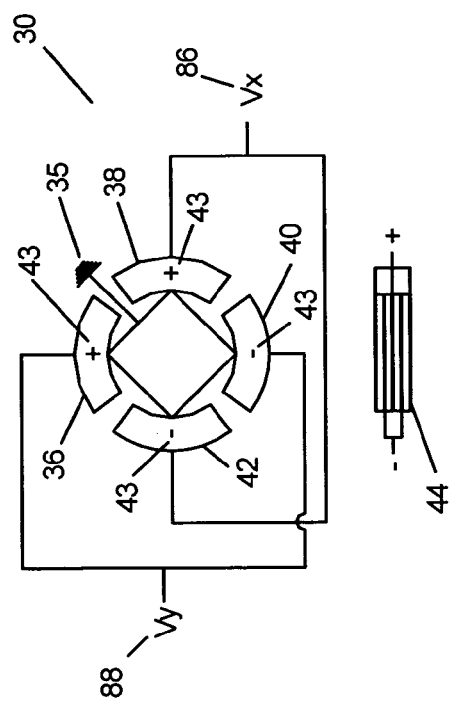
Figure 11:
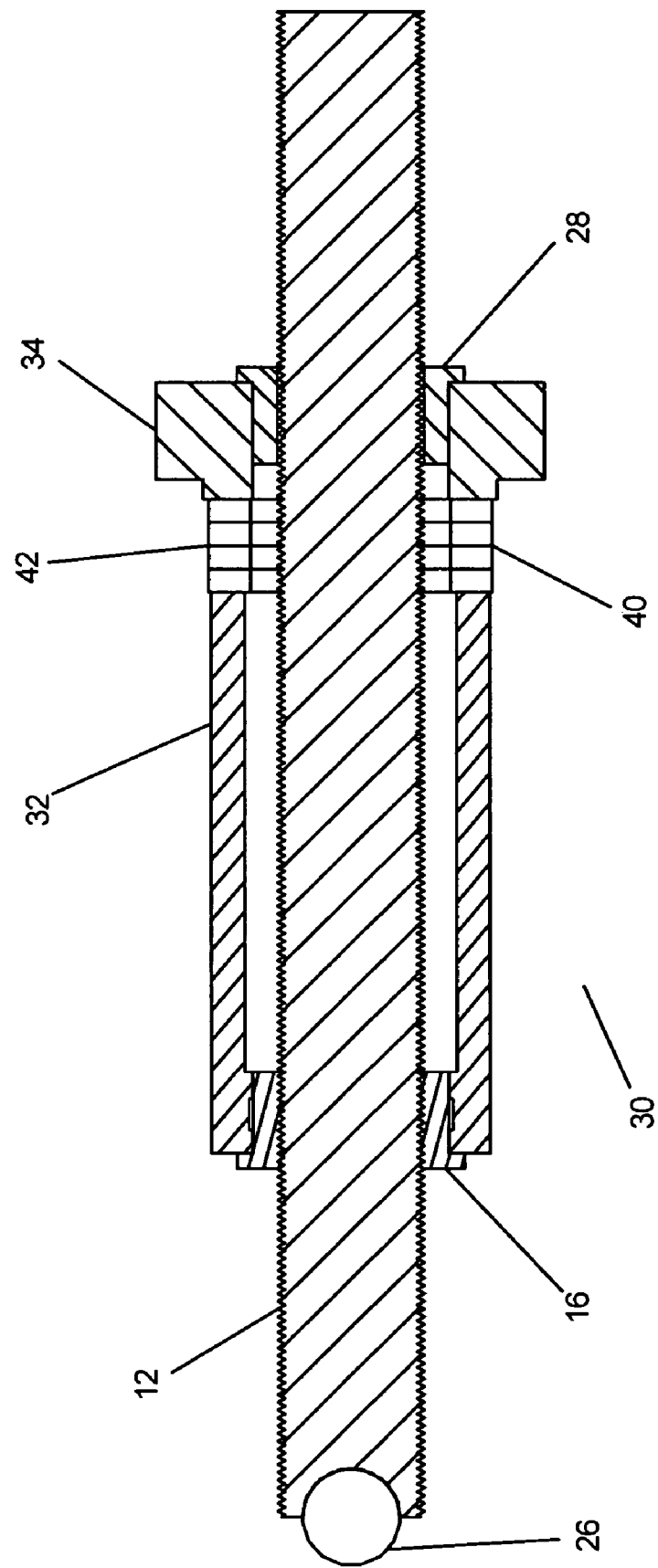
Figure 12:
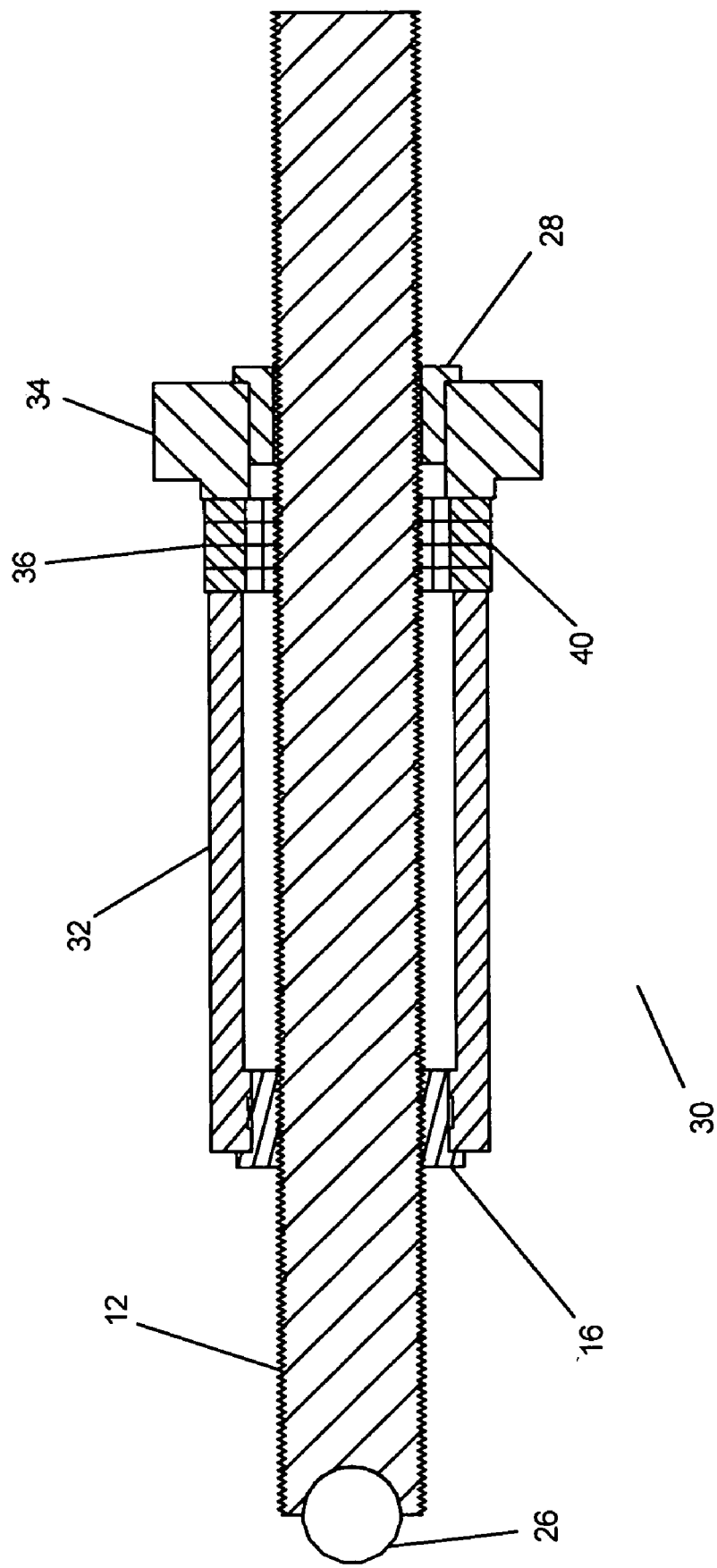
Figure 13:
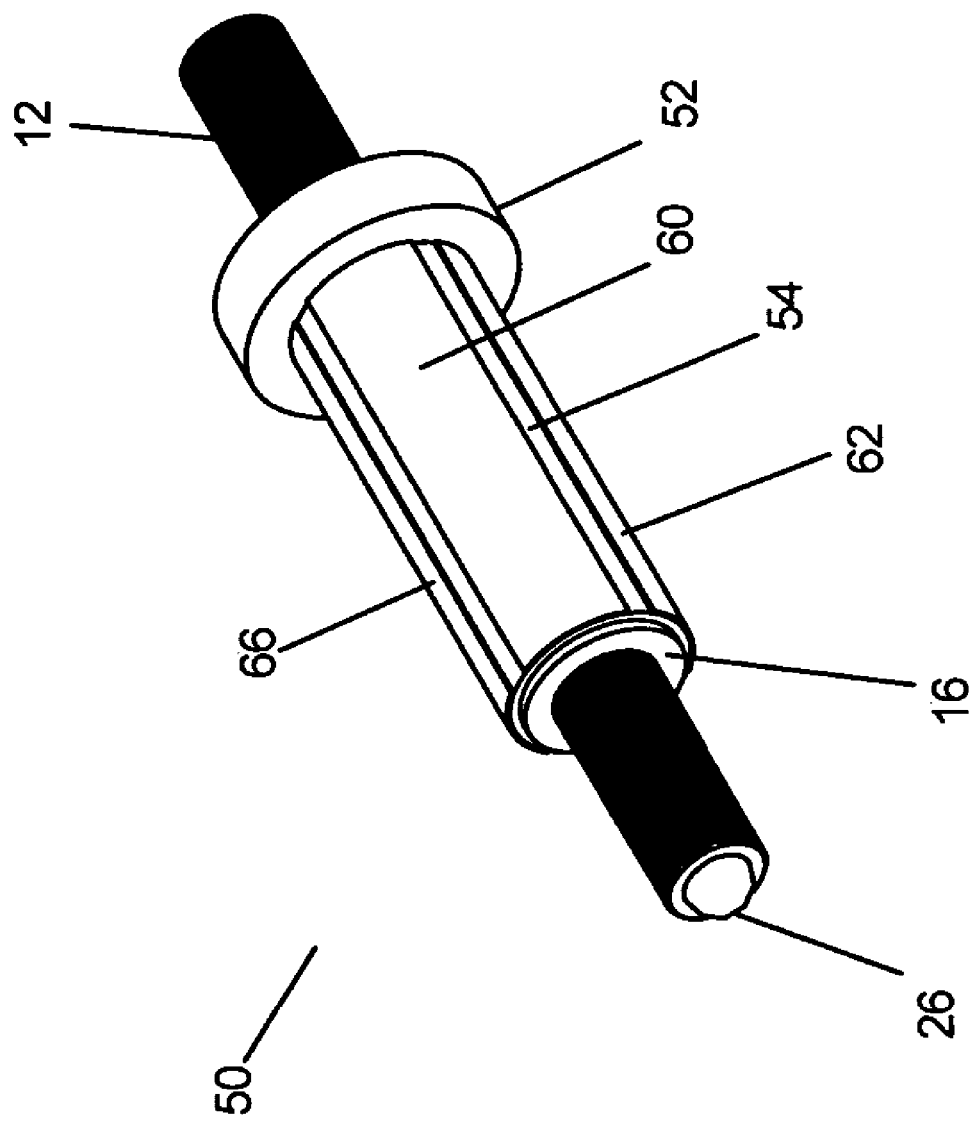
Figure 14:
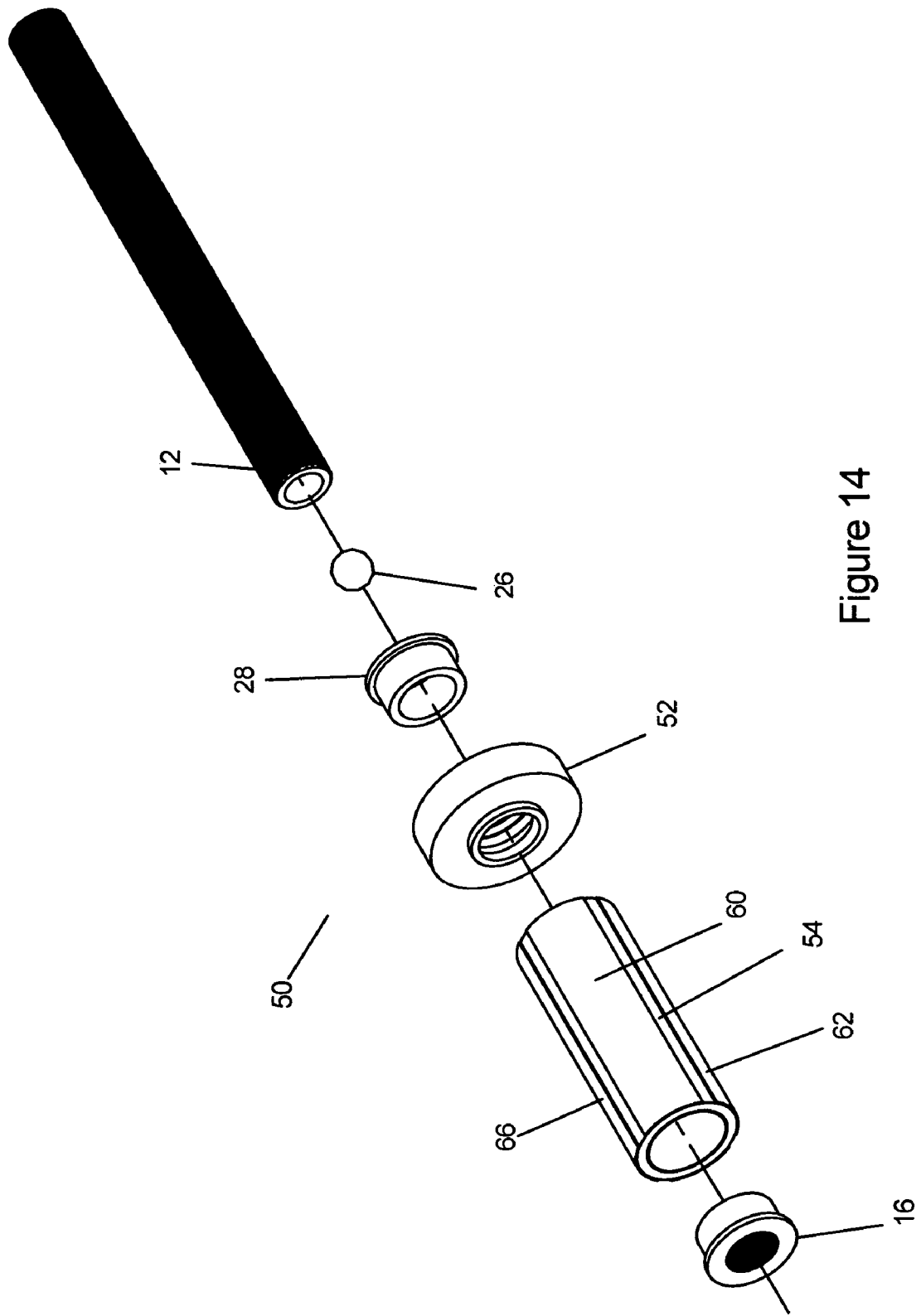
Figure 15:
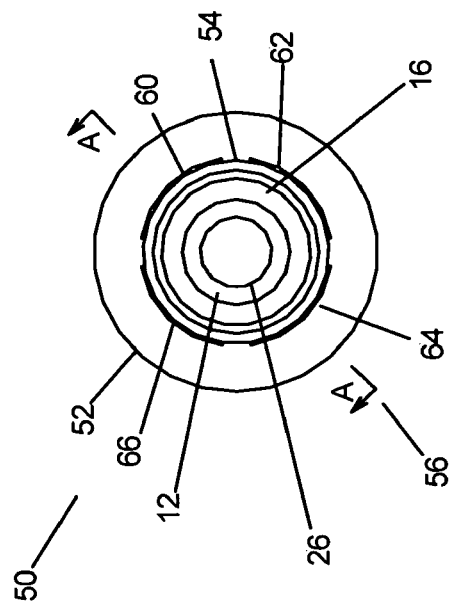
Figure 16:
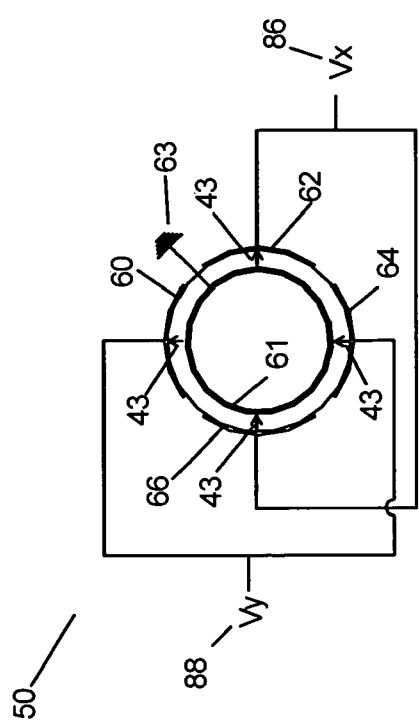
Figure 17:
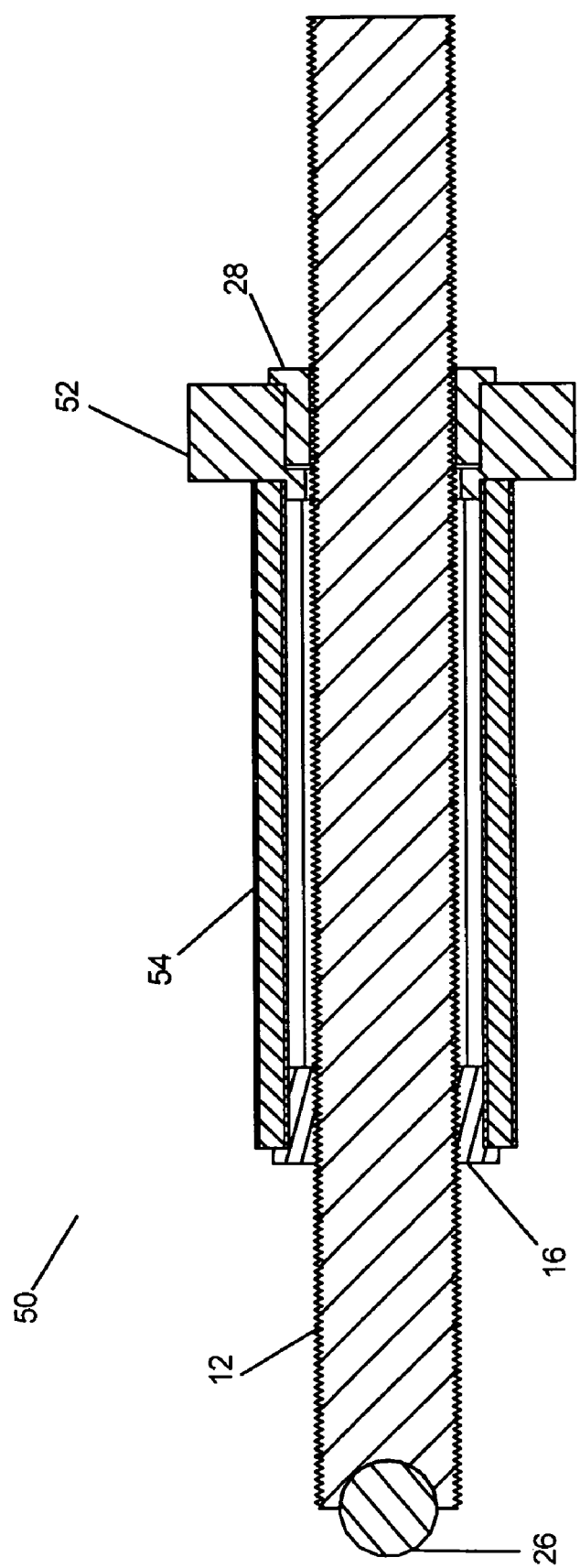

In the embodiment depicted in FIG. 2, four piezoelectric plates 18, 20, 22, and 24 are bonded to the outside surface 37 of the housing and generate the nut 16 orbital vibrations when excited by alternating electrical drive signals on electrodes 21 and 23 on each piezoelectric plate (see FIG. 4).

In one embodiment, only two such piezoelectric plates are used, plates 18 and 20. In another embodiment, eight or more piezoelectric plates are used. Regardless of how many such piezoelectric plates are used, a sufficient number of such plates are used to excite motion in orthogonal planes 39 and 41 (see FIG. 2).

For the sake of simplicity of representation, four piezoelectric plates 18, 20, 22, and 24 will be discussed. These plates are preferably bonded to the corresponding exterior surfaces 37 of housing 14 so that the plates are completely contiguous with such exterior surfaces 37.

The piezoelectric plates 18 et seq. are connected to a source of electrical voltage by electrodes 21 and 23, as is best shown in FIG. 4. As will be apparent, and for the sake of simplicity of representation, the connection of electrodes 21 and 23 is shown only with reference to piezoelectric plate 20, it being understood that comparable connections are made with respect to the other piezoelectric plates.

Referring to FIG. 4, and to the preferred embodiment depicted therein, it will be seen that all four inside electrodes 23 are connected to ground 25. In this embodiment, the piezoelectric material is a commonly available "hard" composition with low dielectric losses and high depoling voltage. Thus, for example, one may use a piezoelectric material sold as "PZT-4" by the Morgan Matroc company of Bedsford, Ohio. This preferred material typically has several important properties.

Thus, the preferred material preferably has a dielectric loss factor of less than about 1 percent at a frequency greater than about 20,000 Hertz and, preferably, less than about 0.5 percent. In one embodiment, the dielectric loss factor is about 0.4 percent at a frequency greater than about 20,000 Hertz.

Thus, the preferred material has a $d_{33}$ piezoelectric charge coefficient of at least about 250 picoCoulomb/Newton's and, preferably, at least about 270 picoCoulomb/Newton's. In one embodiment, the preferred material has a $d_{33}$ piezoelectric charge coefficient of about 285 picoCoulomb/Newton's.

Thus, the preferred material has a $d_{31}$ piezoelectric charge coefficient of at least about —90 picoCoulomb/Newton's and, more preferably, at least about −105 picoCoulomb/Newton's. In one embodiment, the $d_{31}$ piezoelectric charge coefficient is about −115 picoCoulomb/Newton's.

In one embodiment, the preferred material is a single crystal material with a $d_{33}$ piezoelectric charge coefficient of at least about 2500 picoCoulomb/Newton's, and a $d_{31}$ piezoelectric charge coefficient of at least about 900 picoCoulomb/Newton's For a discussion of some suitable materials, and by way of illustration and not limitation, reference may be had, e.g., to U.S. Pat. Nos. 3,736,532 and 3,582,540. The entire disclosure of each of these United States patents is hereby incorporated by reference into this specification.

By way of further illustration, and as is known to those skilled in the art, low dielectric-loss piezoelectric materials are known to those skilled in the art. Reference may be had, e.g., to U.S. Pat. No. 5,792,379 (low-loss PZT ceramic composition); the entire disclosure of this United States patent is hereby incorporated by reference into this specification.

In one embodiment, the piezoelectric material is a single crystal piezoelectric material. These materials are known in the art. Reference may be had, e.g., to U.S. Pat. Nos. 5,446,330, 5,739,624, 5,814,917, 5,763,983 (single crystal piezoelectric transformer), 5,739,626, 5,127,982, and the like. The entire disclosure of each of these United States patents is hereby incorporated by reference into this specification.

Referring again to FIG. 4, and in the preferred embodiment depicted therein, the axial length of the piezoelectric plates 18, 20, 22, and 24 changes in proportion the applied voltage (Vx/86 and Vy/88) and the $d_{31}$ piezoelectric charge coefficient.

As will be apparent, piezoelectric plates 18,22 and 20,24 work together in pairs, respectively, to bend the housing 14 (see, e.g., FIGS. 1 and 2) and excite the orbital resonance. Alternating electric drive signals 86 and 88 are preferably applied to plates 20,24 and 18,22, respectively, with poling directions 43. As is well known to those skilled in the art, poling directions 43 are the directions in which the dipoles in the piezoelectric material are aligned during manufacture. Reference may be had, e.g., to U.S. Pat. Nos. 5,605,659 (method for poling a ceramic piezoelectric plate), 5,663,606 (apparatus for poling a piezoelectric actuator), 5,045,747 (apparatus for poling a piezoelectric ceramic), and the like. The disclosure of each of these United States patents is hereby incorporated by reference into this specification.

For each plate pair 18, 22 and 20,24 the electric field is positive with respect to the poling direction 43 on one plate and negative with respect to the poling direction 43 on the opposite plate. Drive signal Vx 86 is preferably applied to plates 20, 24 and produces simultaneous expansion on one plate and contraction on the opposite plate and thus bends the housing 14 in the plane 39 (see FIG. 2), and in the X direction 72a/72b (see FIG. 18). In a similar manner the drive signal Vy 88 is applied to plates 18,22 and bends the housing 14 in the plane 41 (see FIG. 2), and in the Y direction 74a/74b (see FIG. 18).

The housing end 45 opposite the threaded nut 16 preferably supports a guide bushing 28 with a small clearance between the bushing inside diameter and the outside diameter of the threaded shaft 12 (see FIG. 2). The threaded shaft 12 supports a resilient axial force 27 (see FIGS. 5 and 6) that is applied via the spherical ball tip 26 using a hard flat surface that produces low friction.

It is preferred that, during the operation of the motor 10, the axial force 27 that is preferably transmitted through ball 26 be from about 0.1 to about 100 Newton's. As will be apparent, the axial force 27 preferably is of similar magnitude to the output driving force.

The spherical ball 26 (see FIG. 2) is one means of coupling threaded shaft 12 to its load 27 (see FIG. 5) with low frictional torque. As will be apparent to those skilled in the art, one may use other means for coupling motion from a rotating threaded shaft to a moving load. Thus, e.g., one may use a rolling element bearing, one may use an arcuate load contiguous with a flat surface on threaded shaft 12, etc. Reference may be had, e.g., to U.S. Pat. No. 5,769,554 (kinematic coupling method), U.S. Pat. No. 6,325,351 (highly damped kinematic coupling for precision instruments), etc.; the entire disclosure of each of these United States patents is hereby incorporated by reference into this specification.

Figure 21:
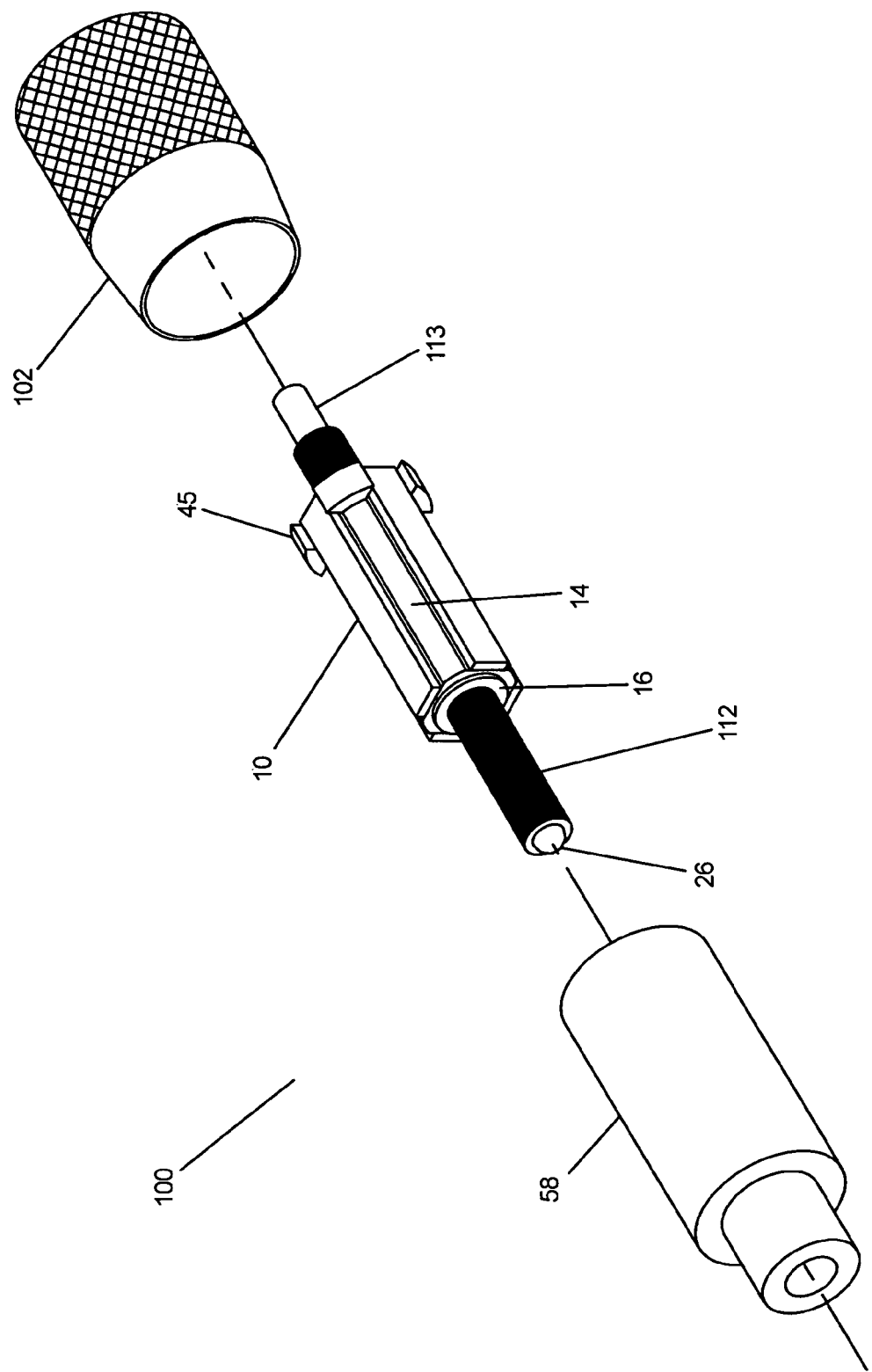

Referring to FIGS. 1 and 2, the end 45 of the housing 14 opposite the threaded nut 16 incorporates flanges that are the connection point for a stationary cover 58 (FIG. 21). The thread pitch on the shaft 12 and on the nut 16 converts the orbital tangential force and movement to axial force and movement. The pitch may be selected to optimize the force magnification, speed reduction, resolution enhancement and off-power holding force.

Referring to FIGS. 7 through 12, and in the preferred embodiment depicted therein, the ultrasonic linear motor 30 preferably uses four piezoelectric stacks 36, 40 and 42 (also see FIGS. 7 and 8) to generate ultrasonic vibrations. A threaded shaft 12 with a spherical ball tip 26 rotates and produces axial force and motion. The rotation is produced by an ultrasonic orbits of the threaded nut 16 connected to a vibrating cylinder 32. Four piezoelectric stacks 36, 38, 40, and 42 are bonded to the end of the cylinder opposite the threaded nut and bonded to the base ring 34. The four stacks 36 et seq. are constructed using well-known assembly and electrical interconnection methods 44 with the inside stack leads preferably being connected together to a common ground 35. The axial length of the stacks 36 et seq. changes in proportion to the applied voltage and the $d_{33}$ piezoelectric charge coefficient. The piezoelectric material is a commonly available "hard" composition with low dielectric losses and high depoling voltage. Alternating electrical drive signals 86 and 88 are connected to the outside leads of each piezoelectric stack 44 and excite orbital vibrations of the nut. Piezoelectric stacks 36 and 40 and 38 and 42 work together in pairs, respectively, to rotate the tube and excite the orbital resonance. Alternating electric drive signals Vx 86 and Vy 88 are applied to stacks 38, 42 and 36, 40, respectively, with poling directions 43. For each stack pair 38, 42 and 36, 40, the electric field is positive with respect to the poling direction 43 on one stack and negative with respect to the poling direction on the opposite stack. Drive signal Vx 86 is applied to stacks 38, 42 and produces simultaneous expansion on one stack and contraction on the opposite stack; and thus it rotates the tube in the X direction 72a/72b (see FIG. 18). In a similar manner, the drive signal Vy 88 is applied to stacks 36, 40 and moves the end of the tube in the Y direction 74a/74b (see FIG. 18). The base ring 34 opposite the threaded nut 16 supports a guide bushing 28 with a small clearance between the bushing inside diameter and the outside diameter of the threaded shaft. The threaded shaft 12 supports a compliant axial force 27 that is applied via the spherical ball tip 26 using a hard flat surface that produces low friction. The base ring 34 is the connection point for a stationary cover 58 (FIG. 21). The thread pitch on the shaft 12 and nut 16 converts the orbital tangential force and movement to axial force and movement. The pitch may be selected to optimize the force magnification, speed reduction, resolution enhancement and off-power holding force.

Referring to FIGS. 13 through 17, the ultrasonic linear motor 50 uses a piezoelectric tube 54 with quadrant electrodes to generate ultrasonic vibrations. A threaded shaft 12 with a spherical ball tip 26 rotates and produces axial force and motion. The rotation is produced by ultrasonic orbits of the threaded nut 16 connected to a vibrating piezoelectric tube 54. The inside diameter of the tube is a continuous electrode 61, which is grounded 63, and the outside diameter of the tube is divided into four separate electrodes 60, 62, 64, and 66. The piezoelectric material is a commonly available "hard" composition with low dielectric losses and high depoling voltage. The axial length of the portion of the piezoelectric tube beneath each electrode 60, 62, 64, and 66 changes in proportion the applied voltage and the $d_{31}$ piezoelectric charge coefficient. Electrode sections 60, 64 and 62, 66 work together in pairs respectively to bend the tube 54 and excite the orbital resonance. Alternating electric drive signals 86 and 88 are applied to plates 60, 64 and 62, 66, respectively, with poling directions 43. For each electrode pair 60, 64 and 62, 66, the electric field is positive with respect to the poling direction on one electrode and negative with respect to the poling direction on the opposite electrode. Drive signal Vx 86 is applied to electrodes 60, 64 and produces simultaneous expansion under one electrode and contraction under the opposite electrode; and thus it bends the tube in the X direction 72a/72b (see FIG. 18). In a similar manner the drive signal Vy 88 is applied to plates 62, 66 and bends the tube in the Y direction 74a/74b (see FIG. 18).

The tube end opposite the threaded nut 16 is bonded to a base flange 52 and holds a guide bushing 28 with a small clearance between the bushing inside diameter and the outside diameter of the threaded shaft. The threaded shaft 12 supports a compliant axial force 27 that is applied via the spherical ball tip 26 using a hard flat surface that produces low friction. The base flange is the connection point for a stationary cover 58 (FIG. 21). The thread pitch on the shaft 12 and nut 16 converts the orbital tangential force and movement to axial force and movement. The pitch may be selected to optimize the force magnification, speed reduction, resolution enhancement and off-power holding force.

Figure 19:
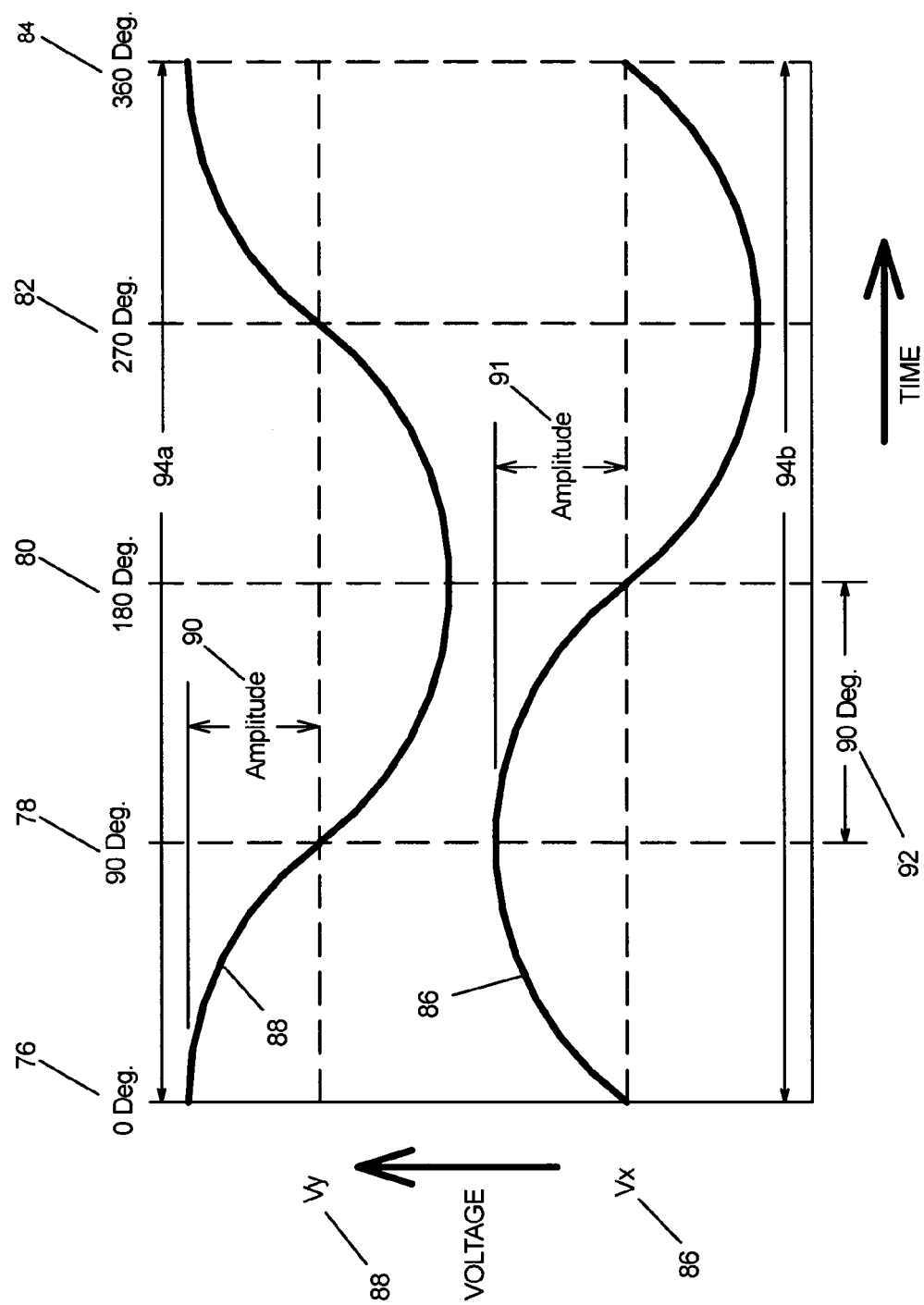
FIG. 19 is a schematic illustration of the electrical drive signals required to create the movements shown in FIG. 18.
Figure 20:
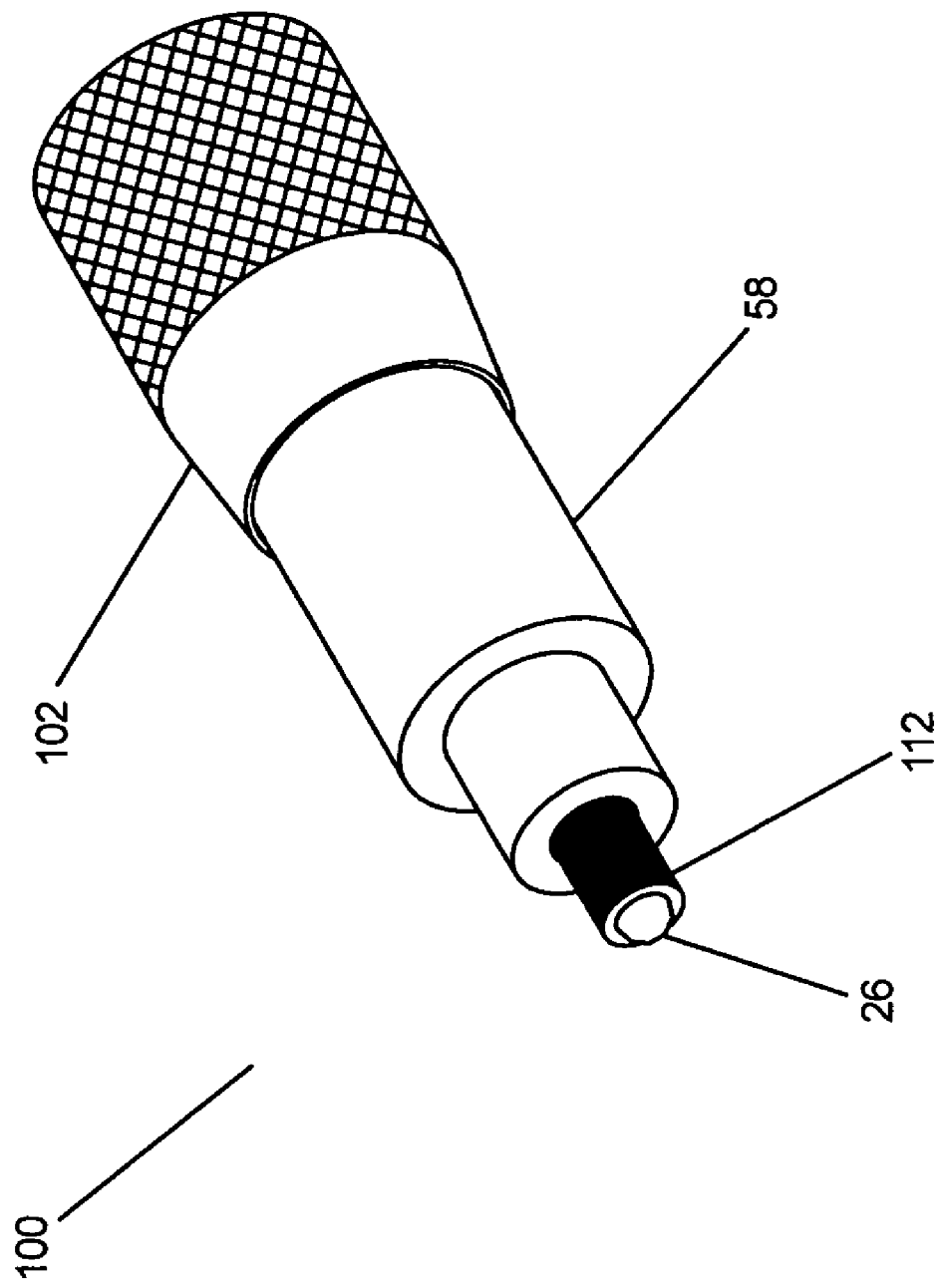

Referring to FIGS. 18 and 19, the motor 10 (see FIG. 1) operation and corresponding drive signals 86 and 88 used to effect such operation are shown (see also FIG. 36). The piezoelectric plate pairs work together, with one expanding 70 while the other simultaneously contracts 69, to bend the housing. The alternating drive signals Vx 86 and Vy 88 are preferable sinusoidal with equal amplitude 90/91 and a ninety degree phase shift 92 to produce a circular orbit. A positive phase shift 92 produces a positive nut 16 orbit direction and a positive shaft 12 rotation 96/translation 98, while a negative phase shift 92 produces a negative orbit direction and a negative shaft rotation/translation. A single orbital cycle of the motor, for one direction of rotation, and the corresponding drive signal amplitudes 90 and 91, are shown sequentially in ninety degree increments 76, 78, 80, 82 and 84. The cylindrical bending and orbital movement is shown in the X 72a/72b and Y 74a/74b directions. The nut contacts the side of the threaded shaft at one location 73a with a clearance 73b on the opposite side (see FIG. 5B), whereby the contact imparts tangential force and movement that causes the shaft 12 to rotate 96 and translate 98 a small amount for each orbital cycle. The amount of rotation and translation per cycle depends on many factors, including orbit amplitude, the magnitude of the force 27 acting on the shaft, and the coefficient of friction and surface finish of the threads. If a zero-slip condition is achieved between the contact 73a of the nut and shaft, the movement per cycle is nominally proportional to the diametrical clearance between the threads. In general, as drive amplitudes 90 and 91 increase, the orbit diameter increases, the normal contact force between the shaft 12 and nut 16 increases, slippage decreases, speed increases, and torque/force increases.

The ultrasonic frequency is the inverse of the period (see periods 94a and 94b of FIG. 19); and such ultrasonic frequency is preferably the same for both signals and matches the first bending resonant frequency of the housing 14.

Referring to FIGS. 20 through 25 the motor assembly 100 is integrates motor 10 with cover 58 and knurled knob 102. A threaded shaft 112 is disposed within the motor 10. As is best shown in FIG. 21, the threaded shaft 112 is similar to threaded shaft 12 (see FIG. 1) but differs therefrom in having a smooth spindle 113 integrally attached thereto. The spindle 113 is adapted to be attached to knurled knob 102. Cover 58 is attached to motor 10 at flange 45. Knurled knob 102 rotates and translates with shaft 112 without contacting cover 58.

Figure 22:
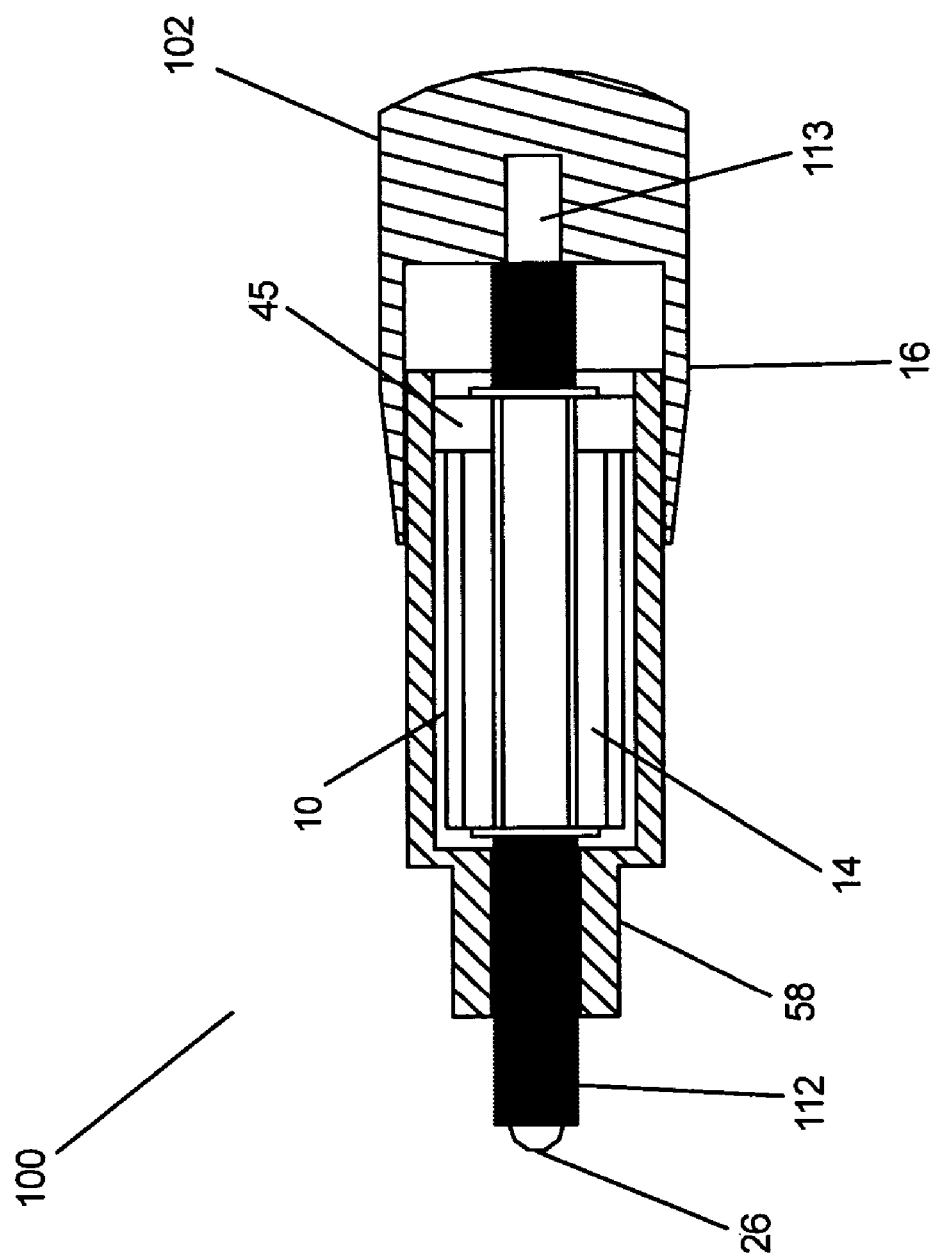

FIG. 21 is an exploded view of motor assembly 100. FIG. 22 is a sectional view of motor assembly 100.

Figure 23A:
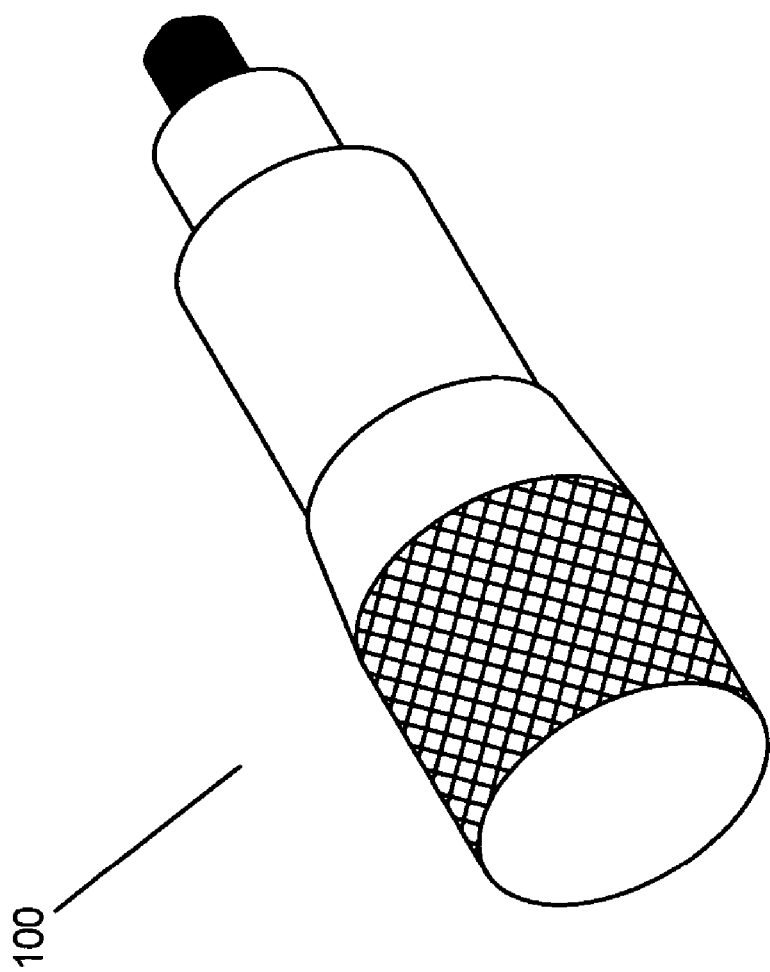
FIG. 23A is a perspective view of the motor assemble with a reverse view from FIG. 20.
Figure 23B:
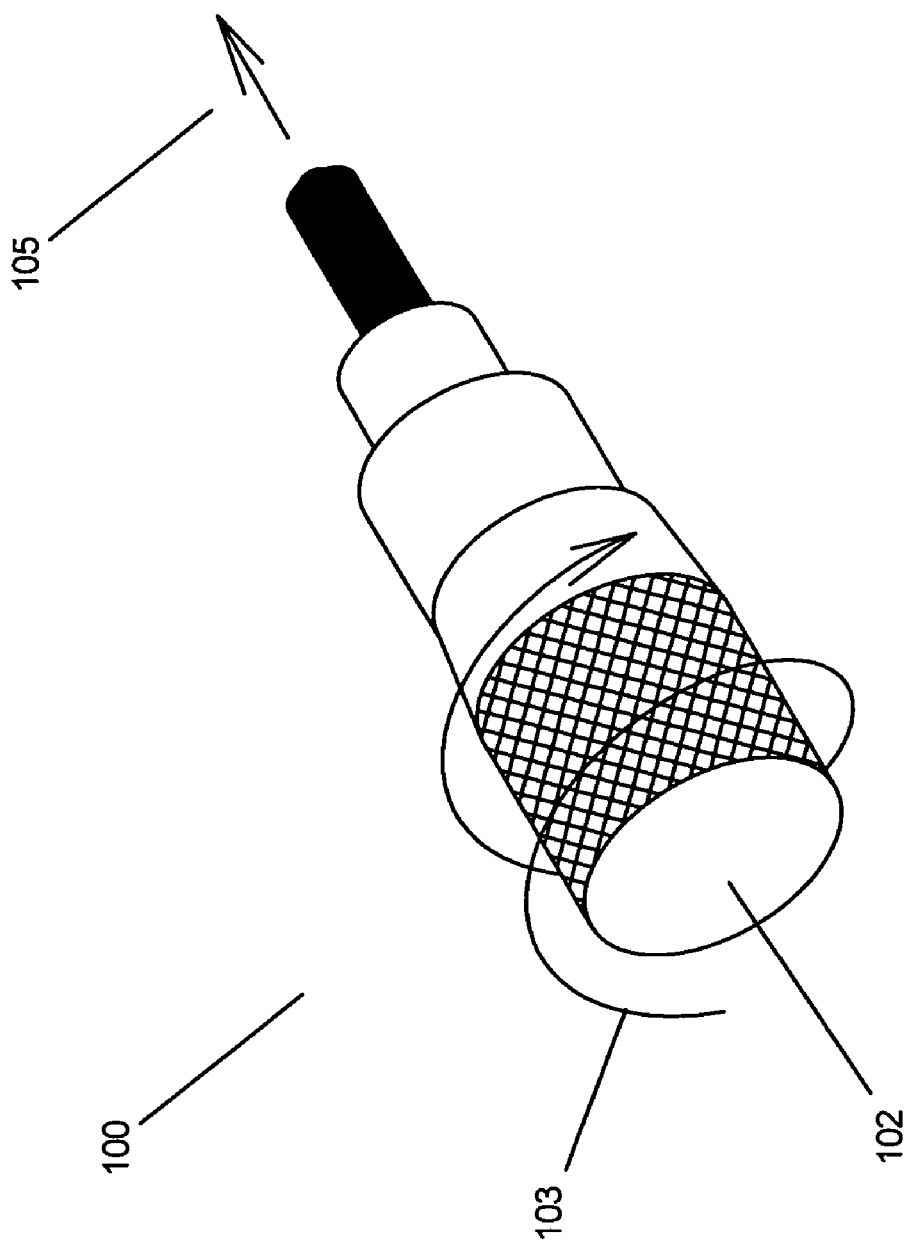
FIG. 23B is a perspective view that illustrates of how the motor assembly rotates and translates in the forward direction.
Figure 23C:
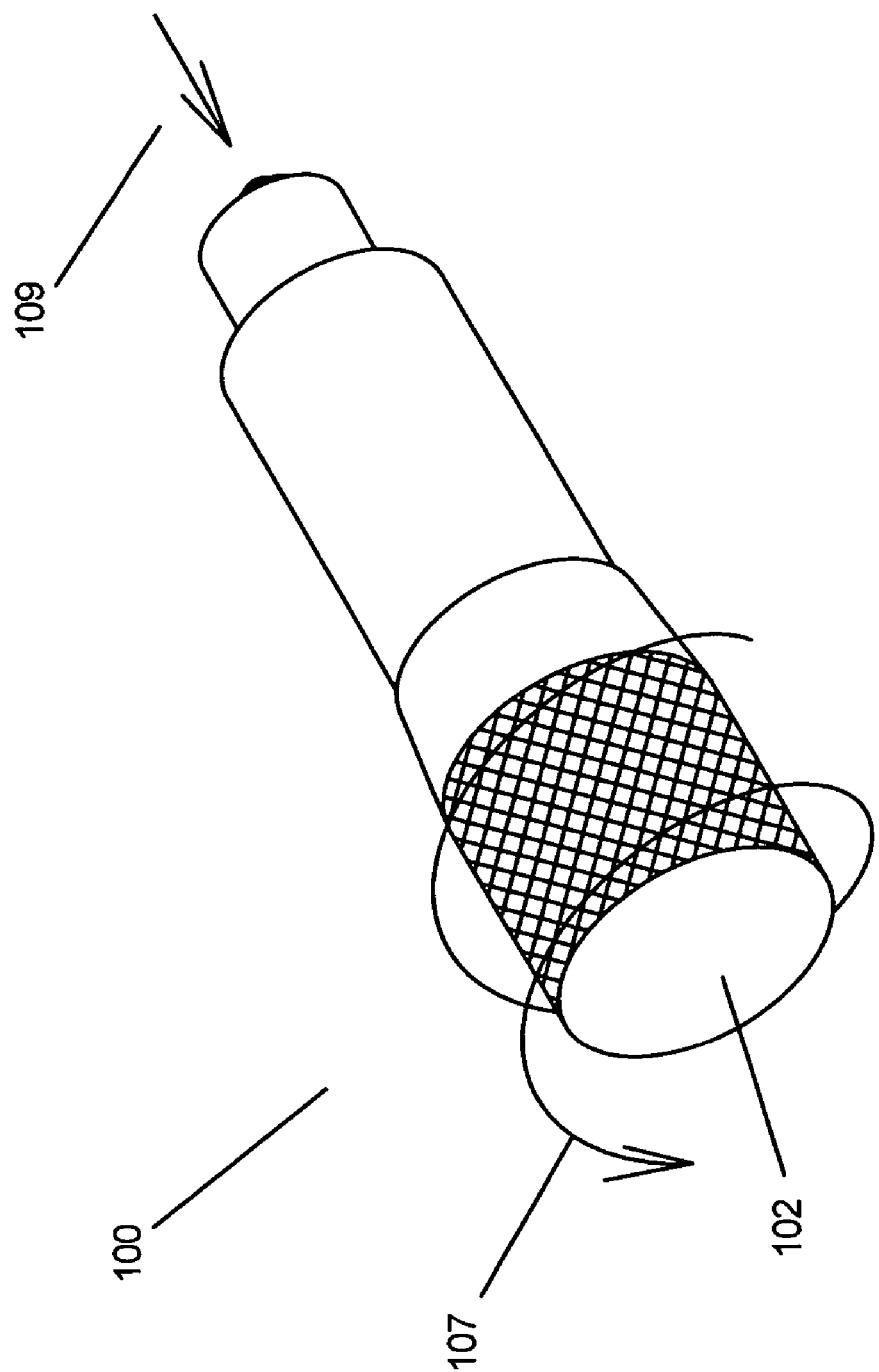
FIG. 23C is a perspective view that illustrates how the motor assembly rotates and translates in the reverse direction.

FIGS. 23A, 23B and 23C illustrate the motor assembly 100. FIG. 23A is a perspective view of motor assembly 100 reversed from FIG. 20. FIG. 23B illustrates operation of motor assembly 100 with the knob 102 and shaft 112 rotating clockwise 103 and translating in direction of arrow 105. By comparison, FIG. 23C illustrates operation of motor assembly 100 with the knob 102 and shaft 112 rotating counter clockwise 107 and translating in direction of arrow 109.

As will be apparent, and for the sake of simplicity of representation, the physical means of electrical connection to the various components of the motor assemblies have been omitted from the Figures.

As will also be apparent, the presence of the knurled knob 102 allows one to move the motor assembly 100 by manual means instead of or in addition to moving such motor assembly 100 by electrical means. Thus, e.g., the assembly 100 can be used as a micrometer drive replacement that will afford a user both the conventional means of manual adjustment as well as the additional means of electrically automated adjustment.

In one embodiment, not shown, knurled knob 102 is mechanically connected to an exterior motor to allow for a second means of mechanical movement of the assembly.

Figure 24A:
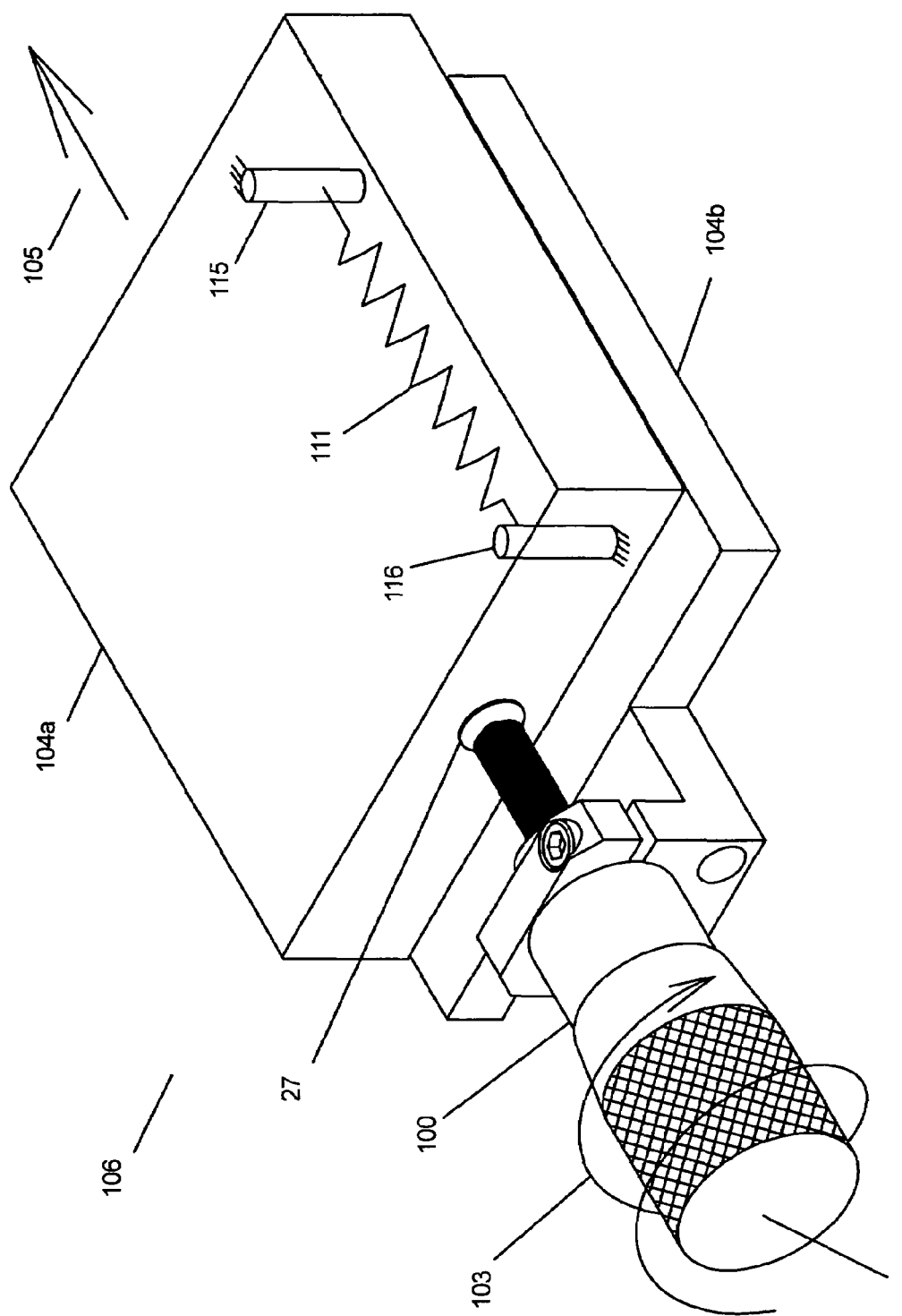
FIG. 24A shows the motor assembly integrated in a linear stage operating in the forward direction.
Figure 24B:
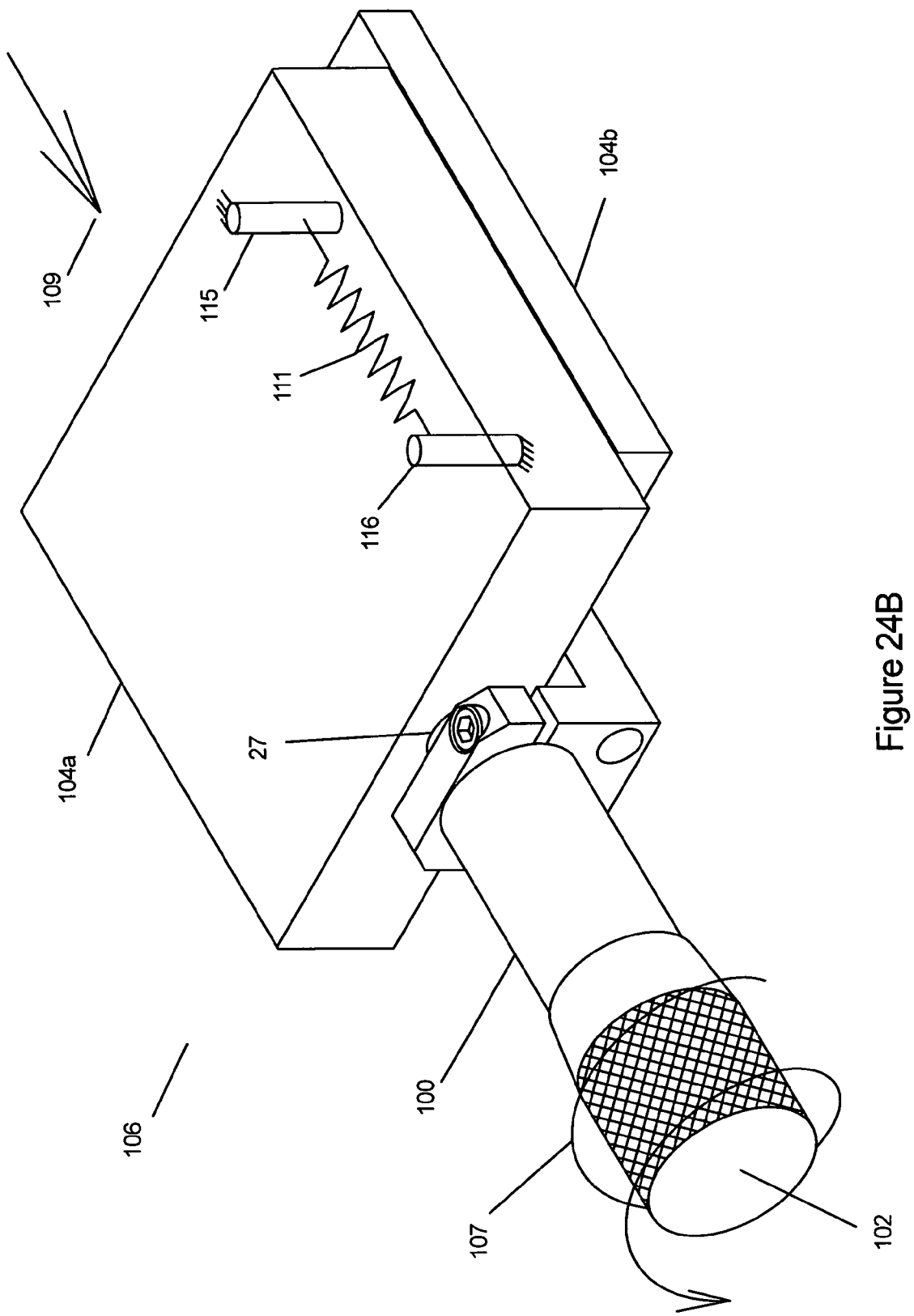

FIGS. 24A and 24B illustrate adjustable linear stages 106 that are comprised of motor assemblies 100 operatively connected to linear translation stages 104a/104b. In this embodiment cover 58 of motor assembly 100 is attached to the bottom stage portion 104b and ball 26 is in contact with top stage portion 104a. As will be apparent, when knurled knob 102 moves in clockwise in direction 103, linear motion in the direction of arrow 105 is produced. Conversely, when knurled knob 102 is move counterclockwise in direction 107, linear motion in the direction of arrow 109 is produced.

In one embodiment, illustrated schematically in FIGS. 24A and 24B, a spring assembly 111 comprised of pins 115 and 116 (shown in dotted line outline) biases translation stage 104a/104b in the direction of arrow 109. In the embodiment depicted, pin 115 is attached to the top, movable part 104a of the assembly, and the pin 116 is attached to the stationary bottom part 104b of the assembly. As will be apparent, the spring assembly 111 may be used to produce the axial force 27 (see FIGS. 5 and 6).

Figure 25:
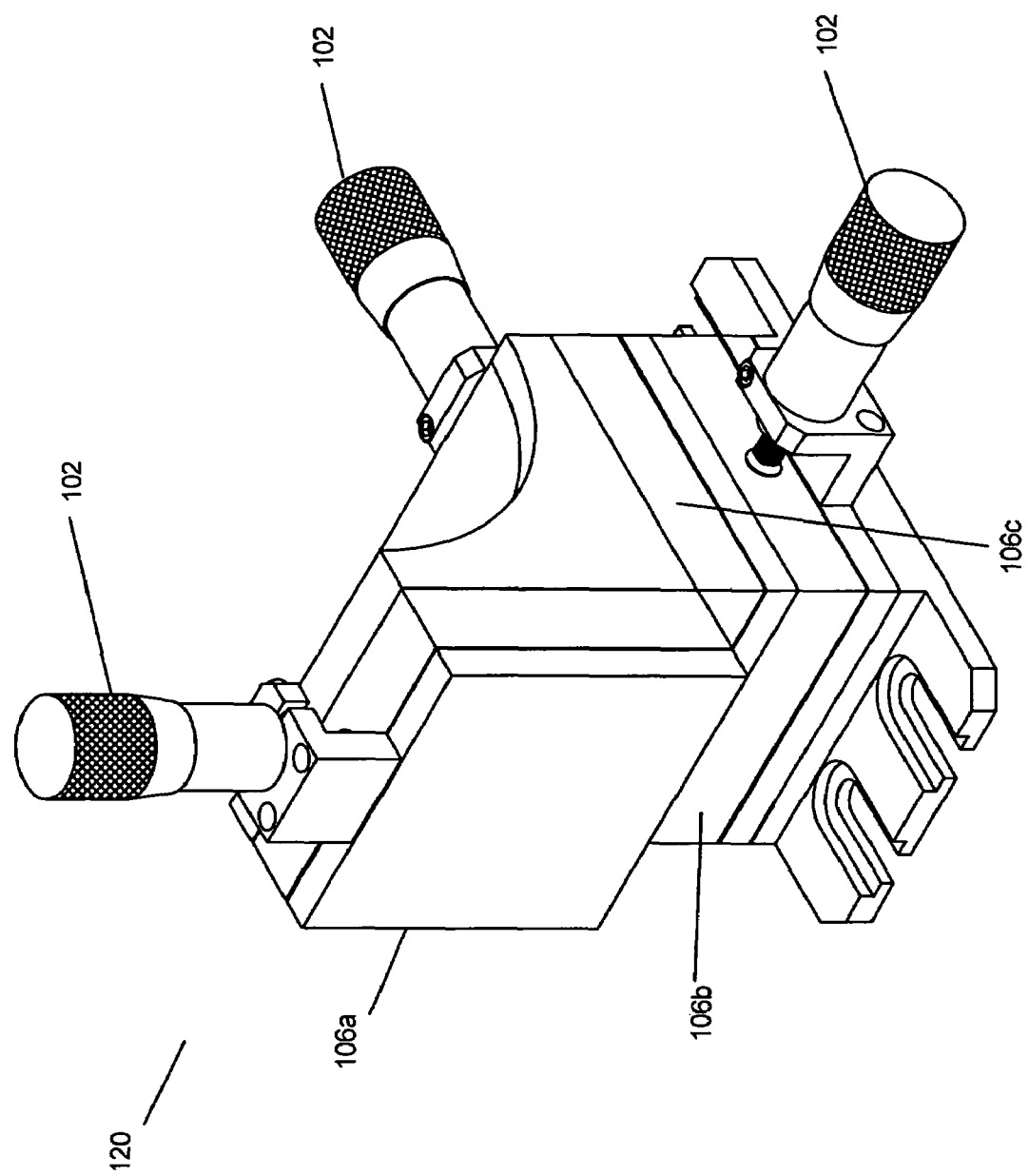
Figure 26:
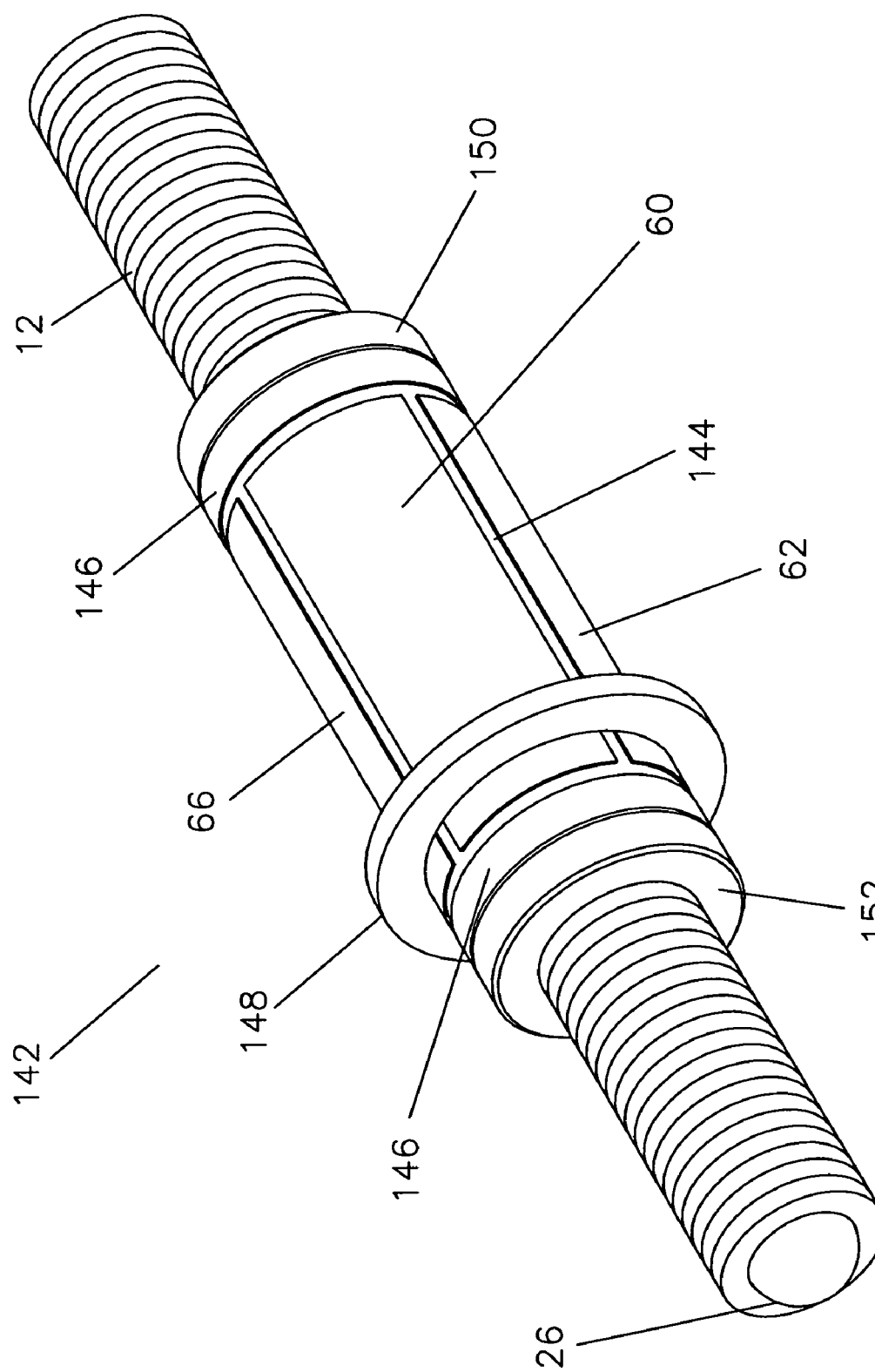
Figure 27:
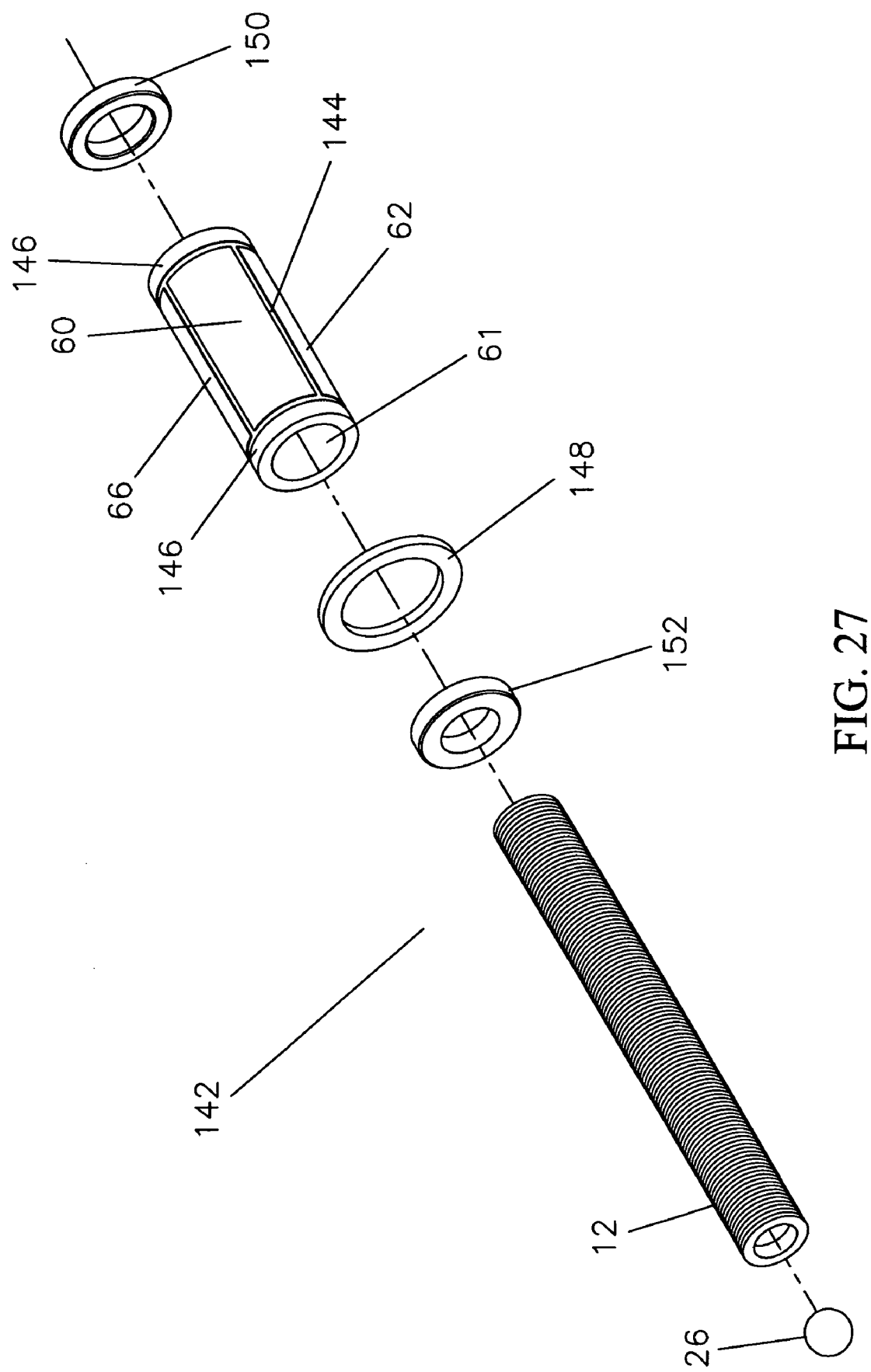
Figure 30:
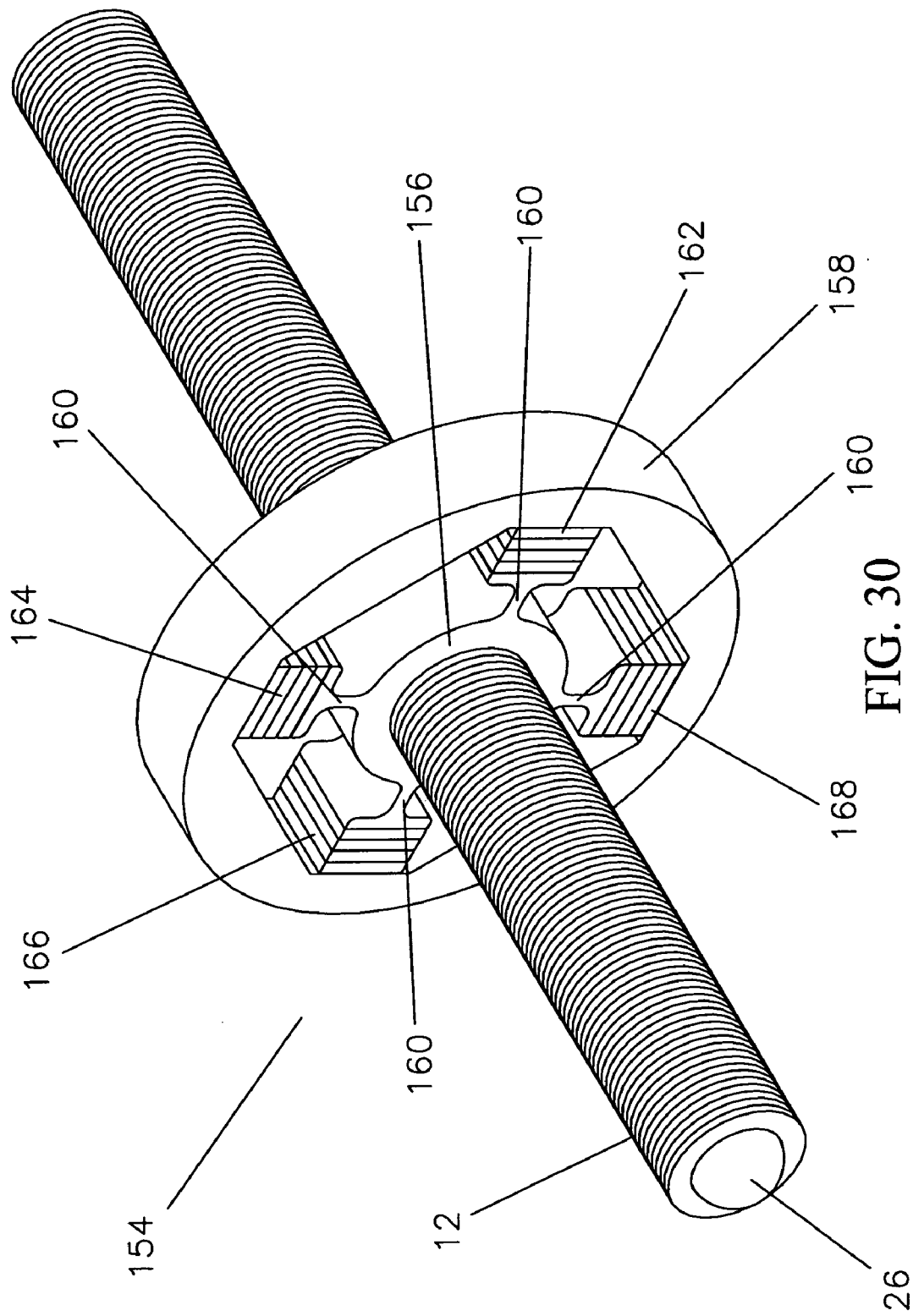
Figure 31:
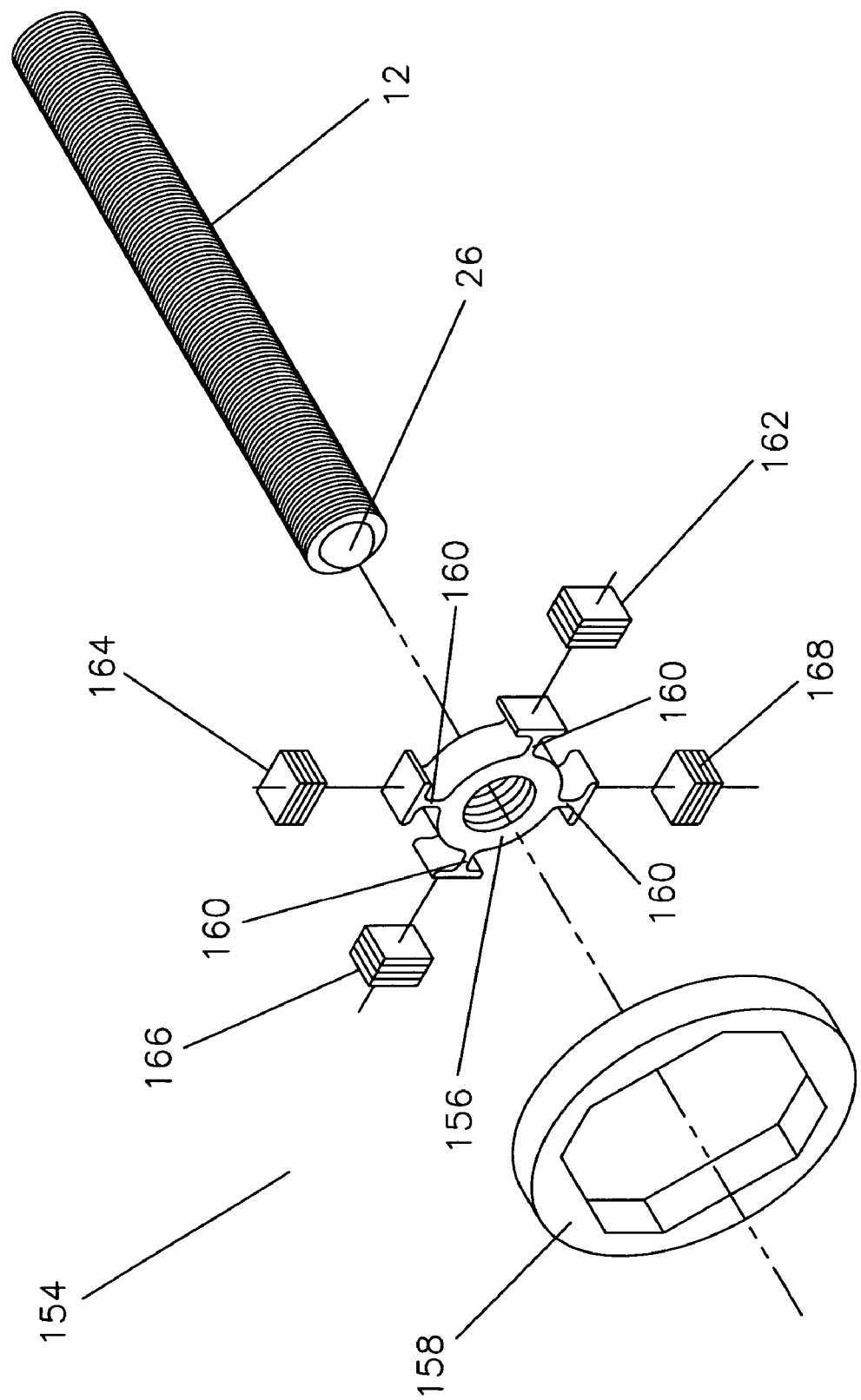
Figure 34:
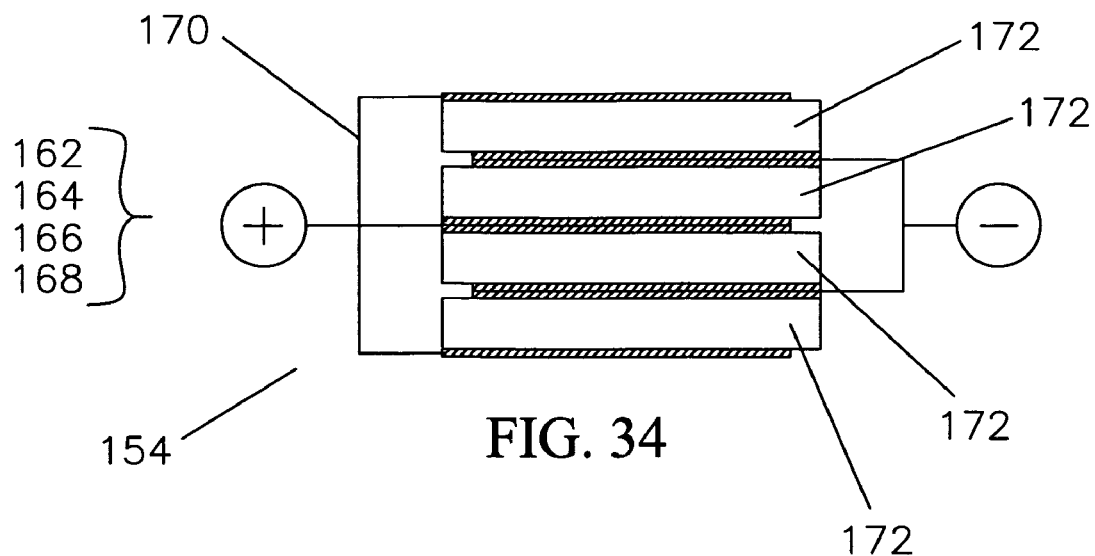
Figure 35:
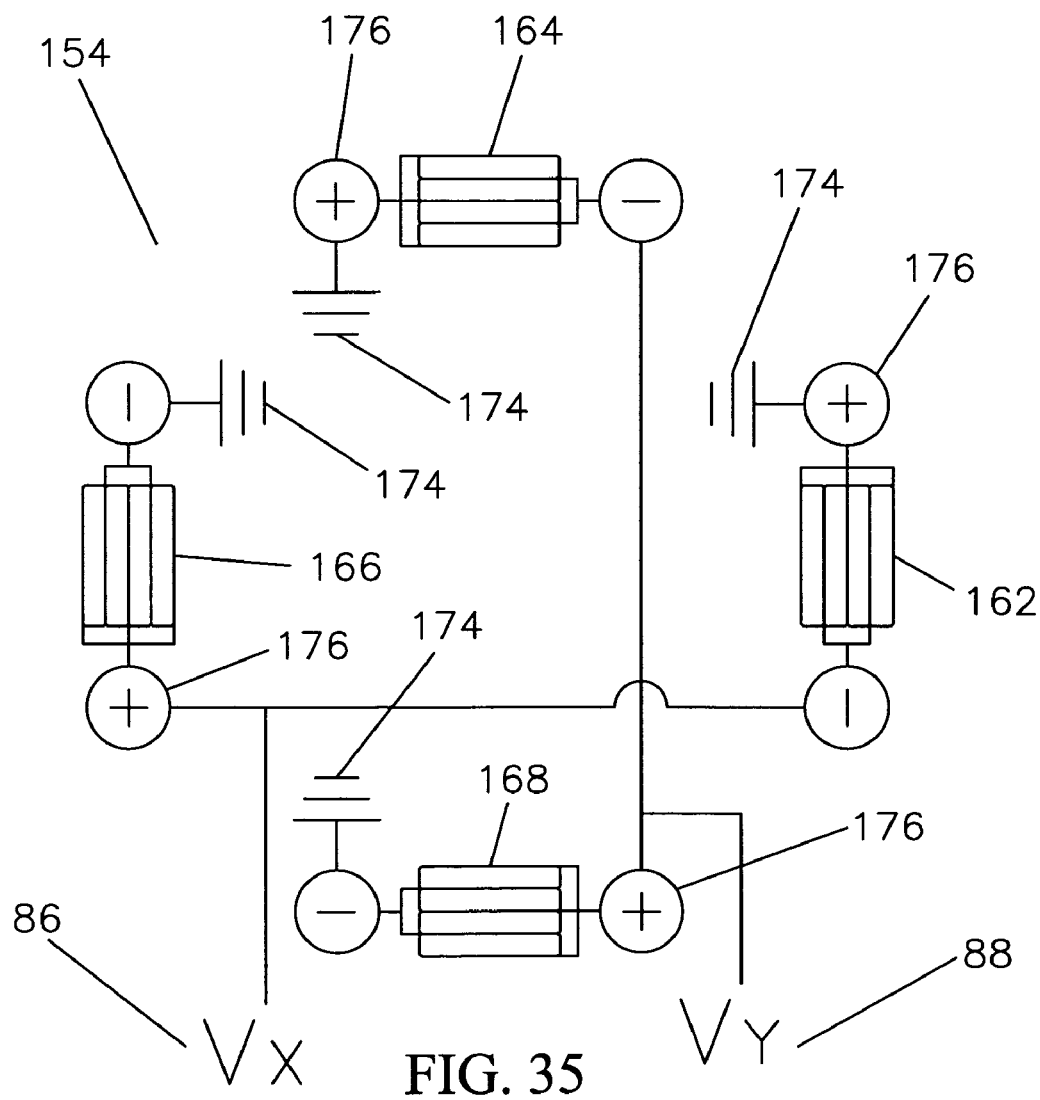

FIG. 25 is a perspective view of a micromanipulator 120 that is capable of moving its stages 106a, 106b, and 106c, in the X, Y, and Z axes.

Although the invention has been described in its preferred form with a certain degree of particularity, it is to be understood that the present disclosure of the preferred form can be changed in the details of construction, and that different combinations and arrangements of parts may be resorted to without departing form the spirit and the scope of the invention.

In the previous portions of this specification, there has been described an apparatus for driving a threaded shaft assembly comprised of a threaded shaft with an axis of rotation and, engaged therewith, a threaded nut, wherein said assembly comprises means for subjecting said threaded nut to ultrasonic vibrations and thereby causing said shaft to simultaneously rotate and translate in the axial direction. As will be apparent, one may produce a comparable device that is comprised of means for causing said threaded shaft assembly to vibrate, thereby causing said threaded nut to simultaneously rotate and translate.

FIGS. 26 through 29 are schematics of another preferred motor 142 of the invention. Referring to FIGS. 26 through 29, the ultrasonic linear motor 142 uses a piezoelectric tube 144 with quadrant electrodes to generate ultrasonic vibrations. Motor 142 and tube 144 are similar to motor 50 and tube 54. (Refer to FIGS. 13 through 17.) A threaded shaft 12 with a spherical ball tip 26 rotates and produces axial force and motion. The rotation is produced by ultrasonic orbits of the threaded nut 152 connected to a vibrating piezoelectric tube 144. The inside diameter of the tube is a continuous electrode 61, which is grounded 63. The difference between tube 54 and tube 144 is electrode 61 wraps around the ends of the tube and forms an electrode ring 146 on the outside diameter of each end. The outside diameter of the tube is divided into four separate electrodes 60, 62, 64, and 66. The piezoelectric material is a commonly available "hard" composition with low dielectric losses and high depoling voltage. The axial length of the portion of the piezoelectric tube beneath each electrode 60, 62, 64, and 66 changes in proportion the applied voltage and the d31 piezoelectric charge coefficient. Electrode sections 60, 64 and 62, 66 work together in pairs respectively to bend the tube 144 and excite the orbital resonance. As previously discussed for motor 50, alternating electric drive signals 86 and 88 are applied to electrodes 60, 64 and 62, 66, respectively, with poling directions 43. For each electrode pair 60, 64 and 62, 66, the electric field is positive with respect to the poling direction on one electrode and negative with respect to the poling direction on the opposite electrode. Drive signal Vx 86 is applied to electrodes 60, 64 and produces simultaneous expansion under one electrode and contraction under the opposite electrode; and thus it bends the tube in the X direction 72a/72b (see FIG. 18). In a similar manner the drive signal Vy 88 is applied to electrodes 62, 66 and bends the tube in the Y direction 74a/74b (see FIG. 18).

Referring again to FIG. 26, the tube end opposite the threaded nut 152 is bonded to a guide bushing 150 with a small clearance between the bushing inside diameter and the outside diameter of the threaded shaft. The mounting flange 148 is bonded to the outside diameter of the tube 144 at the node point. The node point is the axial location on the tube that has minimum movement when the tube is resonating. The thread pitch on the shaft 12 and nut 152 converts the orbital tangential force and movement to axial force and movement. The pitch may be selected to optimize the force magnification, speed reduction, resolution enhancement and off-power holding force.

FIGS. 30 through 36 another preferred embodiment of the motor 154 of this invention. Referring to FIGS. 30 through 36, and in the preferred embodiment depicted therein, the ultrasonic linear motor 154 preferably uses four piezoelectric stacks 162, 164, 166 and 168 oriented radially in a plane at 90 degree spacing to generate ultrasonic vibrations. A threaded shaft 12 with a spherical ball tip 26 rotates and produces axial force and motion. The rotation is produced by an ultrasonic orbits of the threaded nut 156 connected to the four piezoelectric stacks 162, 164, 166, and 168 via elastic elements 160 where said stacks are bonded to the base flange 158. The four stacks 162 et seq. are constructed from piezoelectric plates 172 using well-established assembly and electrical interconnection methods 170 with the leads preferably being connected together to a common ground 174. The length of the stacks 162 et seq. changes in proportion to the applied voltage 69, 70 and the d33 piezoelectric charge coefficient. The piezoelectric material is a commonly available "hard" composition with low dielectric losses and high depoling voltage. Alternating electrical drive signals 86 and 88 are connected to the leads of each piezoelectric stack and excite orbital vibrations of the nut. Piezoelectric stacks 162 et seq. work together in pairs, respectively, to move the nut 156 in an orbital resonance 76, 78, 80, 82, 84. Alternating electric drive signals Vx 86 and Vy 88 are applied to stacks 162,166 and 164,168 respectively, with poling directions 176. For each stack pair 162,166 and 164,168 the electric field is positive with respect to the poling direction 176 on one stack and negative with respect to the poling direction on the opposite stack. Drive signal Vx 86 is applied to stacks 162,166 and produces simultaneous expansion on one stack and contraction on the opposite stack; and thus it translates the nut 156 in the X direction 72a/72b. In a similar manner, the drive signal Vy 88 is applied to stacks 164,168 and translates the nut 156 in the Y direction 74a/74b. While not shown, it is understood by those skilled in the art that actuator configurations, other than piezoelectric stacks 162 et seq., may also be used to produce the same orbital resonance of nut 156. Such actuators include piezoelectric plates that change length in proportion the applied voltage and the d31 piezoelectric charge coefficient, electromagnetic solenoids or voice coils, electrostatic attraction, or other tranducers capable of producing ultrasonic frequency motion. The thread pitch on the shaft 12 and nut 156 converts the orbital tangential force and movement to axial force and movement. The pitch may be selected to optimize the force magnification, speed reduction, resolution enhancement and off-power holding force.

FIGS. 37 through 39 illustrate an optical assembly 180 that is comprised of one of the motors 142 of this invention. As will be apparent from these Figures, in the embodiment depicted the lens 184 is rotationally symmetric with its centerline 204 coincident with 204 axis of rotation of the threaded hollow shaft 182.

Referring to FIGS. 37 through 39 and in the preferred embodiment depicted therein, the optical alignment mechanism 180 integrates a motor 142 with a shaft 182 that has a hollow center with an optical element 184 aligned and bonded on the shaft centerline 204. The optical element 184 can be of many types including transmissive, reflective, concave, convex or assemblies of multiple optical elements. The motor 142 causes the hollow shaft 182 and optical element 184 to rotate and translate 202 achieving precise optical alignment for functions such changing focal length or focusing.

In the embodiment depicted in FIGS. 37 through 39, an optical element 184 is used. In this embodiment, the optical element is a lens. It is preferred that the optical element 184 be a movable optical element. One may use many of the movable optical elements known to those skilled in the art. Reference may be had, e.g., to U.S. Pat. No. 3,612,664 (optical path compensating device); U.S. Pat. No. 3,958,117 (distance determining and automatic focusing apparatus);

U.S. Pat. No. 4,184,759 (photographic apparatus); U.S. Pat. No. 4,629,308 (lens and shutter positioning mechanism for variable magnification copier); U.S. Pat. No. 5,296,943 (multi-path electronic camera assembly); U.S. Pat. No. 5,894,371 (focus mechanism for varifocal lens); U.S. Pat. No. 5,969,886 (lens barrel and optical apparatus); U.S. Pat. No. 6,236,448 (projection exposure system); U.S. Pat. No. 6,445,514 (micro-positioning optical element); U.S. Pat. No. 6,606,426 (beam alignment systems); U.S. Pat. No. 6,678,240; and the like. The disclosure of each of these United States patent applications is hereby incorporated by reference into this specification.

By way of further illustration, one may use one or more of the linear motors of this invention in prior art cameras that utilize prior art motors. Thus, by way of illustration, one may replace the prior art motor in one or more of the cameras described in U.S. Pat. No. 5,091,781 (camera moving apparatus); U.S. Pat. No. 5,157,435 (automatic focusing apparatus for a video camera); U.S. Pat. No. 5,357,308 (automatic zoom camera and driving method thereof); U.S. Pat. No. 5,434,621 (object tracing device for automatic zooming); U.S. Pat. No. 5,943,513 (camera zooming apparatus); and the like. The entire disclosure of each of these United States patents is hereby incorporated by reference into this specification.

FIGS. 40 through 42 illustrate another preferred optical assembly 186. Referring to FIGS. 40 through 42 and in the preferred embodiment depicted therein, the optical alignment mechanism 186 integrates a motor 154 with a shaft 182 that has a hollow center with an optical element 184 aligned and bonded on the shaft centerline. The optical element 184 can be of many types including transmission, reflective, concave, convex or assemblies of multiple optical elements. The motor 154 causes the hollow shaft 182 and optical element 184 to rotate and translate 202 on centerline 204 achieving precise optical alignment for functions such changing focal length or focusing.

FIGS. 43 through 45 illustrate yet another preferred optical assembly 188. Referring to FIGS. 43 through 45 and in the preferred embodiment depicted therein, a camera auto-focus and auto-zoom assembly 188 integrates two optical alignment mechanisms 194 and 196, similar to mechanism 186, with a focal plane imaging device 192 such as a CCD array and housing 190. Mechanism 196 is closest to the imaging device 192 and incorporates a transmission lens that changes the camera zoom by translating the lens 198 relative to device 192 and lens 200. In this embodiment the zoom lens 198 diameter is larger than the imaging device 192 and focus lens 200 so that mechanism 196 can translate without interference. Mechanism 194 is adjacent to mechanism 196, opposite device 192, and incorporates a transmission lens that changes the camera focus by translating the lens 200 relative to lens 198 and device 192. In this embodiment the diameter of the focus lens 200 is smaller than the zoom lens 198 to eliminate interference when translating mechanism 194. The centerlines of optical elements 198 and 200 are coincident with centerline 204 and perpendicular to the image plane of device 192. Elements 198 and 200 translate and rotate 202 simultaneously. In this embodiment, elements 198 and 200 are rotationally symmetric around centerline 204.

Figure 48:
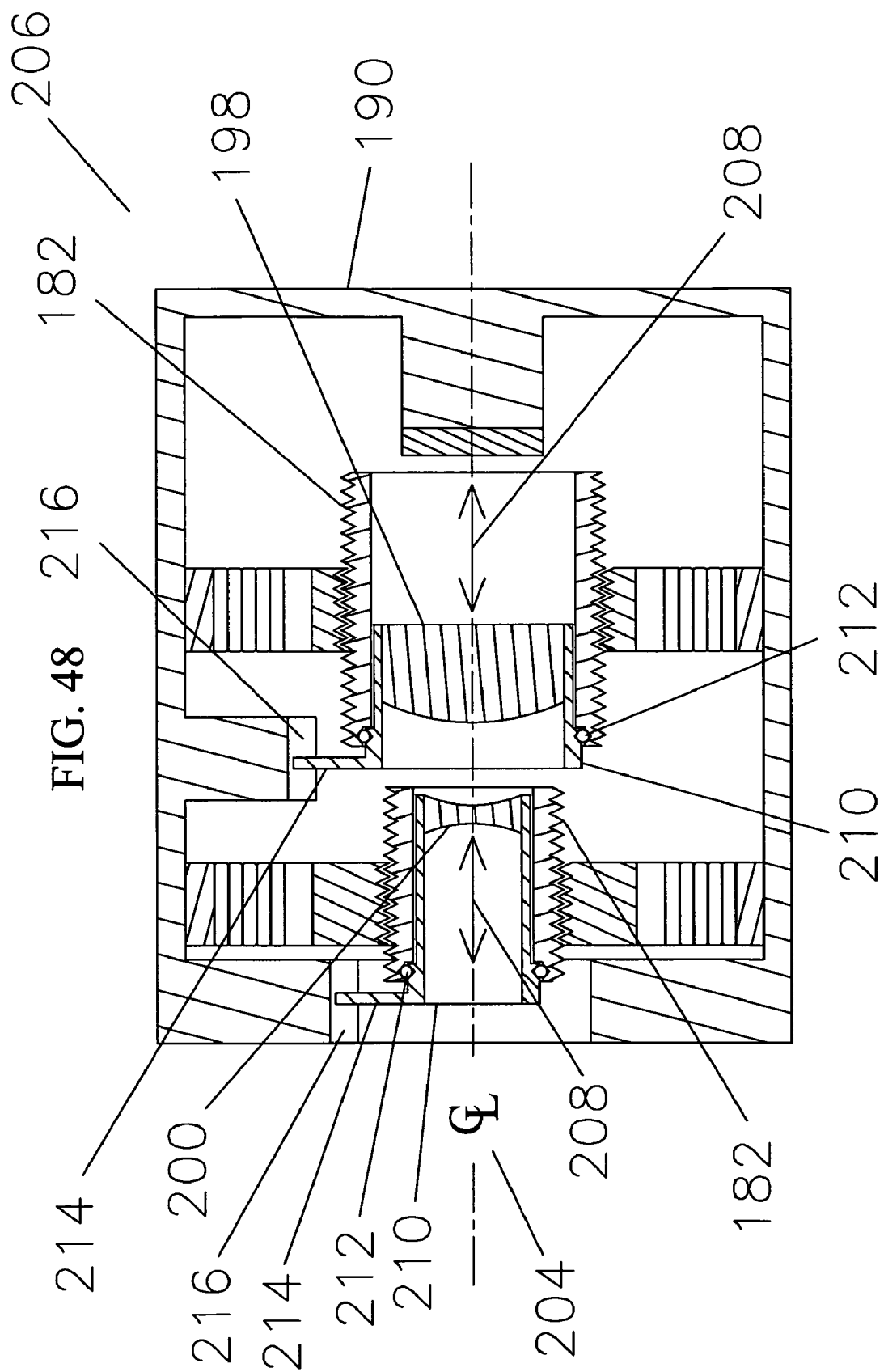

FIGS. 46 through 48 illustrate yet another preferred optical assembly 206. Referring to FIGS. 46 through 48, and in the preferred embodiment depicted therein, a camera auto-focus and auto-zoom assembly 206 with translating 208 but non-rotating optical lens 198 and 200 is described for situations where non-rotating optics is required. Said assembly 206 is similar to assembly 188 with translating and rotating 202 optical lens 198 and 200 but incorporates lens mounting shafts 210 that are connected to the threaded motor shafts 182 via a low friction rotary bearing 212 such as a ball bearing. A pin 214 is connected to the end of each mounting shaft 210 and oriented perpendicular to centerline 204. Said pin 214 engages a stationary slot 216 in housing 190 which prevents rotation of the pin 214, mounting shaft 210 and lens 198 and 200 but allows translation of the pin 214, mounting shaft 210 and lens 198 and 200 in the axial direction 208 parallel to centerline 204.

As will be apparent to those skilled in the art, the optical assemblies illustrated in FIGS. 26 through 48 are merely illustrative of the many movable optical elements with which applicant's linear motor may be utilized.

Referring to FIGS. 49 through 52 and the embodiment depicted therein, the motor 230 is similar to motor 10 depicted in FIGS. 1 through 5 and 18, and is comprised of a motor body 235 upon which is a mounting flange 231. It is preferred that the flange 231 be thin, preferably 0.25 millimeters-0.50 millimeters thick and located as close as possible to the nodal point of the first bending resonance of the motor 230 where the vibration amplitude is minimized. The motor body 235 contains a longitudinal threaded hole 235a traversing the entire length through which a threaded shaft 232 with corresponding threads passes such that the rounded rotation face 233 on shaft 232 protrudes from the threaded hole 235a. In this embodiment the entire length of body 235 is threaded 235a. However, it is understood other embodiments may thread only portion of the body length and allow the remaining length to be a smooth clearance fit with the screw 232. Upon the motor body 235, rectangular piezoelectric plates 18, 20, 22, and 24 are fixedly attached via adhesion processes.

Figure 50:
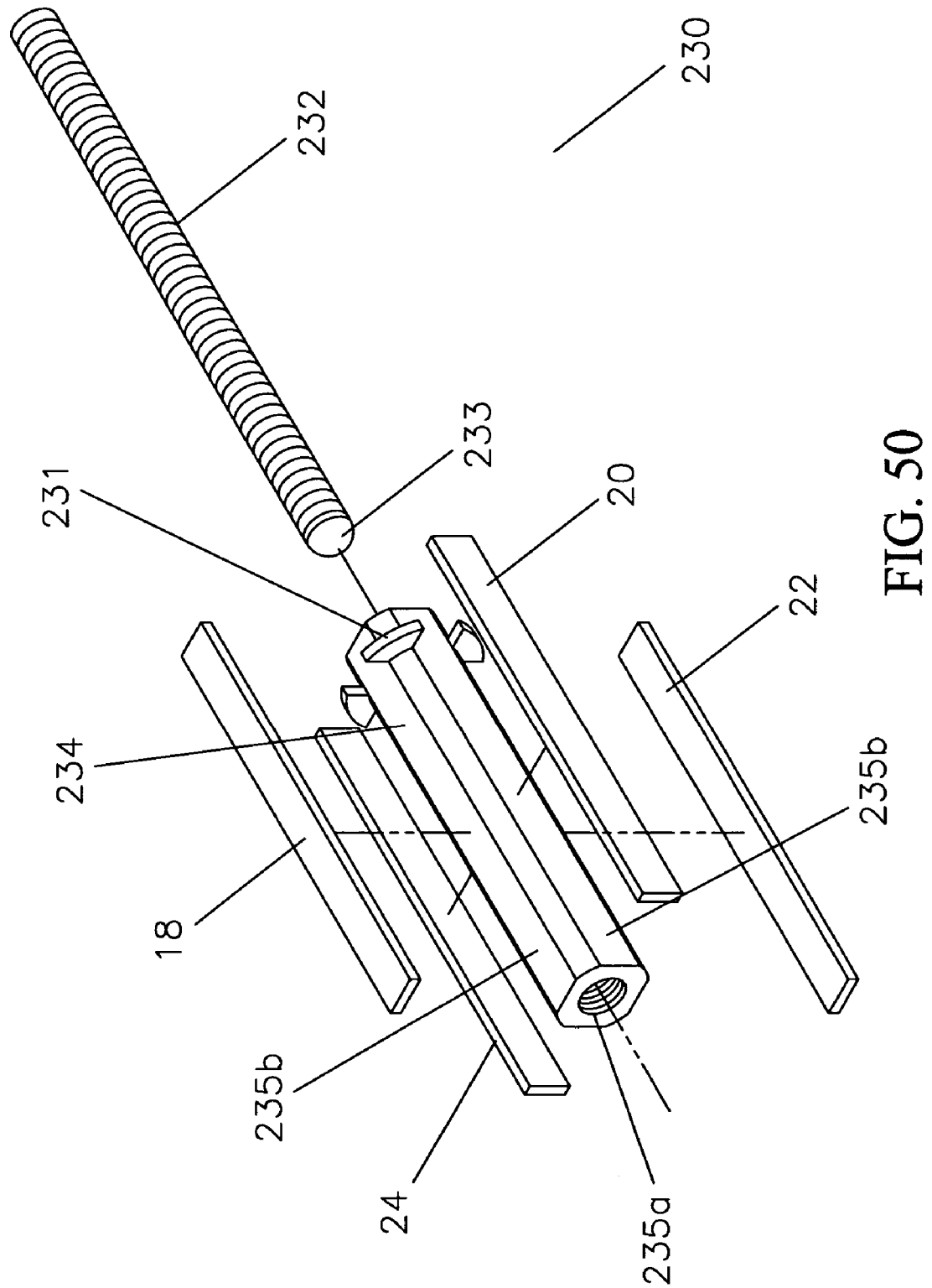

Referring to FIG. 50, it will be seen that the rectangular piezoelectric plates 18, 20, 22, and 24 are adhered to the flat mounting surfaces 235b of the motor body 235.

Figure 54:
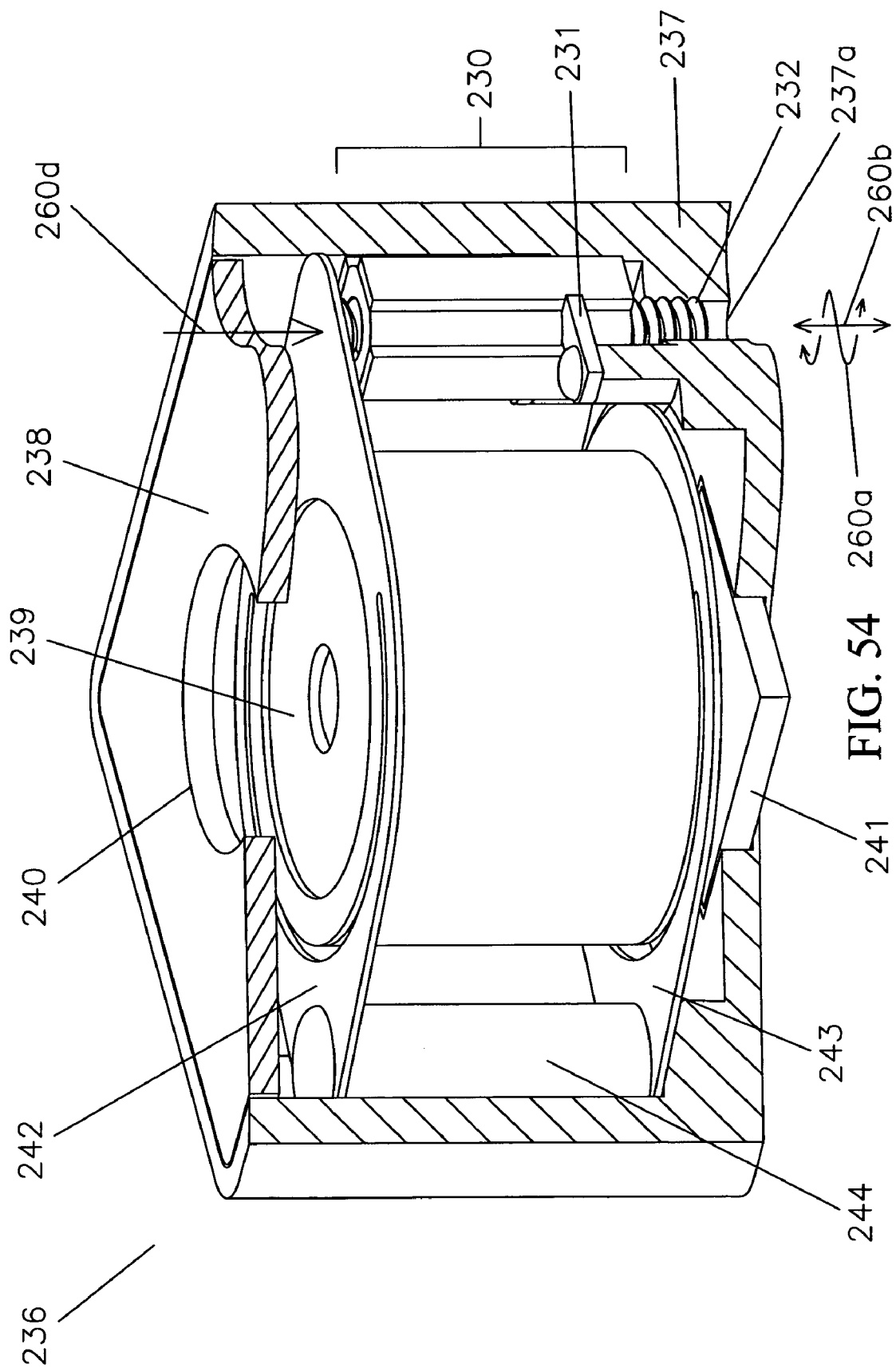

In the embodiment depicted in FIGS. 49 through 52, mounting flange 231 has an outer radial profile 231a and recesses 231b that are of a size so not to obstruct the rectangular piezoelectric plates 18, 20, 22, and 24, but can be of any profile so as to offer a variety of mounting options and accommodate various piezoelectric plate geometries as is best illustrated in FIG. 54. The motor 230 electrically and mechanically operates in the same manner as motor 10 (Refer to FIGS. 1 through 5, 18 and 19) The motion caused by the excitation of the rectangular piezoelectric plates 18, 20, 22 and 24 is the same as described for motor 10 and the subsequent bending of the motor body 235 causes the threaded shaft 233 to rotate 260a and effectually translate 260b linearly.

Figure 53:
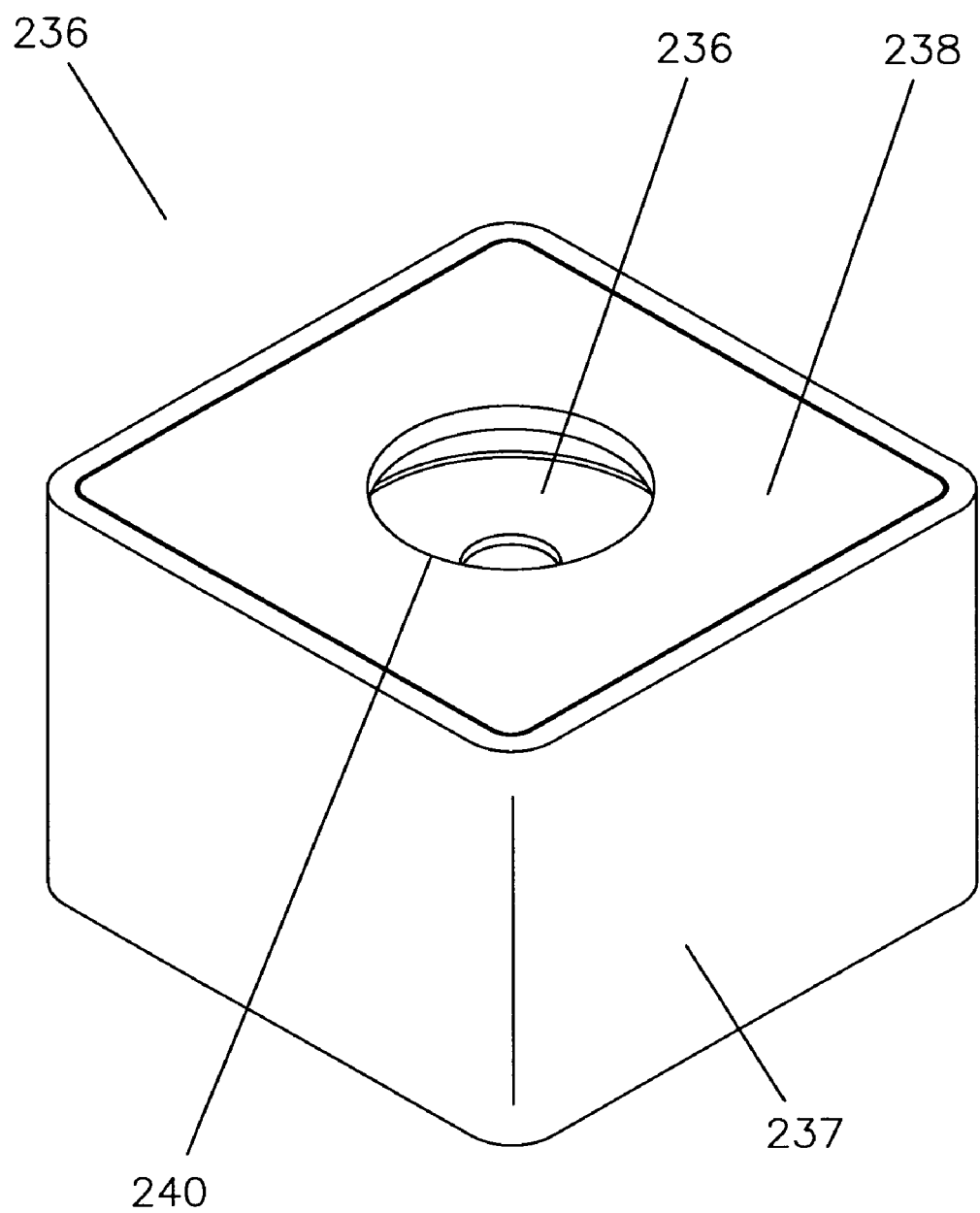

Referring to FIGS. 53 through 59B, the motor 230 integrates with an optical assembly 236. The optical assembly 236 can be of the nature of an automatic focus module such that is found in commercial digital imaging products such as cameras and mobile phones. Referring to FIG. 53, motor 230 is encased by housing 237 and cover 238, and operates lens assembly 239 which accepts light through aperture 240. The housing 237 and cover 238 may be comprised of injection molded plastics.

FIG. 54 represents a partial section view of the components of the optical assembly 236. Light that enters the aperture 240 and proceeds through the lens 239 is imaged onto a sensor 241. Such sensors 241 may include digital image sensors using CCD or CMOS technologies. The motor 230 is fixedly attached to the housing 237 via the mounting flange 231. The mounting flange 231 can be located by molded features in the housing 237 and secured via conventional commercial processes such as heat stamping. The threaded shaft 232 is allowed to rotate 260a and subsequently translate 260b through a clearance hole 237a. The rounded tip 233 of screw 232, obscured from view, rests against the upper lens flexure 242, providing a means to change the location of lens 239 relative to sensor 241. Lens 239 is fixedly attached on one face to the upper lens flexure 242 and on the opposing face to lower lens flexure 243 for form a four-bar linkage that guides the motion of lens 239 in an arc-linear motion 260c that is substantially a straight-line motion for small amplitudes. The upper lens flexure 242 and lower lens flexure 243 are constructed of a resilient material such a spring steel produced via commercial processes such as photo-chemical etching or wire electrical discharge machining. The members are pre-bent such that a preload force 260d is always exerted on the shaft tip 233. The upper lens flexure 242 and lower lens flexure 243 are held apart by spacer 244 and in conjunction with the mounting of the lens 239 operation is such that translation of the threaded shaft 232 will produce a motion 260c which is best illustrated in FIGS. 56, 57 and 58.

Figure 55:
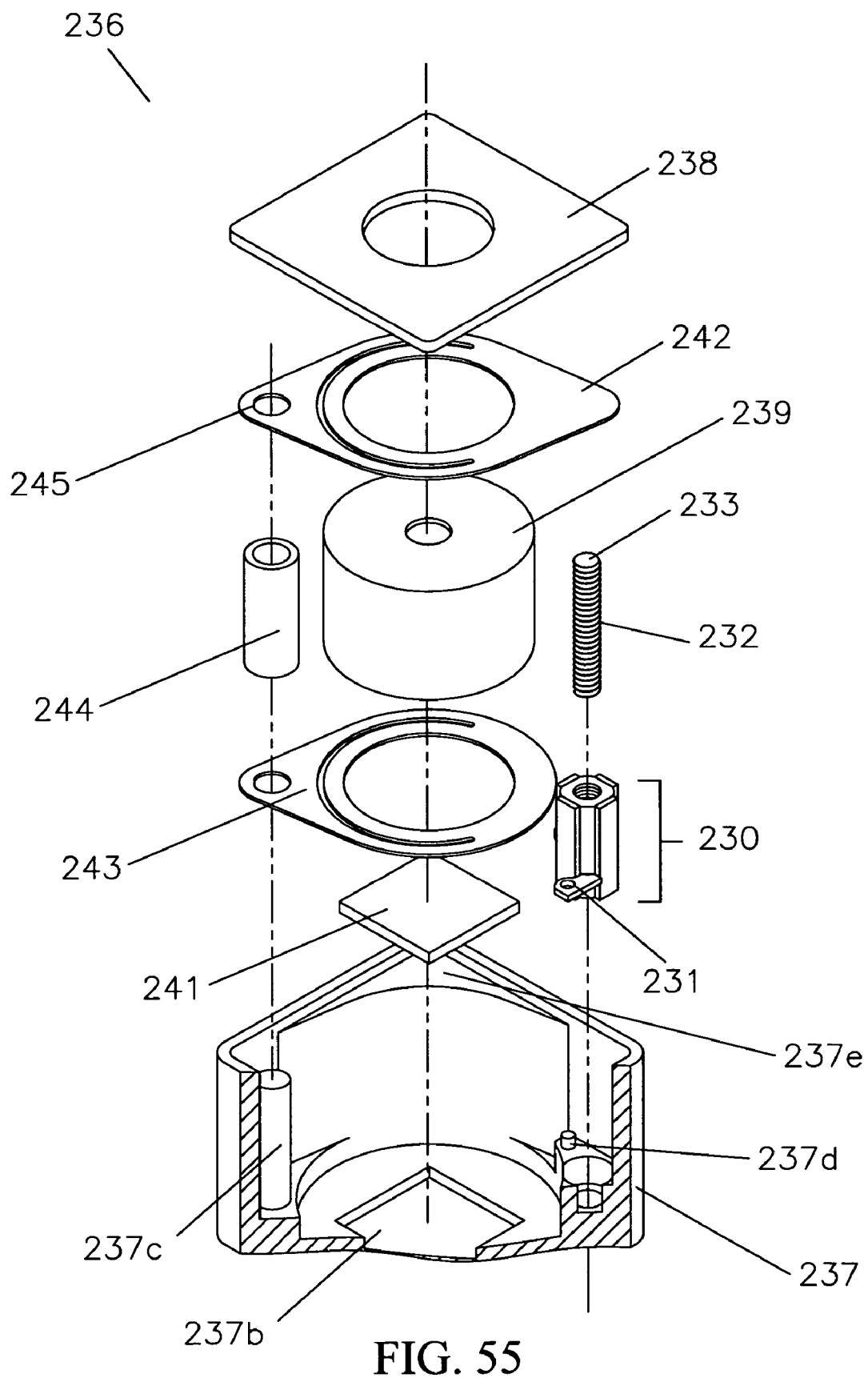

Referring to FIG. 55, the optical assembly 236 is assembled in a manner that all components can be mounted sequentially from one direction. The sensor 241 is installed in sensor receptacle 237b of housing 237. Motor 230 is fixedly attached to motor posts 237d in the housing 237. The upper lens flexure 242 and lower lens flexure 243 with spacer 244 are attached via adhesives or mechanical means such as press fitting to the lens 239. The spacer 244 is circumferentially fitted over spacer shaft 237c in housing 237. Orientation of the lens 239 may be maintained via a locating flat 245 on the upper lens flexure 242 and a corresponding feature on the spacer shaft 237c. The cover 238 is installed onto cover ledge 237e in the housing 237.

Figure 56:
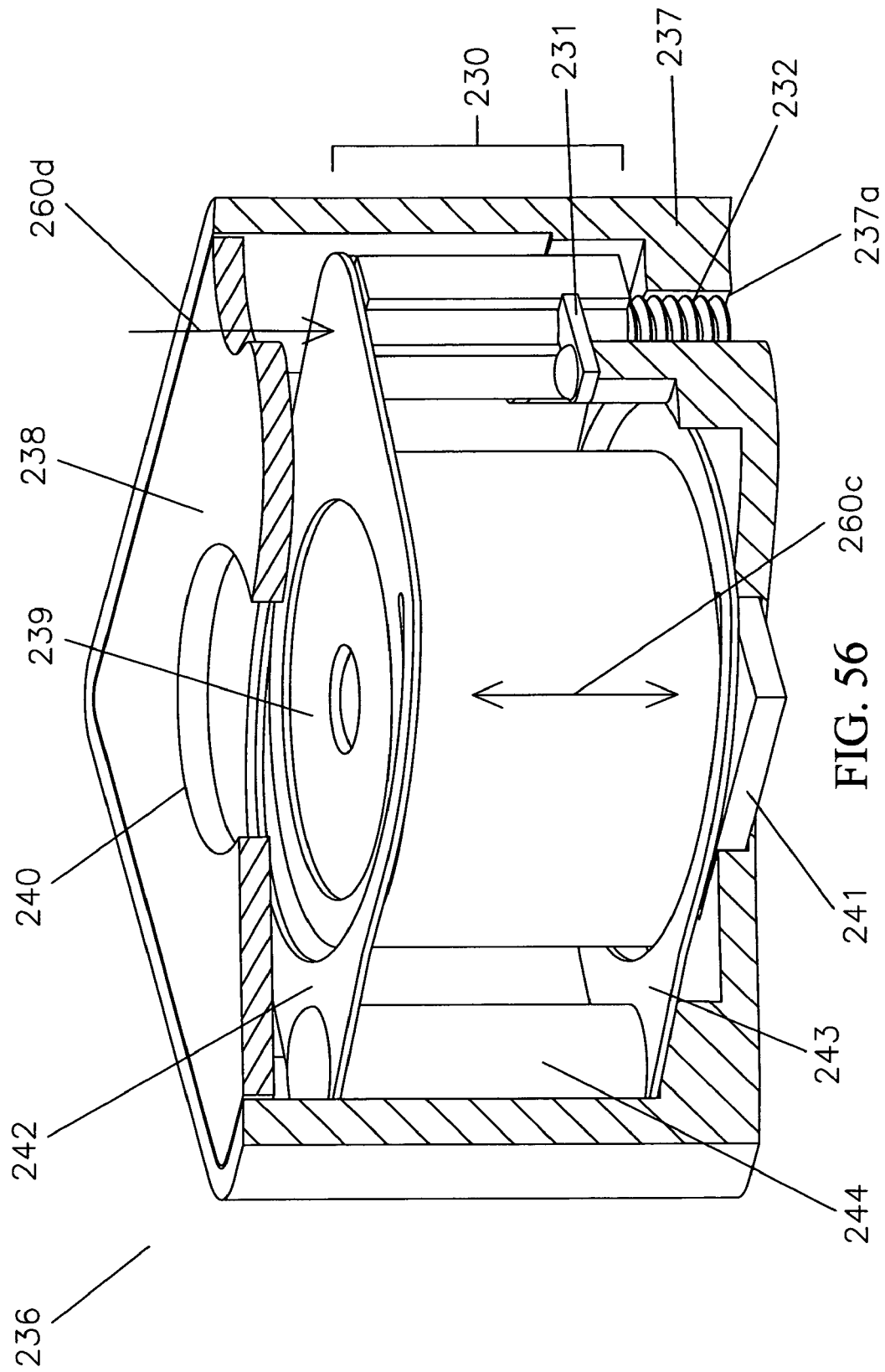
Figure 57:
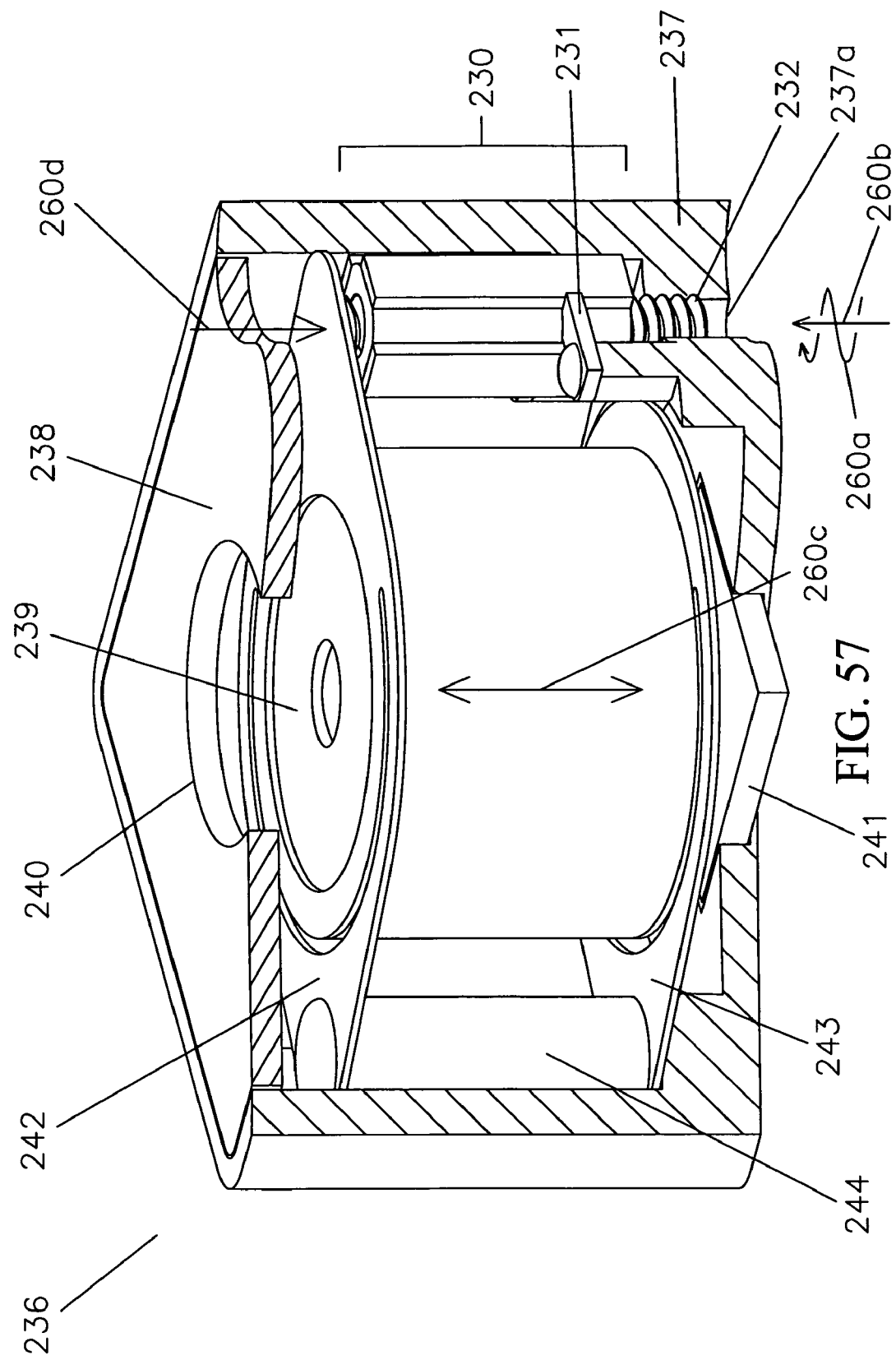
Figure 58:
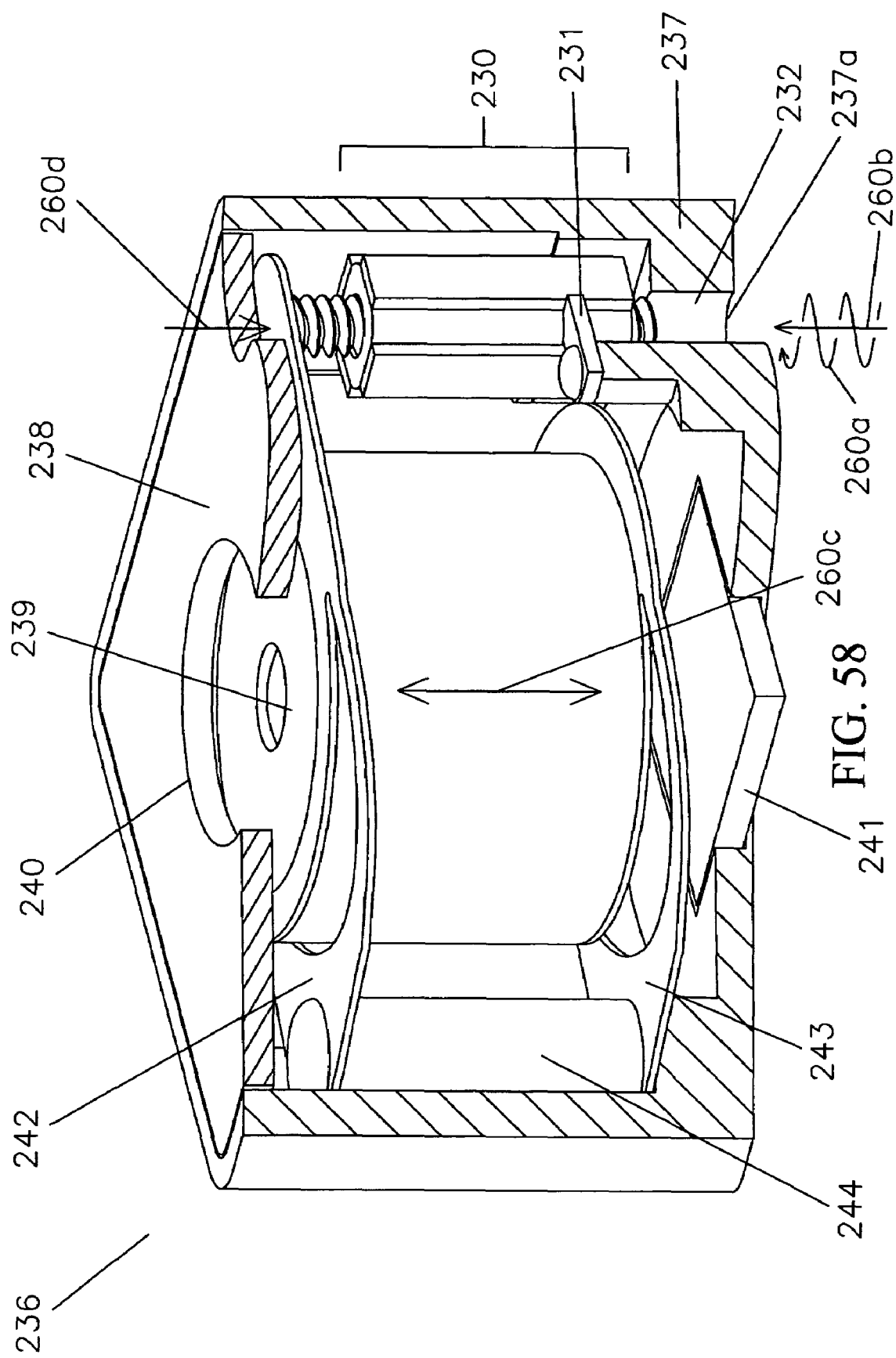

Referring to FIGS. 56 through 58, operation of the embodiment is detailed therein. FIG. 56 is a partial section view illustrating the threaded shaft 232 fully retracted inside the clearance hole 237a and the pre-bent flexures 242 and 243 are exerting preload force 260d onto the rounded rotation face 233, not shown. Lens 239 has motion 260c and moved to a position closest to sensor 241. FIG. 57 is a partial section view illustrating the threaded shaft 232 having incurred some rotational motion 260a and resultant translation 260b, effectually lifting flexures 242 and 243 and producing motion 260c which moves lens 239 to a position further away from sensor 241. FIG. 58 is a partial section view illustrating the threaded shaft 232 having incurred additional rotational motion 260a and resultant translation 260b, producing motion 260c and moving lens 239 to its maximum distance from sensor 241.

Figures 59A, 59B:
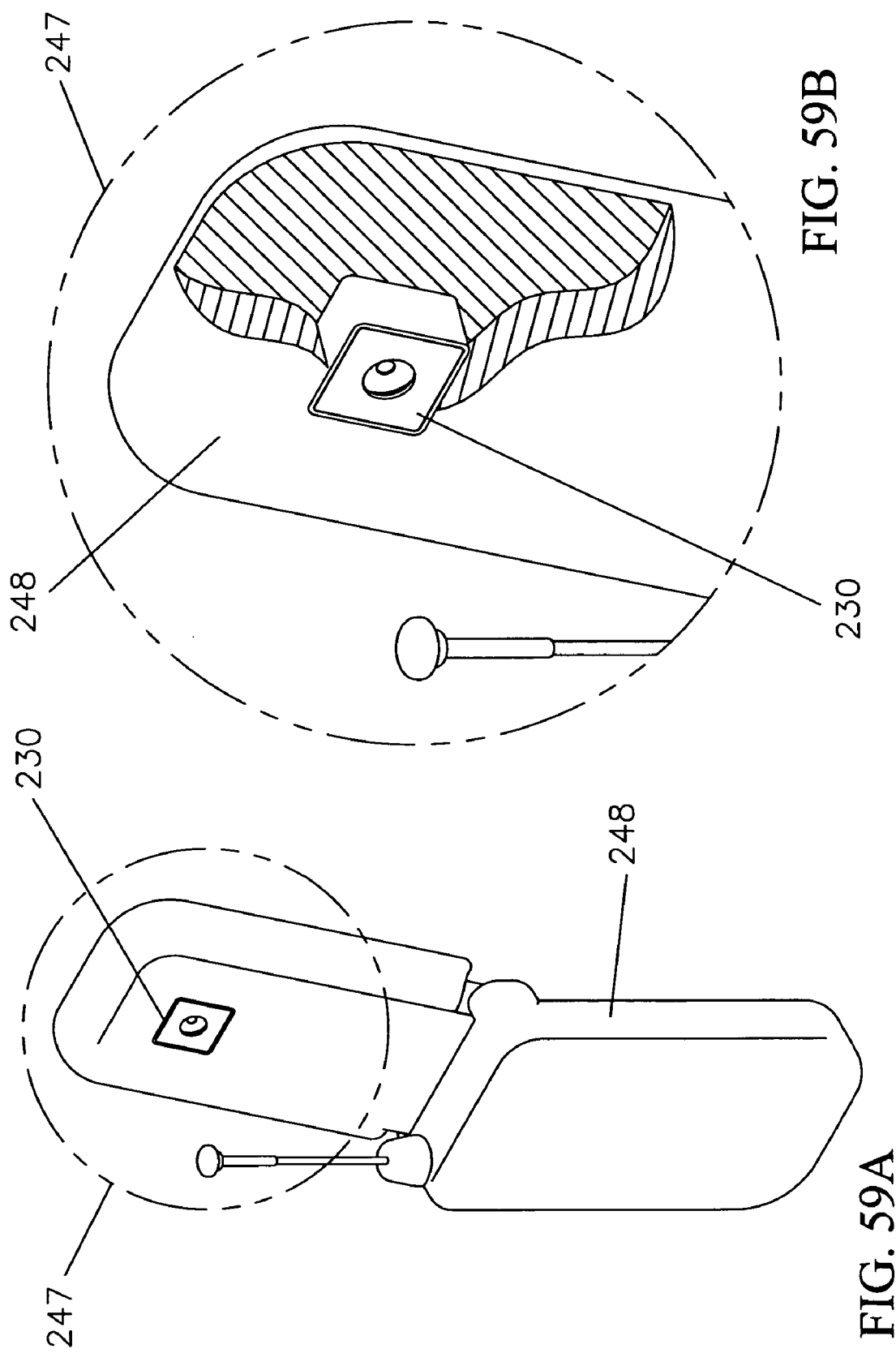

Referring to FIGS. 59A and 59B, it will be apparent that the optical assembly 236 will be fitted into a mobile phone 248. For the sake of simplicity of representation, the physical means of electrical connection to the various components of the optical assembly 236 and mobile phone 248 have been omitted from the figures.

Figure 60:
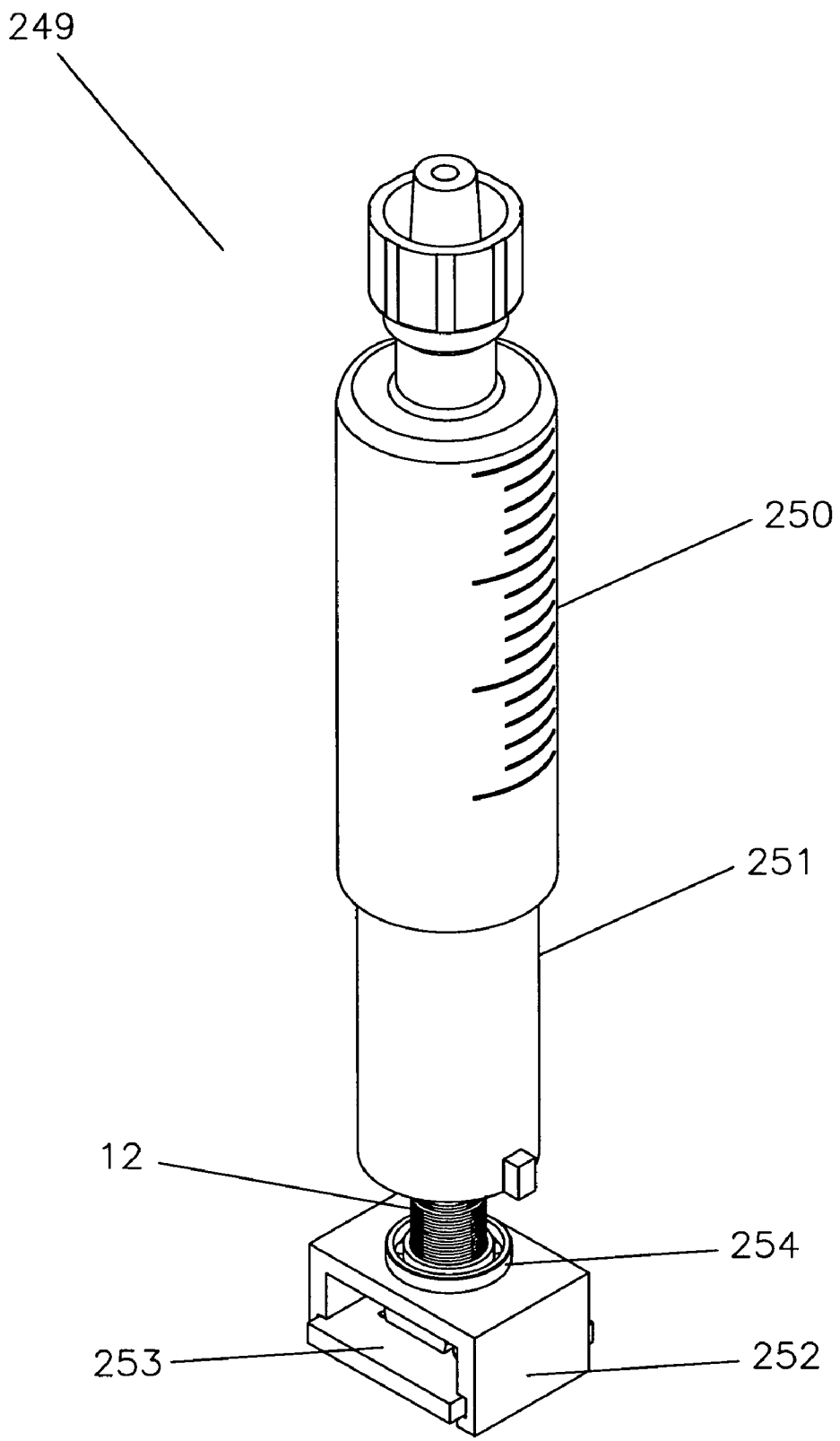
Figure 61:
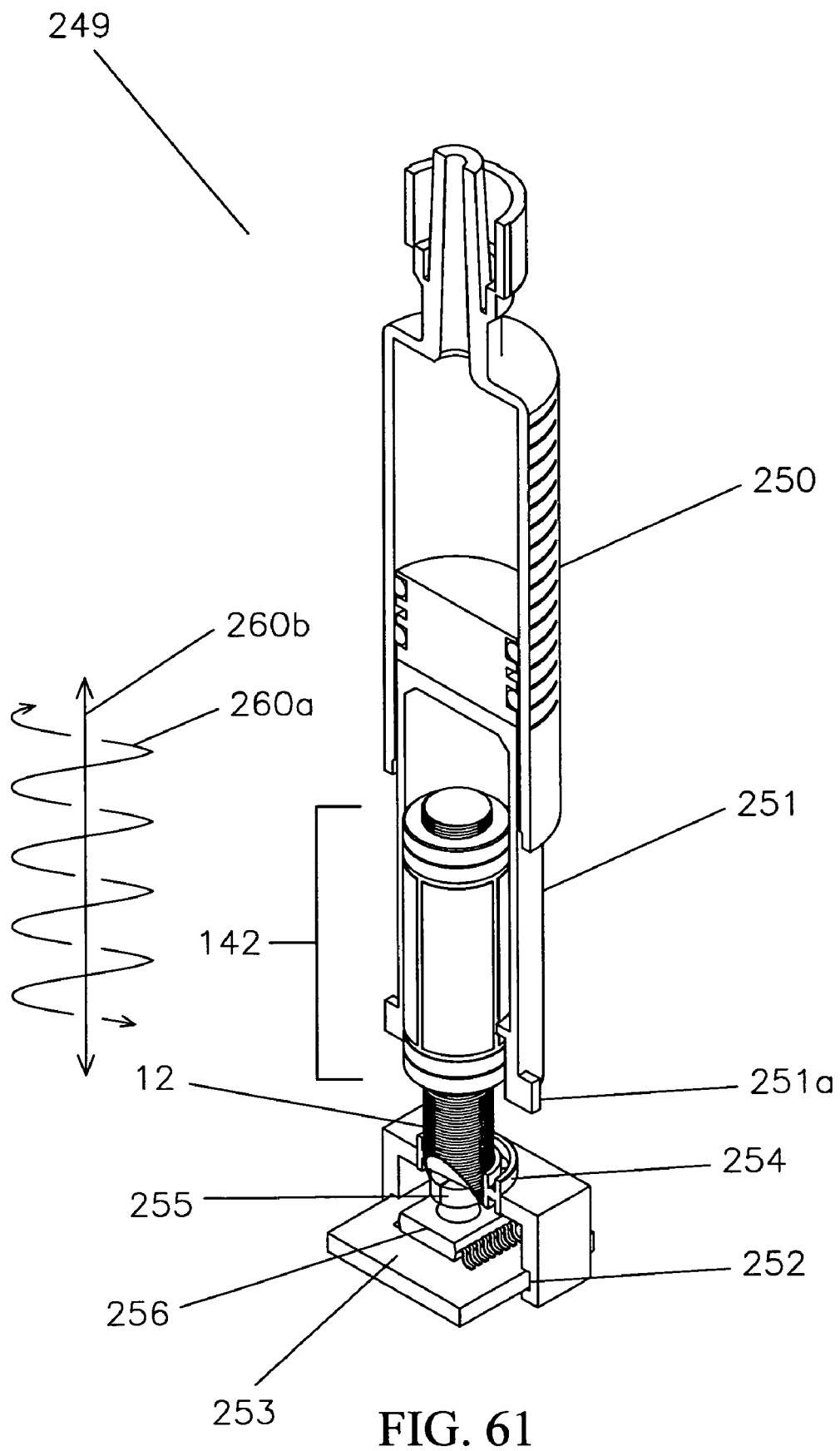

Referring to FIGS. 60 through 66, motor 142 integrates with syringe assembly 249. The syringe assembly 249 can be one of commercial medical availability and used in the likeness of products such as wearable fluid pumps. FIG. 60 depicts a perspective view of the syringe assembly 249 and embodied motor 142, best illustrated in FIG. 61. Motor 142 is housed in syringe plunger 251 engaged therewith syringe body 250. Threaded shaft 12 is circumferentially housed by rotational bearing 254 and fixedly accommodated in base 252. FIG. 61 is a partial section view of said embodiment wherein motor 142 is engaged therewith the syringe plunger 251 such that operating motor 142 will cause threaded shaft 12 to rotate 260a inside a low-friction bearing 254. The bearing 254 allows shaft rotation but prevents the shaft 12 from translating 260b which results in the motor housing 142 translating 260b. Housing 142 is attached to syringe plunger 251, thus, motor 142 and housing 251 translate 260b together but do not rotate.

A Hall Effect rotational position sensor 256 is integrates in housing 252 and measures the rotation of shaft 12. In this embodiment a commercial sensor is shown from Austria Microsystems Model AS5040 Magnetic Rotary Encoder. It is understood that many other types of position sensors may be incorporated that use others sensing methods including capacitance, inductance, optical and interferometry. A permanent magnet 255 is bonded to the end of shaft 12 with the north and south poles on opposite semicircles. As shaft 12 rotates the changing magnetic field is measured by sensor 256 and the amount of rotation converted to a digital electronics signal that transmitted by encoder circuit board 253.

Figure 62:
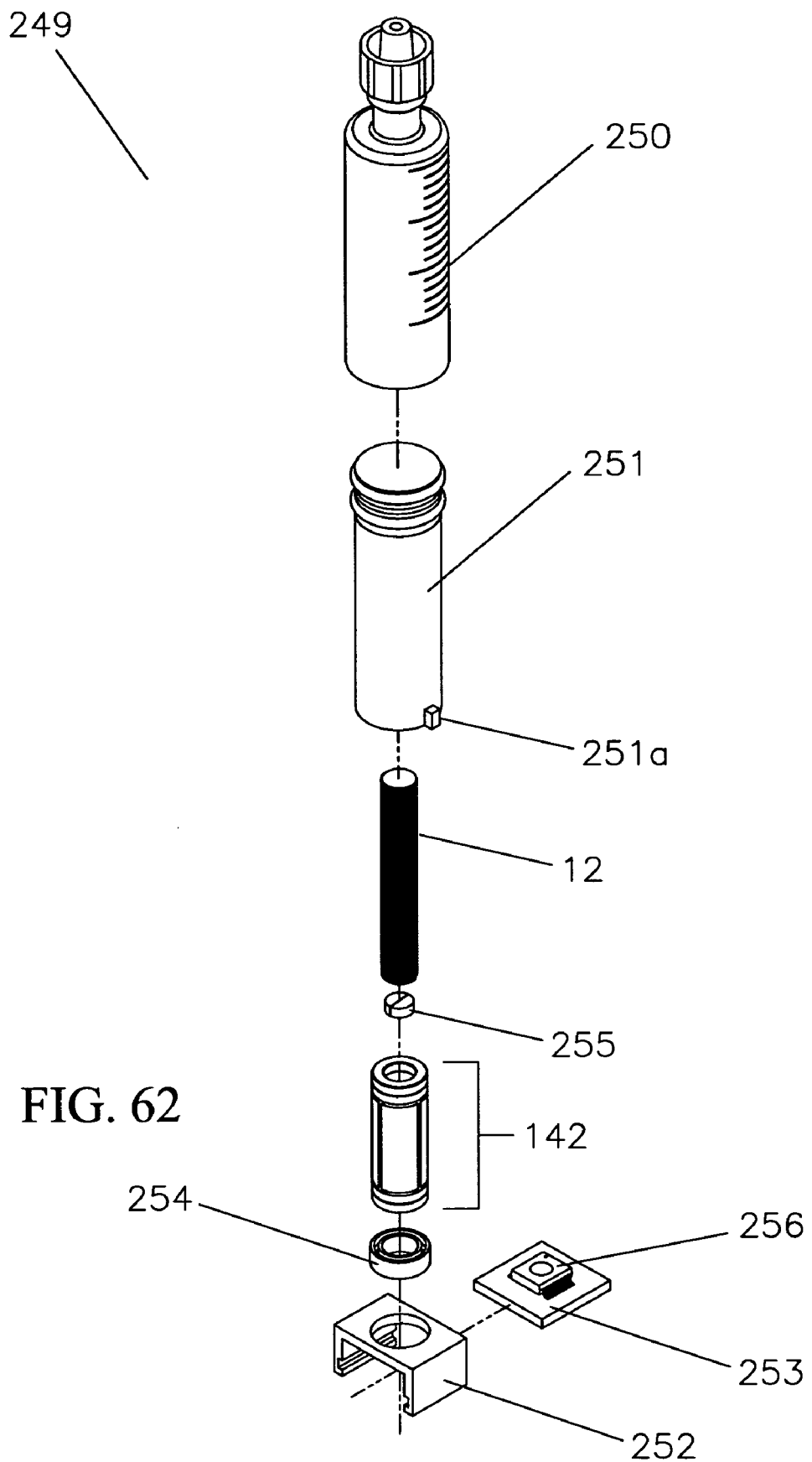

Referring to FIG. 62, an explode view is illustrated. The encoder circuit board 253 and its mounted encoder 256 are assembled within the base 252 therewith is mounted the rotational bearing 254. Magnet 255 is permanently installed with the threaded shaft 12 with a fixed clearance from sensor 256. The syringe plunger 251 is circumferentially held with the syringe body 250.

Figure 64:
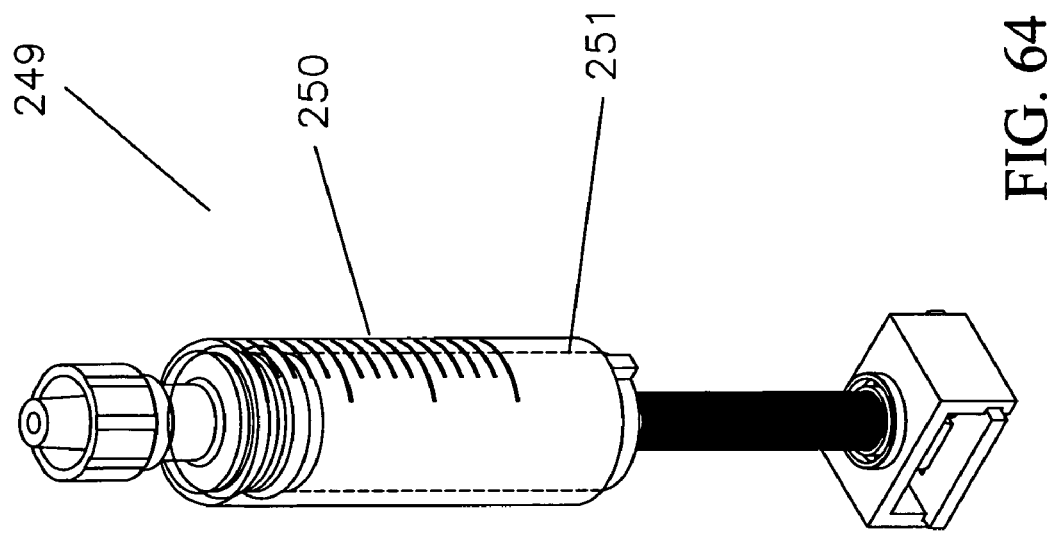
Figure 63:
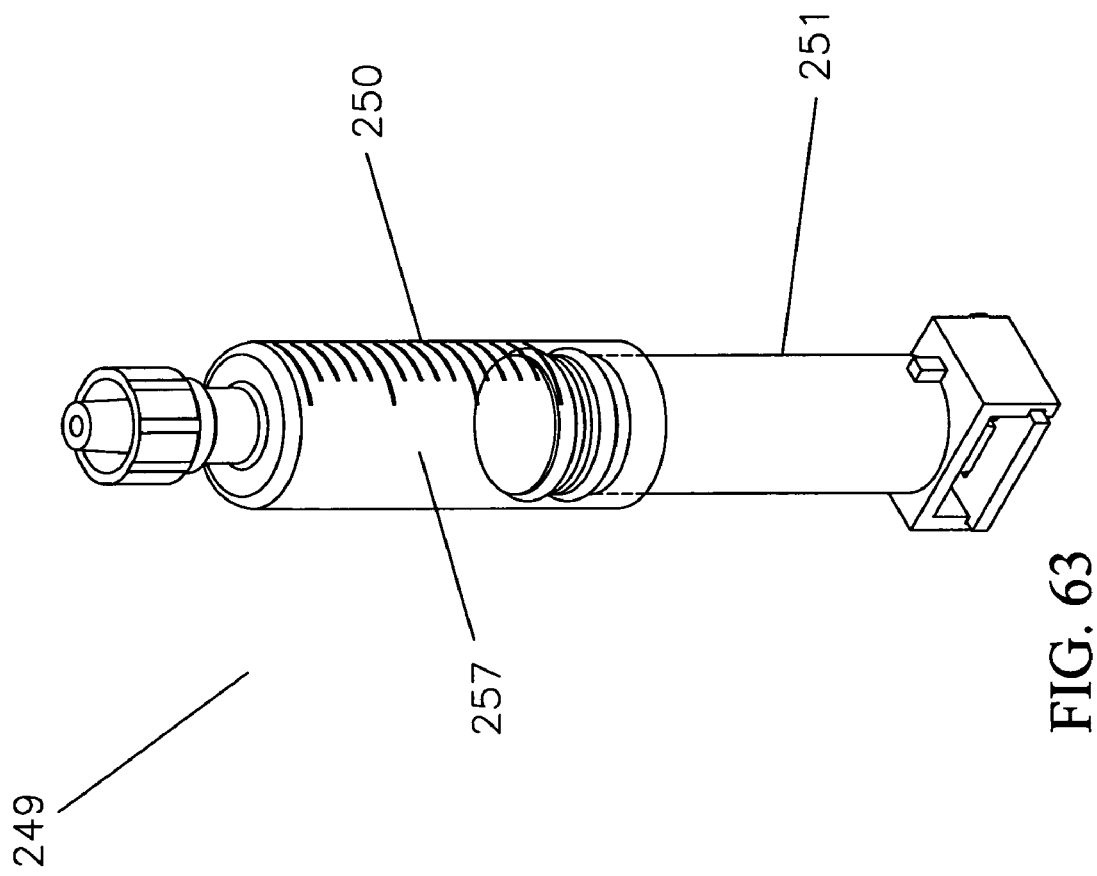

Referring to FIGS. 63 and 64, the operation of said embodiment is detailed. FIG. 63 illustrates a fully retracted motor 142, best shown in FIG. 61, and syringe plunger 251, allowing for a vacuous area 257 within the syringe body 250 for which a voluminous fluid can occupy. FIG. 64 illustrates a fully extended motor 142, best shown in FIG. 61, and syringe plunger 251, causing an inhabitance of the vacuous area 257 of FIG. 63 within the syringe body 250 and subsequent purging of any fluid within the syringe body 250.

Figure 66:
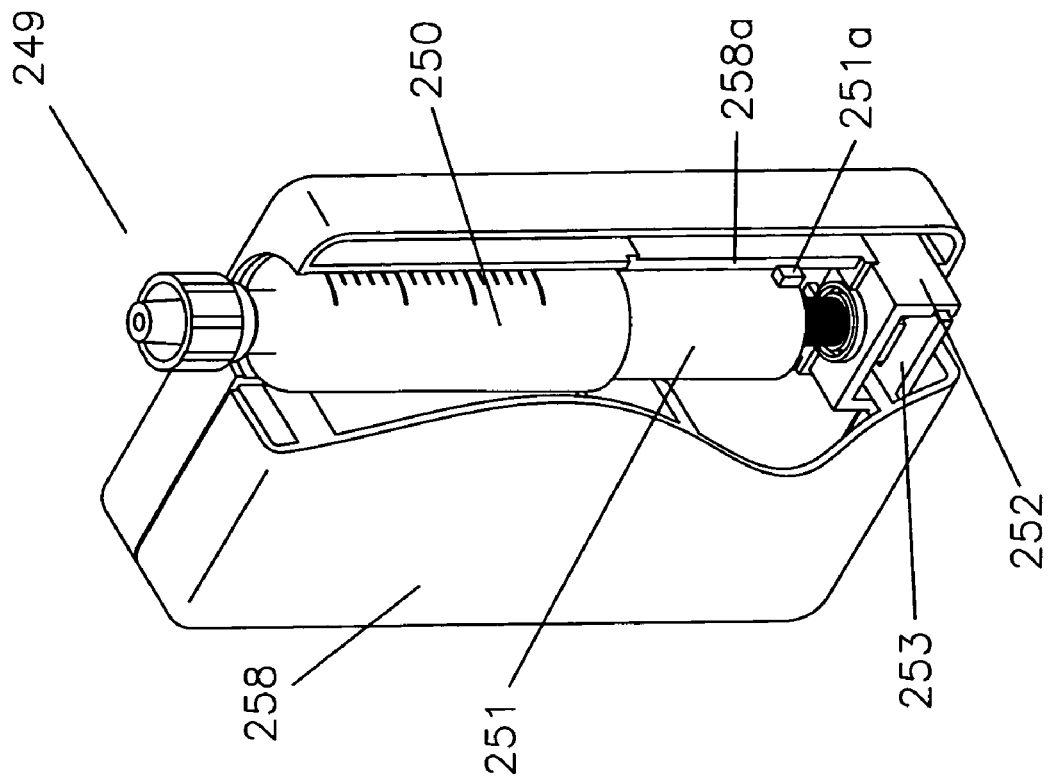
Figure 65:
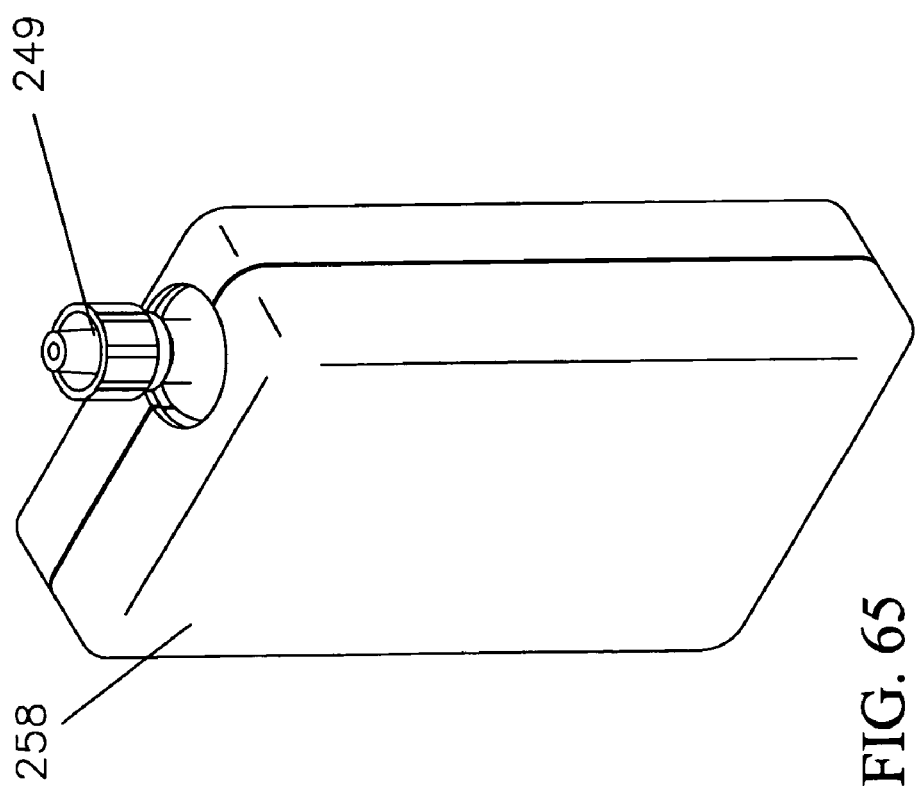

Referring to FIGS. 65 and 66, it will be apparent that the syringe assembly 249 will be fitted into a commercial medical product such as a fluid pump. For the sake of simplicity of representation, the physical means of electrical connection to the various components of the encoder circuit board 253 and motor 142 have been omitted from the figures. With specific reference to FIG. 65, the syringe plunger nests within the fluid pump 258 such that anti-rotation tab 251a engages tab rest 258a as to prevent rotation of the syringe plunger 251 during motor 142 operation.

Referring to FIG. 67A through 71D, a tangent motion limiting feature 261 is described as the preferred method of mechanically limiting forward and reverse travel in all embodiments without locking the threads. FIG. 67A is a perspective view of the tangent motion limiting feature 261. The threaded shaft 12 is extended and end cap 264 and thumb knob 265 are separated. Stationary tab 262 and revolving tab 263 are not engaged. FIG. 67B is a magnified scale view of the tangent motion limiting feature 261 (259 on FIG. 67A). FIG. 68A is a perspective view of the tangent motion limiting feature 261. The threaded shaft 12 is retracted and end cap 264 and thumb knob 265 are in close proximity of each other. Stationary tab 262 and revolving tab 263 are engaged. FIG. 68B is a magnified scale view of the tangent motion limiting feature 261 (266 on FIG. 67A).

Figure 69A:
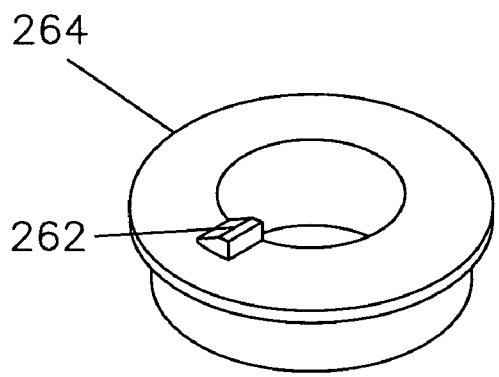
FIG. 69A is a perspective view of the stationary aspect of the tangent motion limiting feature.
Figure 69B:
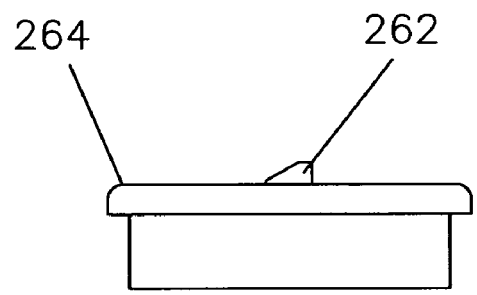
FIG. 69B is a side view detailing the stationary characteristic of the tangent motion limiting feature.
Figure 70A:
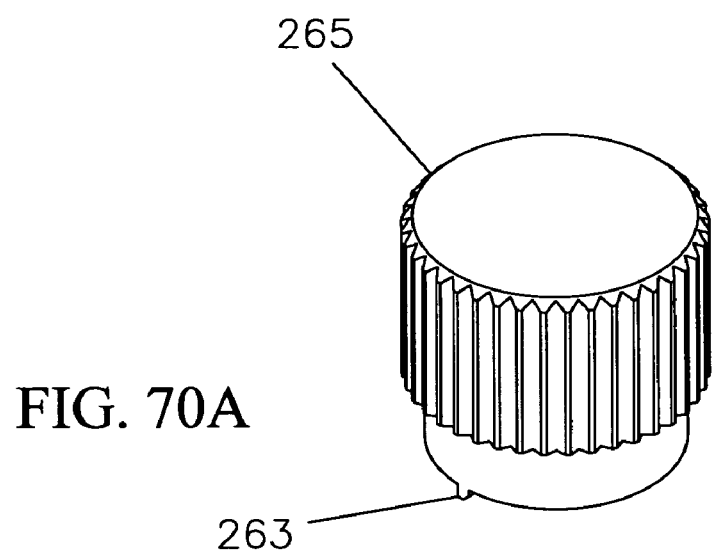
FIG. 70A is a perspective view of the revolving aspect of the tangent motion limiting feature.
Figure 70B:
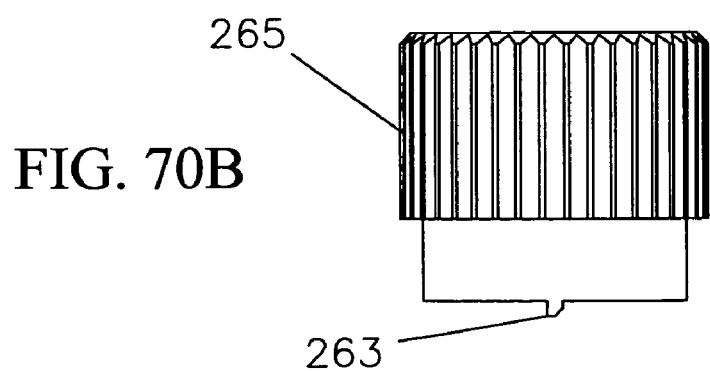
FIG. 70B is a side view detailing the revolving capacity of the tangent motion limiting feature.

Referring to FIGS. 69A through 70B, components of the tangent motion limiting feature 261 are illustrated. FIG. 69A is a perspective view of the end cap 264 and the stationary tab 262. FIG. 69B is a side view of the end cap 264 and the stationary tab 262. FIG. 70A is a perspective view of the thumb knob 265 and the revolving tab 263. FIG. 70B is a side view of the thumb knob 265 and the revolving tab 263.

Referring to FIGS. 71A through 71D, the operation of the tangent motion limiting feature 261 is detailed. FIG. 71A is a side view showing the threaded shaft 12 extended; end cap 264 and thumb knob 265 are separated. Stationary tab 262 and revolving tab 263 are not engaged. FIGS. 71B and 71C are side views wherein sequentially progressing, the threaded shaft 12 begins to rotate 260*a* and translate 260*b* such that the end cap 264 and thumb knob 265 begin to approach each other. Stationary tab 262 and revolving tab 263 are not engaged. FIG. 71D is a side view wherein, the threaded shaft 12 has rotated 260*a* and translated 260*b* such that the end cap 264 and thumb knob 265 have met. Stationary tab 262 and revolving tab 263 are engaged and shaft 12 motion is stopped without creating high axial load on the threads and subsequent locking that prevents motor operation.

Figure 49:
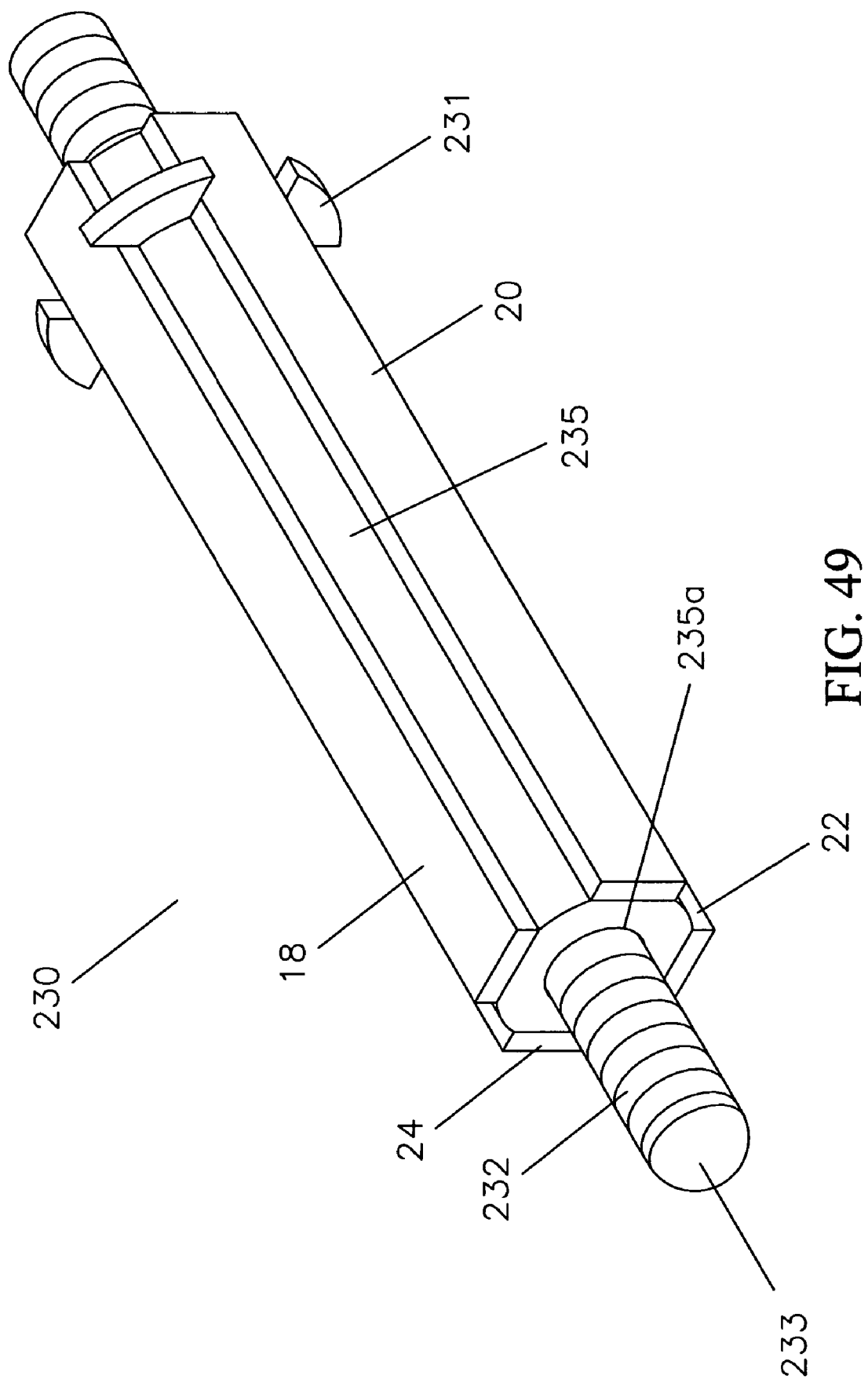

Referring to FIGS. 72 through 74C and the embodiment depicted therein, the motor 300 is comprised of a motor body 301 and is the same as motor 230 of FIG. 49 except flanges 231 are removed and printed circuit board 302 is attached via solder 303 to rectangular piezoelectric plates 18, 20, 22, and 24 to make electrical connections Vx 86, Vy 88, and ground 25 and to mechanically support the motor body 301 at the nodal point of the first bending resonance of the motor 300 where the vibration amplitude is minimized. It is preferred that the printed circuit board 302 be thin, preferably about 0.25 millimeters to about 0.50 millimeters thick.

A variety of suitable printed circuit boards are known to those skilled in the art. Reference may be had to U.S. Pat. Nos. 6,949,836; 6,954,985; 6,927,344; 6,483,713, 5,917,158; 5,398,163 and the like, the content of each of these patents is hereby incorporated by reference into this specification. In one embodiment, the printed circuit board is substantially rigid. In another embodiment, the printed circuit board is substantially flexible. In another embodiment, the printed circuit board is semi-flexible. In another embodiment, the printed circuit board is a multilayer circuit board, being comprised of a layer of insulting material. In one embodiment, such insulting material is selected from the group consisting of glass-epoxy, ceramic, polytetrafluoroethylene, and combinations thereof.

The motor body 301 is electrically connected to printed circuit board 302 using ground wire 335. Wire 335 is attached to the motor body 301 by spot welding or other means. Motor body 301 is common ground 25 for the rectangular piezoelectric plates 18, 20, 22, and 24. Electrical connections ground 25, Vx 86, and Vy 88 to the motor 300 can be made through the printed circuit board 302 at respective attachment points provided therein. Traversing central to the motor body 301 is a longitudinal threaded hole 304 (variations best shown in FIGS. 74B and 74C) through which a threaded shaft 232 with corresponding threads passes (illustrated by FIGS. 49 through 52 and 76 through 79C).

Figure 72:
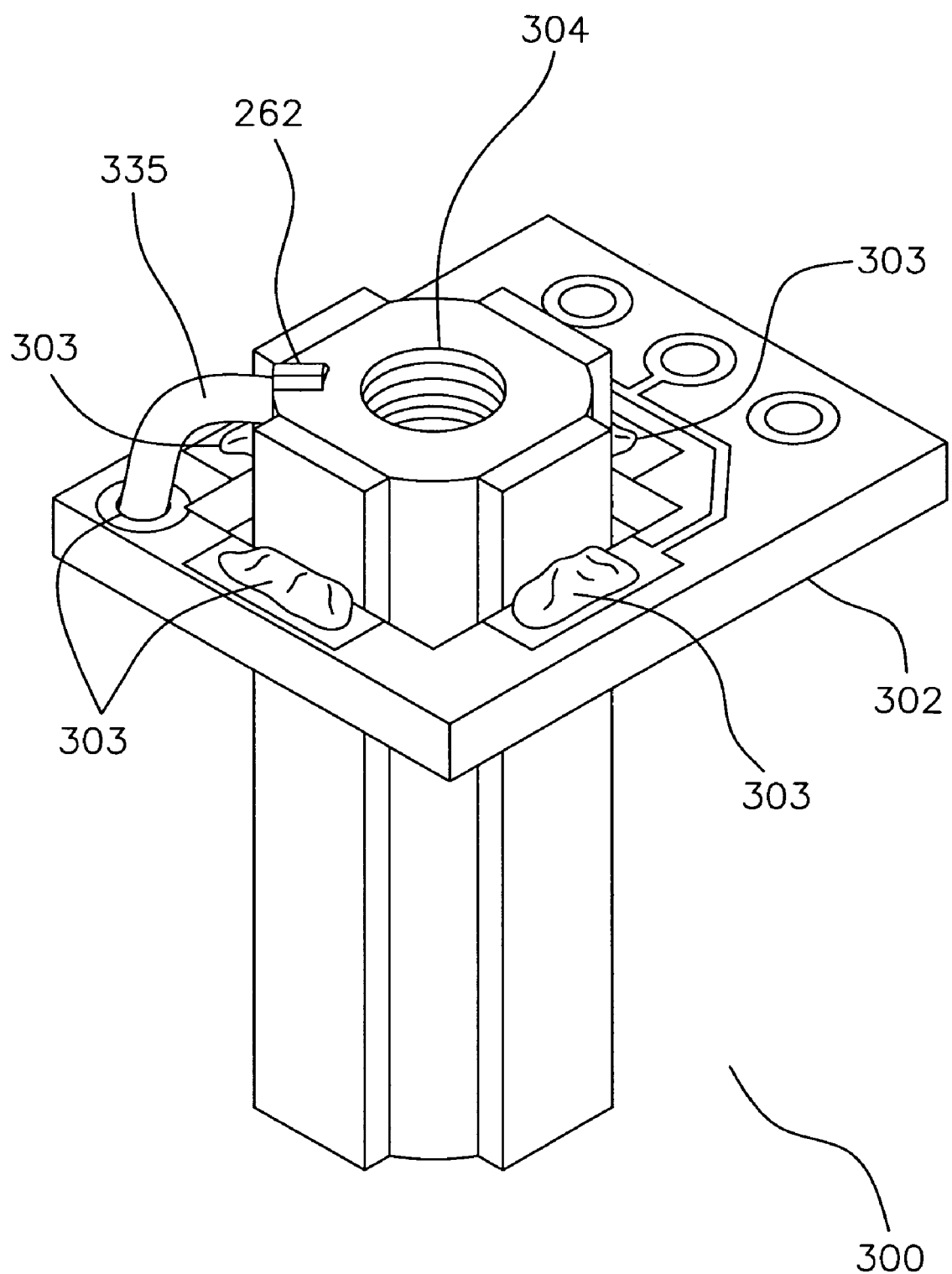
Figure 73:
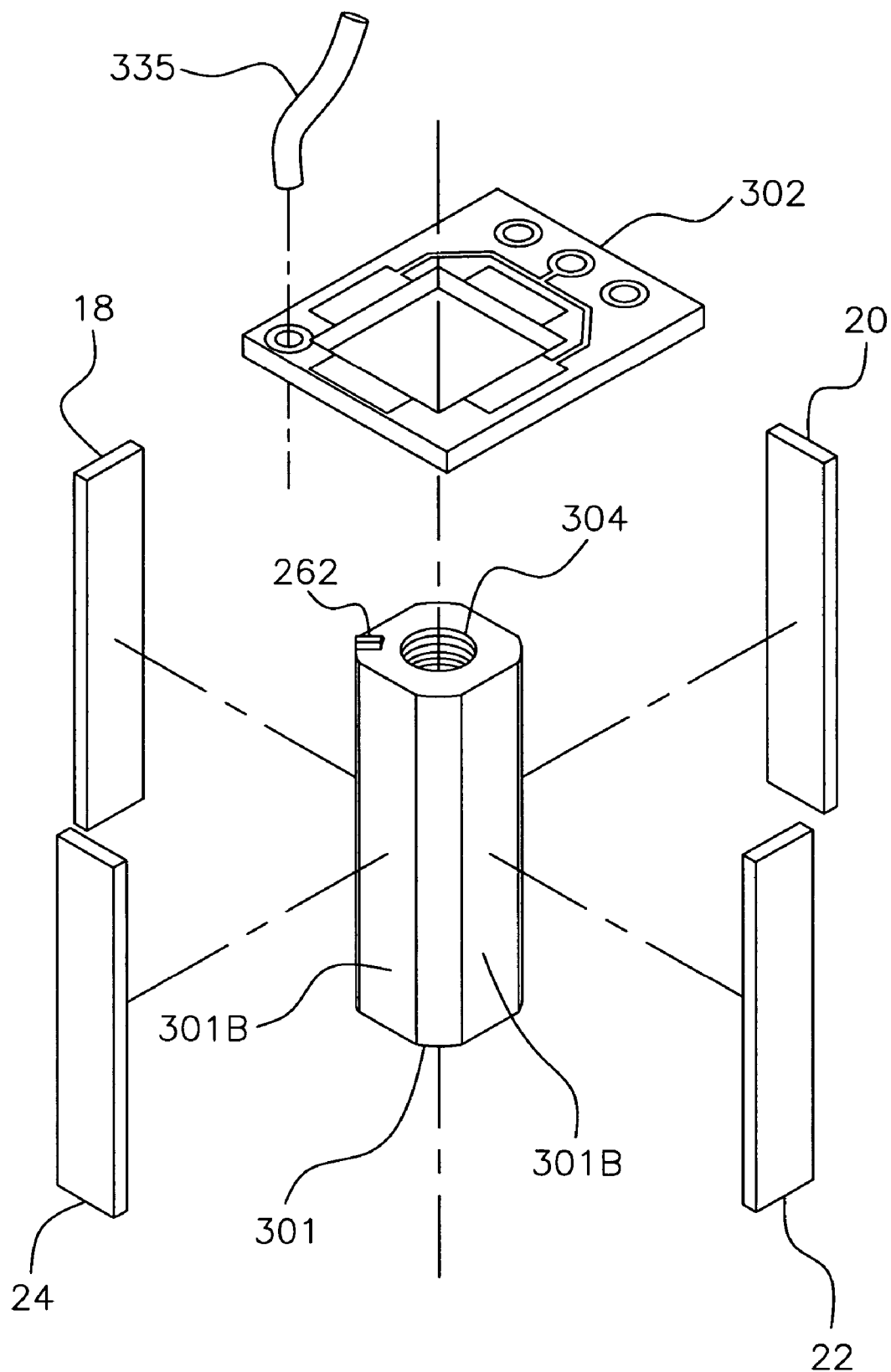

Referring to FIG. 73, an exploded perspective view of motor 300 of FIG. 72 illustrates the assembly of said embodiment. Rectangular piezoelectric plates 18, 20, 22, and 24 are bonded to an outer flat surface 301*b* of the motor body 301 in the same manner as described for motor 10 and motor body 14 with outer flat surfaces 37 in FIGS. 1 and 2.

Figure 74A:
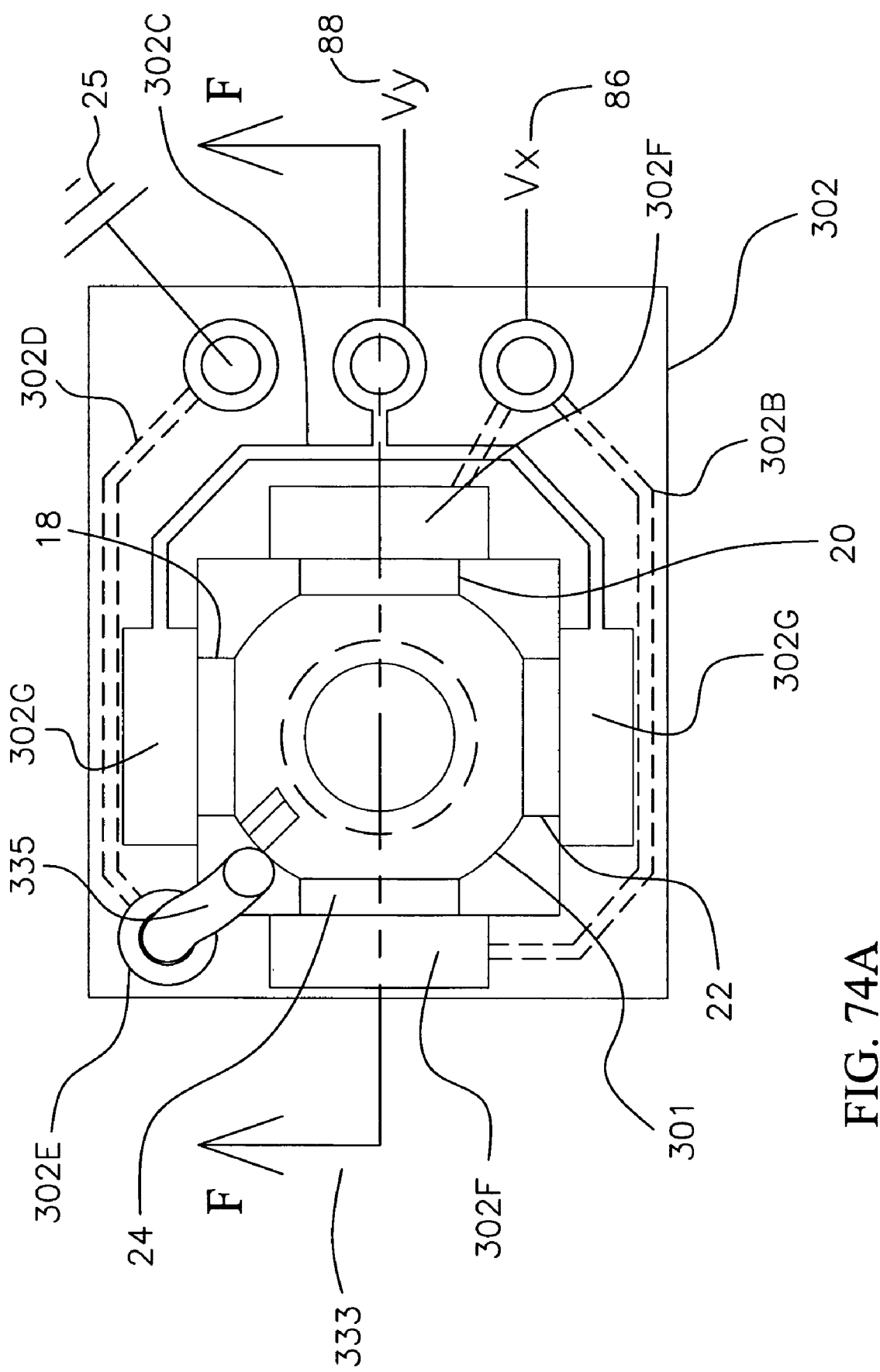

FIG. 74*a* is a top view of the motor 300 of FIG. 72. Evident is the electrical connections made by the printed circuit board 302, electrical traces 302*b*, 302*c*, and 302*d* to solder points 302*e*, 302*f*, and 302*g* with the following connections: Ground 25 via trace 302*d* to solder point 302*e* to ground wire 335 to motor body 301; Vx 86 via trace 302*b* to solder points 302*f* to rectangular piezoelectric plates 20 and 24; Vy 88 via trace 302*c* to solder points 302*g* to plates 18 and 22.

Referring to FIG. 74*b*, depicted is a cross-sectional view of the motor 300 taken along lines F-F (333) of FIG. 74*a*. Motor body 301 is fixedly attached to the printed circuit board 302 via solder 303. Particular to this embodiment, the longitudinal threaded hole 301*a* is fully disposed through the motor body 301.

FIG. 74*c* illustrates an alternative embodiment of motor 300 wherein a cross-sectional view is taken along lines F-F (333) of FIG. 74*a*. Motor body 301 is fixedly attached to the printed circuit board 302 via solder 303. Particular to the disclosed embodiment, the longitudinal threaded hole 301*a* is partially disposed through the motor body 301. Portions internal to the motor body 301 that do not come into contact with the threaded shaft 232 will consist of an oversized hole 301*c* so as to not engage the threaded shaft 232. Threaded shaft 232 is not shown in FIGS. 72 through 74*c* for clarity, but can be referenced in FIGS. 49-51. Referring inclusively to motor 300 as shown in FIG. 72 through 74B, the operation of which is identical to motor 10 shown in FIGS. 1-4 and operating diagrams shown in FIGS. 18 and 19 and motor 230 shown in FIGS. 49 through 52.

Figure 75:
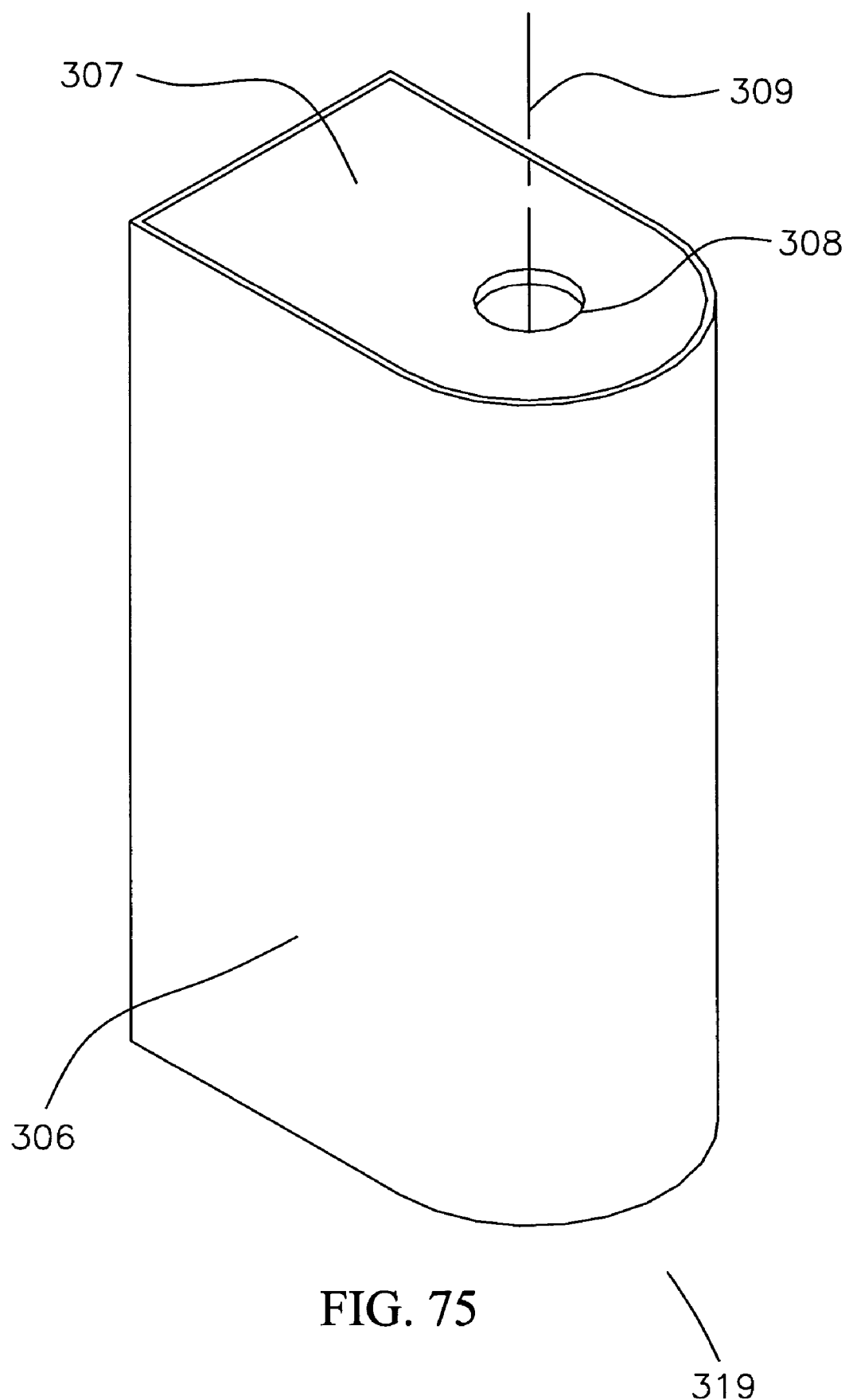

Referring to FIG. 75, a perspective view of the motor 300 of FIG. 72 is incorporated into a camera 319 with auto focus and optical zoom capabilities. A camera body 306 contains therein an end cover 307 and aperture 308 located axially with respect to the optical axis 309 of an auto focus lens assembly 310 and an optical zoom lens assembly 311 best illustrated in FIG. 76. In the embodiment depicted, focusing assembly 310 has a focusing aperture and zooming assembly 311 has a zooming aperture. Each of these apertures are configured such that an optical axis 309 passes through both apertures. Such focusing lenses are well known to those skilled in the art. Reference may be had to U.S. Pat. Nos. 6,311,020; 5,654,757, 5,408,332, 4,354,203; 4,236,794 and the like. Such optical zoom lenses, also referred to as telescopic lenses, are likewise well known. Reference may be had to U.S. Pat. Nos. 6,430,369; 5,774,282; 5,528,429, 5,461,442, 4,871,240, and the like. The content of each of the aforementioned patents is hereby incorporated by reference into this specification.

Figure 76:
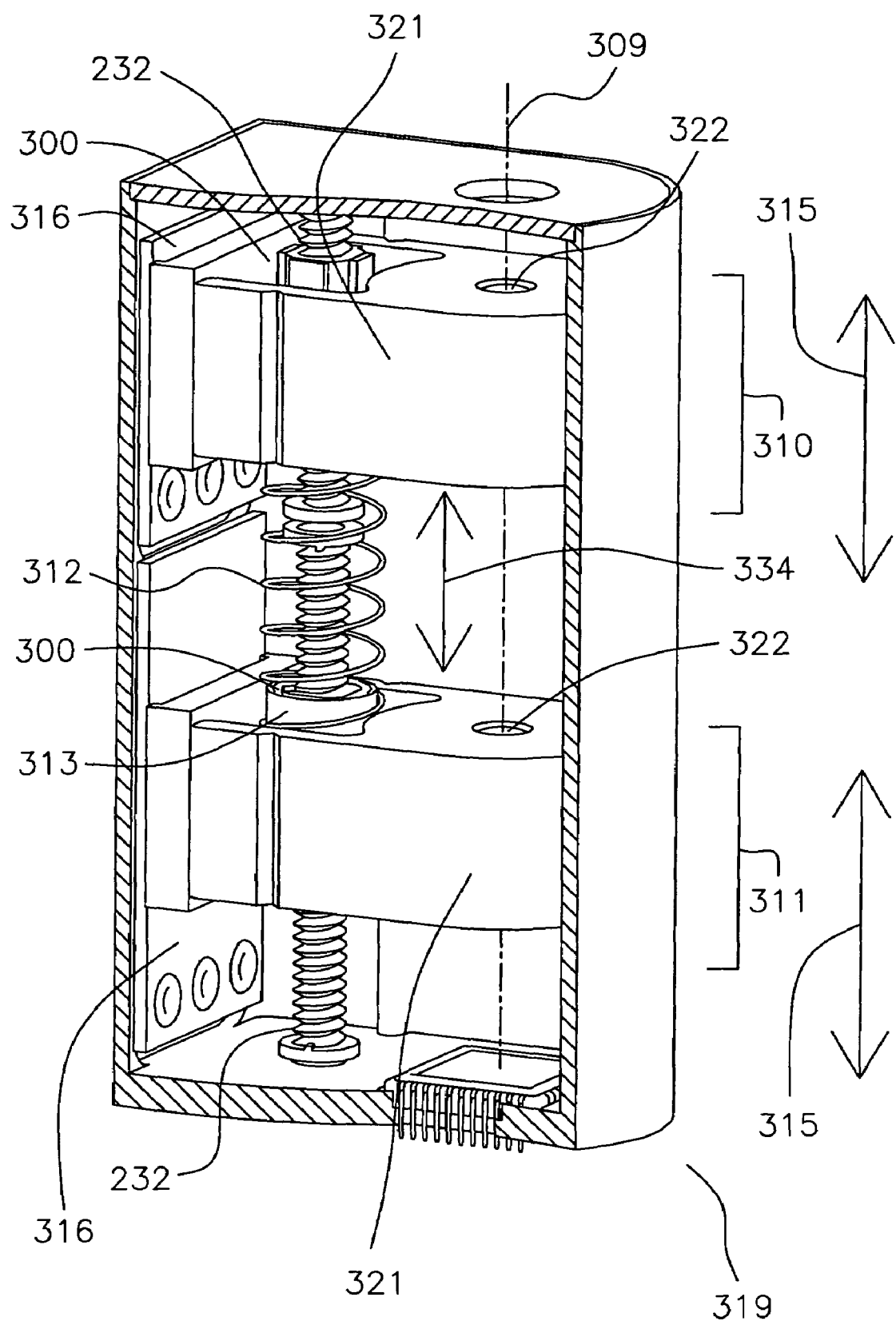

Referring to FIG. 76, a partial section view of the camera 319 is shown. For the sake of simplicity of representation, the physical means of electrical connection to the various electronic components have been omitted from the figures. Contained therein the auto focus lens assembly 310 and an optical zoom lens assembly 311, each consisting of a lens body 321 and optic 322, are fixedly attached to opposing motors 300 and their respective printed circuit boards 302 via adhesive or a press fit into an accommodating slot 321*a* of the lens body 321, best evidenced by FIG. 76*a*. Motors 300 are preloaded in opposite directions evidenced by an arrow 334 by a single spring 312 insulated from and mounted concentrically to each motor 300 by insulators 313 (see FIG. 76A), each resting thereupon the printed circuit board 302 in an opposed manner, plus applying a force to each printed circuit board 302, best shown in FIG. 76*a*. Threaded shaft 232 is disposed within the spring. Each motor 300 translates upon its respective concentric mounted threaded shaft 232 thus inducing linear motion as indicated by an arrow 315 of the auto focus lens assembly 310 and an optical zoom lens assembly 311 with respect to the optical axis 309. In this embodiment, the threaded shafts 232 rotate but do not translate. The motors 300 translate and move the optical assemblies. The threaded shafts 232 rotate independently. In the embodiment depicted, the threaded shaft 232 of focus lens assembly 310 is aligned (i.e. in line with) the threaded shaft 232 of optical zoom lens assembly 311. With respect to the identified embodiment, commercially available linear position sensors 316 such as a Panasonic EVA-W7LR04B34 linear potentiometer or the like can be incorporated in such a manner to provide closed-loop feedback and ultimately absolute positional information for the auto focus lens assembly 310 and an optical zoom lens assembly 311. Position sensors 316 can be mounted to auto focus lens assembly 310 and an optical zoom lens assembly 311 by adhesives, friction, or other semi-permanent or permanent assembly processes, or other suitable means for attaching position sensor 316.

Figure 76A:
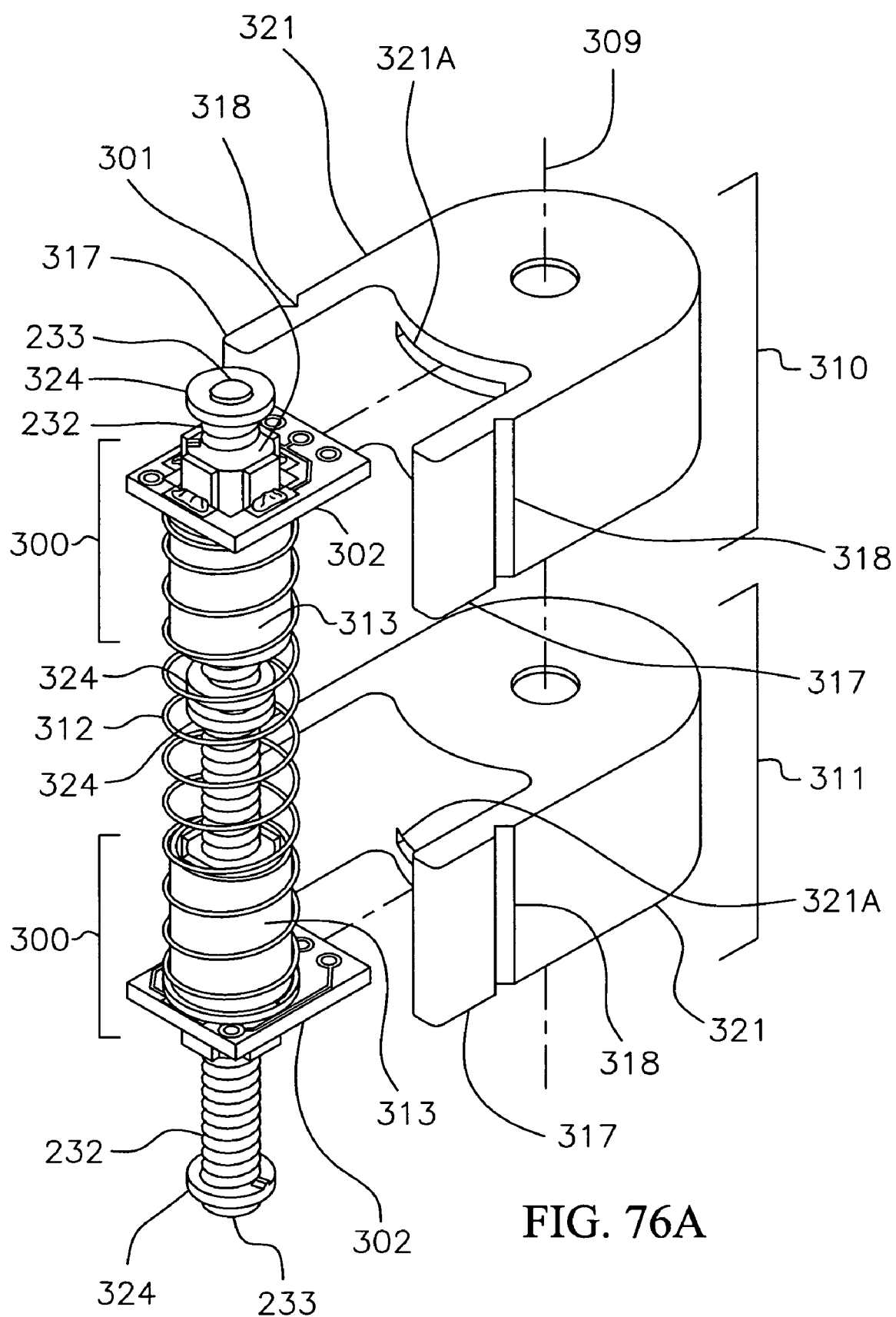

FIG. 76*a* is a partially exploded perspective view of the camera 319 illustrating the assembly of the printed circuit board 302 of the motor 300 into the lens body 321 of the auto focus lens assembly 310 and optical zoom lens assembly 311.

Figure 77:
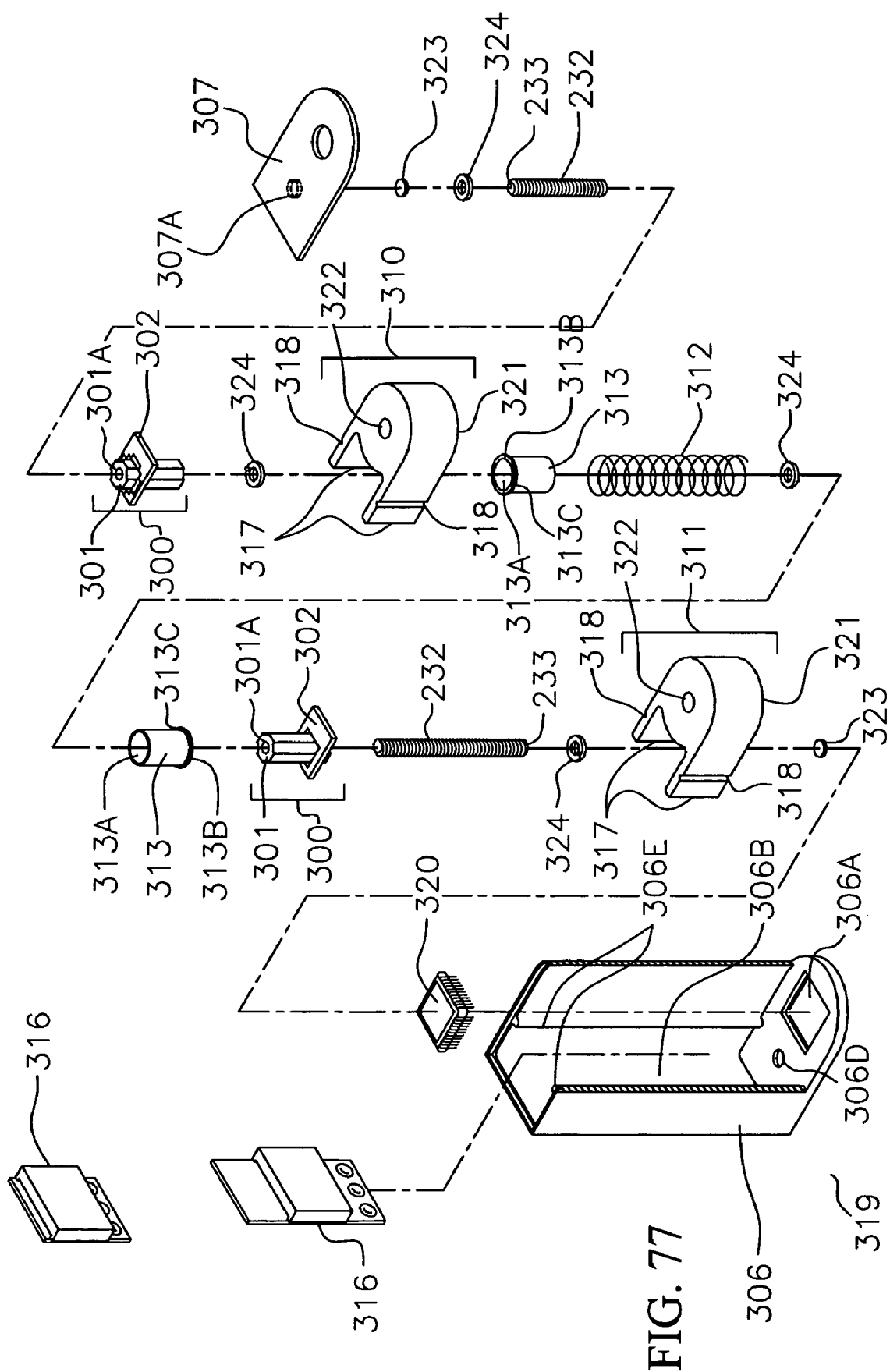

FIG. 77 is an exploded perspective view of the camera 319 in which the camera body 306 is shown in partial section for clarity. Within a recess 306*a* the camera body 306 houses a fixedly attached image sensor 320 which can be of the persuasion of commercially available color CMOS (Complementary Metal Oxide Semiconductor) image sensors like an OmniVision OV03610-C00A or the like. Position sensor 316 may be mounted to an internal rear surface 306*b*. The moving portions of position sensors 316 are attached to arms 317 of the lens body 321 and measure the position of the auto focus lens assembly 310 and optical zoom lens assembly 311. Grooves 318 in arms 317 engage on shared rails 306*e* to create linear guides parallel to the optical axis 309. A rotational rest pad 323 is permanently installed in a pocket 306*d* of housing 306 of camera 319 and upon which rests a rounded shaft end 233 of threaded shaft 232 with a circumferentially disposed limit stop 324, which is similar in function to knob 265 shown in FIGS. 61-71D. Printed circuit board 302 of motor 300 is attached to the lens body 321 into slot 321*a* using adhesive or other similar permanent assembly methods. Grooves 318 of the lens body 321 allow for the insertion and positioning of the lens body 321 upon opposing rails 306*e* of camera body 306 providing for the linear motion of the lens body 321 parallel to the optical axis optical axis 309 of the camera 319. With respect to the camera body 306 and the motor body 301 of motor 300 contained therein, the threaded shaft 232 is passed through and engaged within a threaded hole 301*a*. Insulator 313 is assembled over motor 300 such that the bore 313*a* rests concentric to the threaded shaft 232 engaged by motor 300 and a shoulder 313*b* is coincident with the printed circuit board 302. A limit stop 324 is circumferentially assembled to the end opposite the rounded shaft end 233 of the threaded shaft 232. Axially coincident upon the insulator 313 rests spring 312 onto a ledge 313*b*. In an opposing fashion, an additional insulator 313 rests axially coincident such that the ledge 313*c* rests against the exposed end of the spring 312. An additional threaded shaft 232 with circumferentially attached limit stop 324 proximally located at the end opposite the rounded shaft end 233 of the threaded shaft 232 is axially engaged within the threaded hole 301*a* of the motor body 301 of motor 300. Another motor 300 is attached to the lens body 321, which comprises the auto focus zoom lens 310, by bonding the printed circuit board 302 into slot 321*a* or other similar permanent assembly method. Grooves 318 of the lens body 321 allow for the insertion and positioning of the lens body 321 upon opposing rails 306*e* of camera body 306 providing for the linear motion of the lens body 321 parallel to the optical axis optical axis 309. With respect to the camera body 306 afore mentioned assembly the motor 300, threaded shaft 232, and lens body 321 which comprise the auto focus lens assembly 310 is assembled so as to cause the printed circuit board 302 of motor 300 to seat firmly against shoulder 313*b* of insulator 313. A limit stop 324 is circumferentially attached to the rounded shaft end 233 of the threaded shaft 232. A rotational rest pad 323 is permanently installed in a pocket 307*a* (shown in dashed lines) of end cover 307 and upon which rests the rounded shaft end 233 of threaded shaft 232 with the conclusion of the assembly by attachment of the end cover 307 of the camera 319 into the camera body 306. The end cover 307 may be permanently attached to the camera body 306 by using adhesive, mechanical force fit, or the like.

Referring to FIGS. 78*a* through 78*c*, partial section perspective views illustrate the linear motion of the optical zoom lens assembly 311 as identified by the motion described by a linear arrow 325. FIG. 78*a* depicts the optical zoom lens assembly 311 fully retracted, farthest from the aperture 308 of camera 319. The auto focus lens assembly 310 is shown stationary for reference. As the motor 300 (hidden from view) is activated, the threaded shaft 232 rotates, in this case in a clockwise direction evidenced by a rotation arrow 326, inducing a vertical linear motion onto the optical zoom lens assembly 311 indicated by the linear arrow 325 shown in FIG. 78B. FIG. 78C illustrates the continued linear travel explained by the linear arrow 325 of the optical zoom lens assembly 311 induced by the activation of the motor 300 and the subsequent clockwise rotation shown by the rotation arrow 326 of the threaded shaft 232.

Referring to FIGS. 79*a* through 79*c*, partial section perspective views illustrate the linear motion of the auto focus lens assembly 310 as identified by the motion described by a linear arrow 327. FIG. 79*a* depicts the auto focus lens assembly 310 fully retracted, farthest from the aperture 308 of camera 319. The optical zoon lens 311 is shown stationary for reference. As the motor 300 (partially obscured from view) is activated, the threaded shaft 232 rotates, in this case in a clockwise direction evidenced by a rotation arrow 328, inducing a vertical linear motion onto the auto focus lens assembly 310 indicated by the linear arrow 327 shown in FIG. 79B. FIG. 79C illustrates the continued linear travel explained by the linear arrow 327 of the auto focus lens assembly 310 induced by the activation of the motor 300 and the subsequent clockwise rotation shown by the rotation arrow 328 of the threaded shaft 232.

Referring to FIGS. 80*a* and 80*b*, the camera 319 is shown in a typical application used within a mobile phone 329. For the sake of simplicity of representation, the physical means of electrical connection to the various components of the camera 319 and mobile phone 329 have been omitted from the figures. FIG. 80*a* is a perspective view showing a typical placement of the described embodiment of the camera 319 (shown in dashed lines) within a mobile phone 329. FIG. 80*b* is an enlarged partial section view of FIG. 80*a* (330 of FIG. 80*a*) showing a particular embodiment wherein light 331 is directed into the camera aperture 308 of a mirror 332 or other similar prismatic device.

Figure 81:
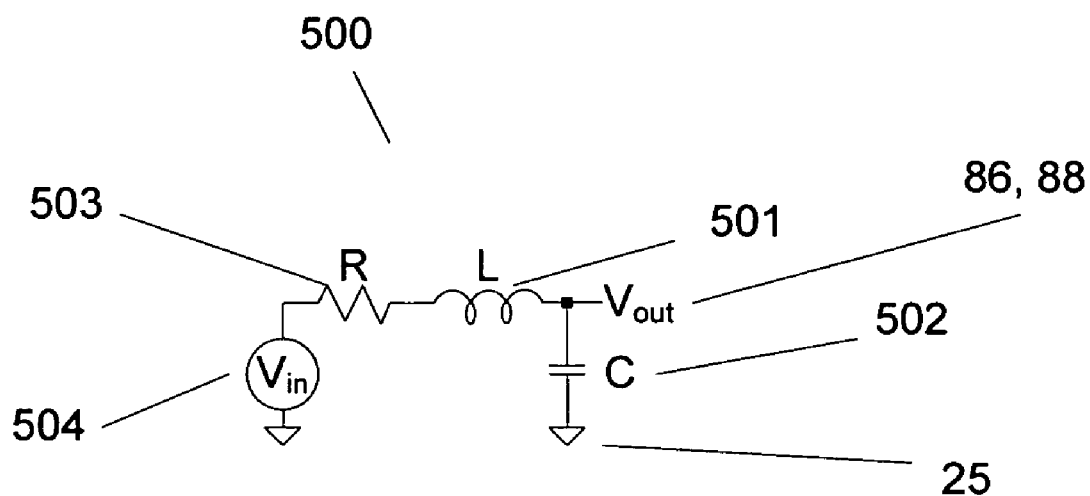
Figure 82:
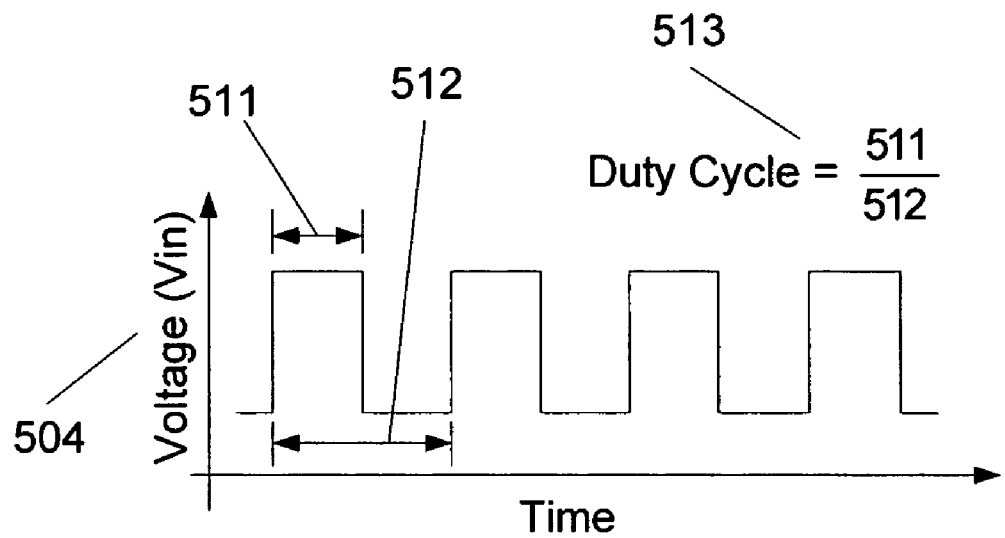

Referring to FIG. 81 and 82, it is well understood by those skilled in the art that a series resonant circuit 500 consisting of an inductor 501, capacitor 502 and resistor 503 will develop a voltage gain across the capacitor 502 when the input voltage is a sine wave oscillating at the resonant frequency ($\omega_r$). From the well established formulas of resonant circuits and based on the input frequency $\omega_r$, inductance L, capacitance C and resistance R the gain of this circuit (also known as the quality factor or Q), is derived. Note that $X_L$ is the reactive inductance and $X_C$ is the reactive capacitance of the circuit. These relationships are shown in these equations at the resonant frequency:

$$\omega_r=1/SQRT(LC)$$

$$X_L=L\omega_r;\ X_C=1/(C\omega_r)$$

$$Q=X_L/R=X_C/R$$

Piezoelectric or electrostrictive actuators (for example plates 18, 20, 22, and 24) are capacitors 502 with losses that contribute to real power loss and heating of the actuator. The use of hard low dielectric loss piezoelectric materials creates a high Q circuit and generates high voltage across the piezoelectric plate 502 with a relatively small input voltage and current.

When a resonant circuit 500 has a Vin of a square wave 504 (instead of a sine wave), the frequency content of Vin can be evaluated using a Fourier transform. A square wave 504 at the resonant frequency $\omega_r$ is comprised of a fundamental term and subsequent harmonics as shown in the following equation.

$$\text{Amplitude}=4/\pi[\sin(\omega_r t)+\tfrac{1}{3}\sin(3\omega_r t)+\tfrac{1}{5}\sin(5\omega_r t)+\tfrac{1}{7}\sin(7\omega_r t)\ldots]$$

For high Q resonant circuits 500 the fundamental term is sufficient. The fundamental term has a $4/\pi$ increase in peak amplitude when compared with a sine wave input as shown in the equation below where Vin is the peak to peak amplitude of the input square wave 504 and $\sin(\omega_r t)$ is equal to one.

$$V\text{out}=V_{IN}Q4/\pi$$

The effect can be thought of as a notch filter at the resonant frequency $\omega_r$ with the gain Q. This enables the use of digital pulse width modulated (PWM) control of the resonant circuit 500.

Figure 83:
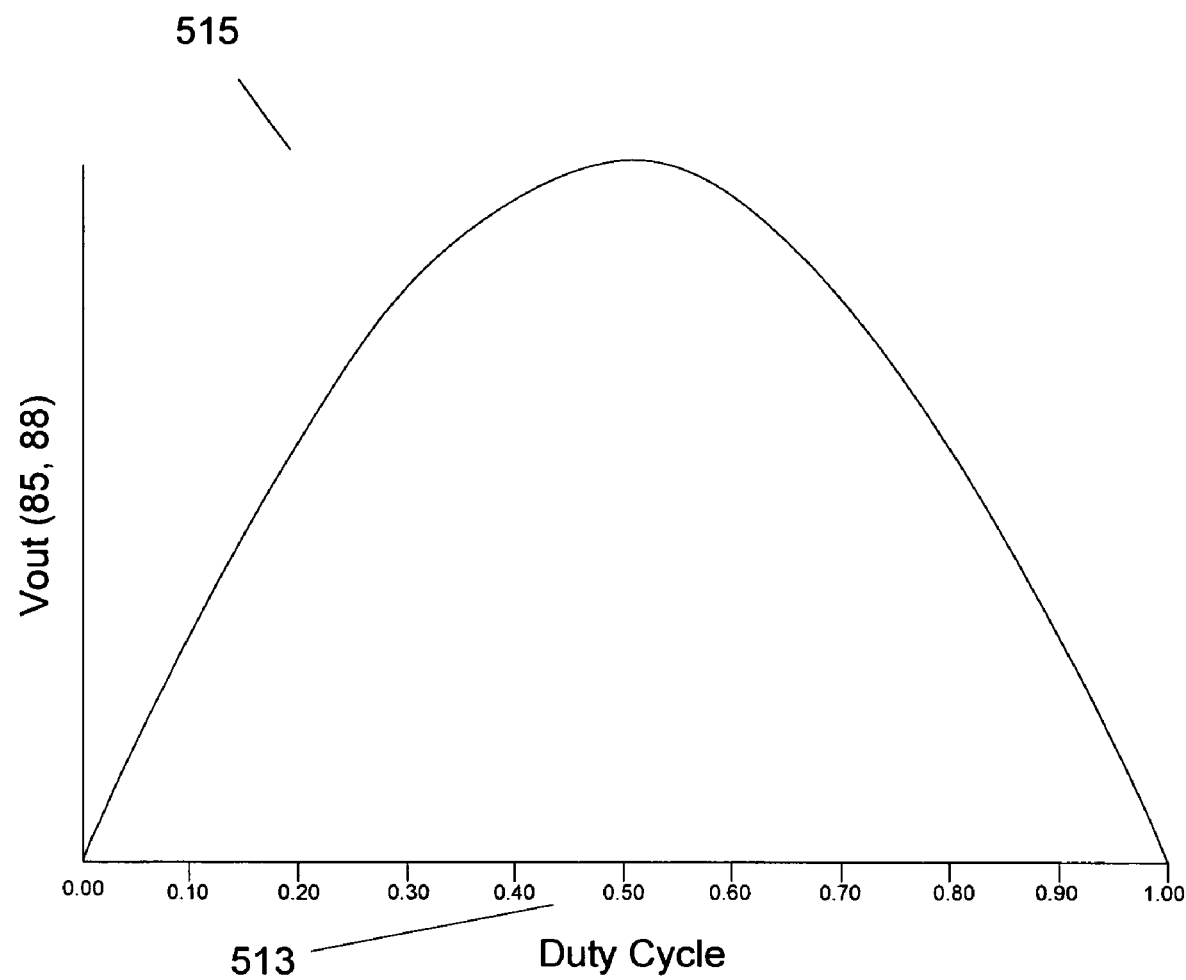

Referring to FIGS. 82 and 83. The duration 511 of duty cycle 513 of a square wave 504 is the time interval within the period 512 of the square wave 504 that the signal is high. The duty cycle 513 is the value of 511 divided by 512. By varying the duty cycle 513 of the square wave (or PWM) input at the resonant frequency $\omega_r$, the peak to peak amplitude Vout 86, 88 is adjusted. The relationship 515 between Vout 86,88 and the duty cycle 513 is approximated by the formula below as the duty cycle ranges from 0 to the full period and shown in FIG. 83.

$$V\text{out}=V_{IN}Q4/\pi\sin(\text{DutyCycle }\pi)$$

Figure 84:
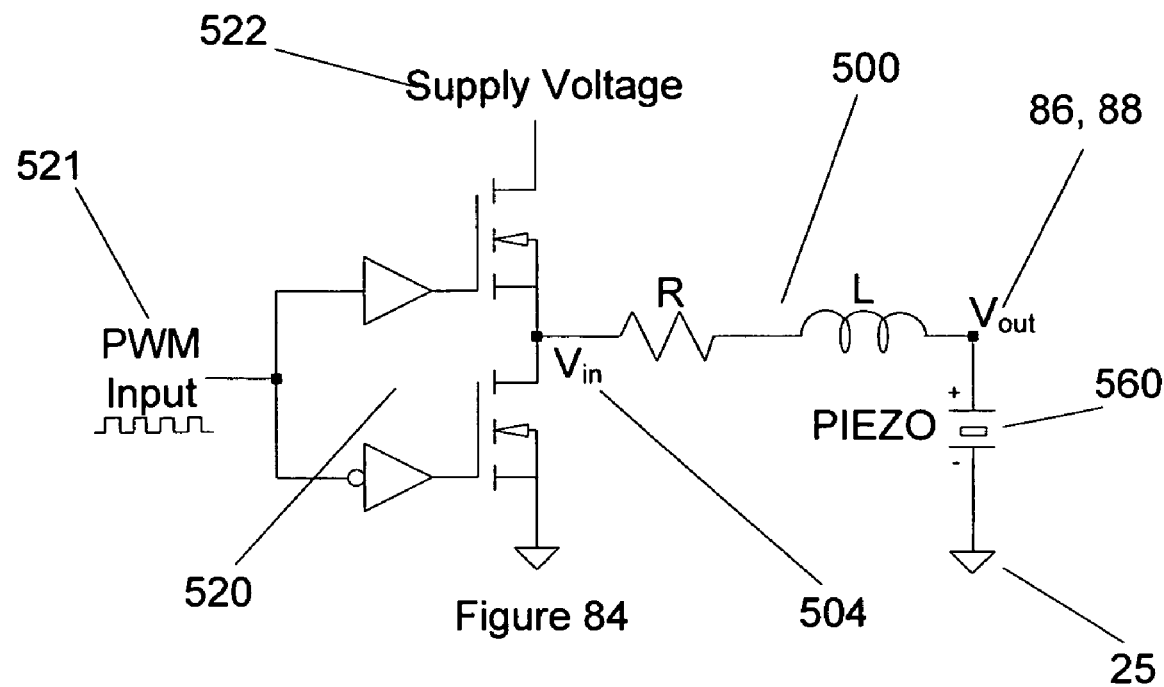

Referring to FIG. 84 an embodiment of a half bridge drive circuit 520 is illustrated. Such circuits 520 are commercially available such as the part number IXDN404 from IXYS Corporation. The low voltage PWM Input 521 is amplified by the half bridge circuit 520 to produce input voltage Vin. Circuit 520 is used to drive resonant circuit 500 and efficiently produce high voltage sine wave 86, 88 at high power levels.

Figure 85:
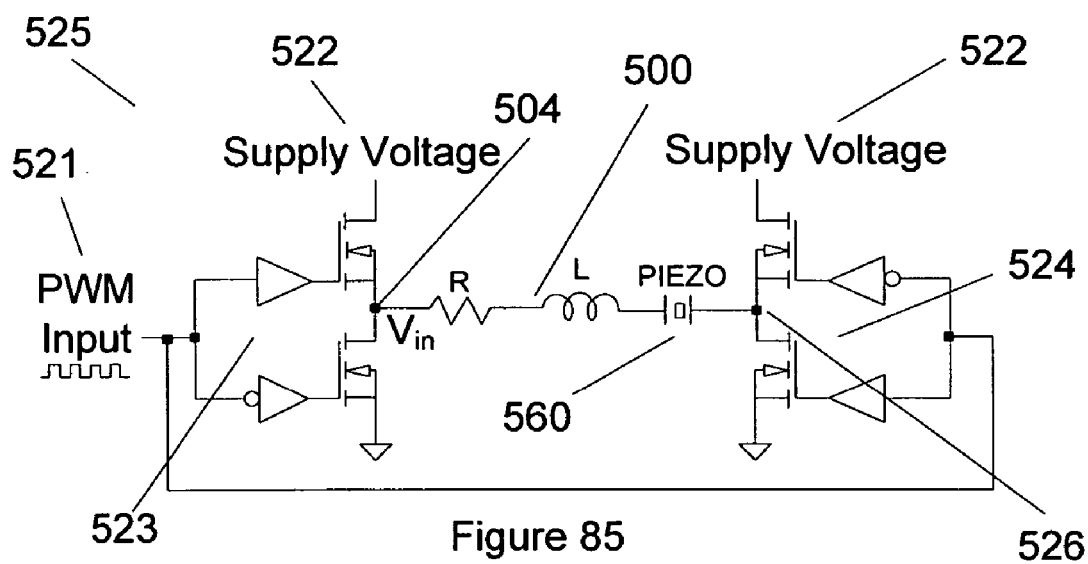

Referring to FIG. 85 an alternative embodiment of a full bridge circuit is shown that uses two half bridge circuits 520. The first half bridge circuit 523 is connected to resonant circuit 500 in the same manner as shown in FIG. 84. The second half bridge circuit 524 is connected to point 526 and is no longer a common ground 25. Both half bridge circuits 523, 524 use the same PWM input 521 but the input signal is inverted in 524 to create 180 degree phase shift. The full bridge drive 525 doubles Vout 86, 88 for the same supply voltage 522.

Figure 86:
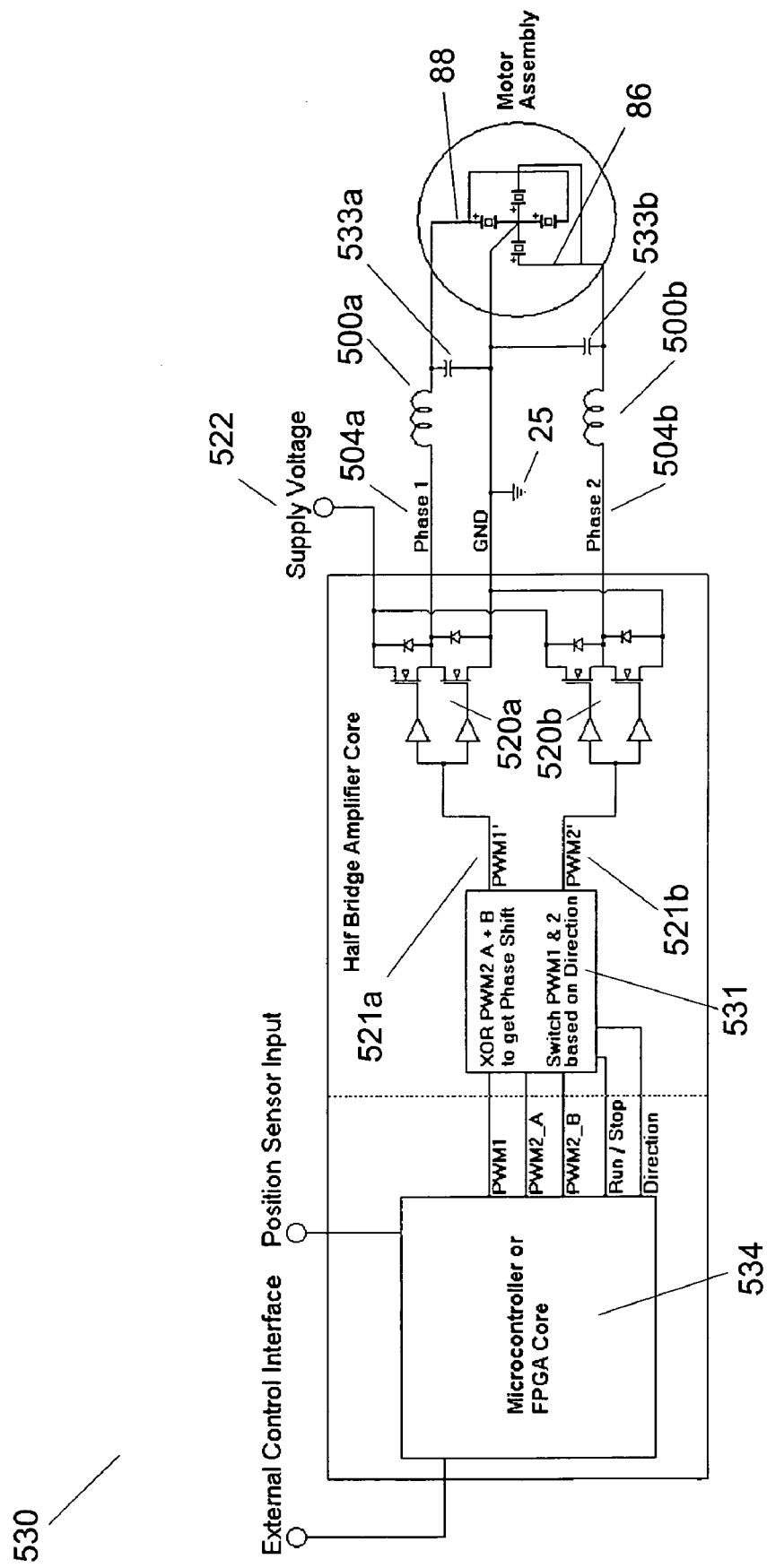
Figure 87:
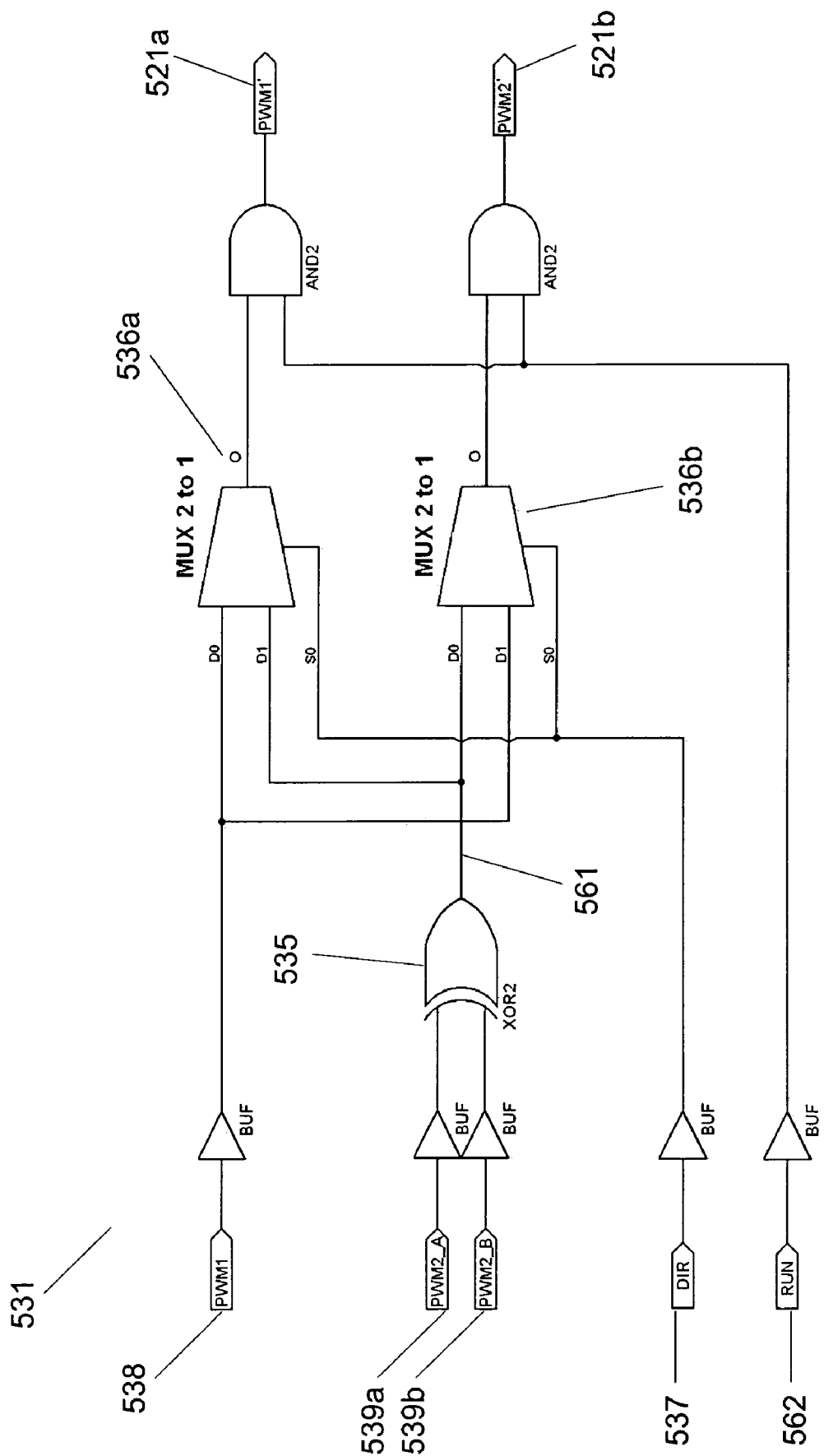

Referring to FIGS. 86, 87 and 88 a complete drive circuit for motors 10, 30, 50, 142, 154, 230 and 300 is illustrated. Two drive voltages 86 and 88 are required with positive or negative 90 degree phase shift 92 (See FIG. 19) at the motor and circuit resonant frequency $\omega_r$ that typically range from 40,000 to 200,000 cycles per second.

The combined circuit 534 and 531 generate two PWM input signals 521a and 521b with 90 degree phase shift. Forward and reverse directions are controlled by changing which signal leads. Speed is controlled by varying the duty cycle 513 of the two input PWM waveforms 521a and 521b from zero to 0.5. In this preferred embodiment both signals 521a and 521b should be set to the same duty cycle 513.

Microcontrollers 534 such as the dsPIC30F3010 manufactured by Microchip or the like create PWM waveforms. In this example the microcontroller 534 can not phase shift one PWM signal with respect to another. To overcome this limitation circuit 531 combines PWM signals 539a and 539b. The details of circuit 531 are shown in FIG. 87.

Referring to FIG. 87 and circuit 531, three PWM signals 538, 539a and 539b are in phase. PWM signals 539a and 539b are combined using an Exclusive Or (XOR) gate 535. The output 561 of the XOR gate 535 is high if either of inputs 539a or 539b are high but not both. Otherwise the output 562 of 535 is low.

The duty cycle of PWM input 539a equals the desire duty cycle plus 0.25. (Which corresponds to 90 degree phase shift.) The duty cycle of PWM input 539b is fixed at 0.25. The XOR gate 535 combines the signals 539a and 539b to create a phase shifted PWM signal 561.

Multiplexers 536a and 536b pass one of two input signals depending on the direction signal 537. In this disclosure the descriptions for direction of "forward" and "backward" are arbitrary When circuit 530 is operating in the forward direction, direction logic signal 537 and run logic signal 562 are high. PWM input 538 passes through multiplexer 536a to become signal 521a and PWM input 561 passes through multiplexer 536b to become signal 521b. Graph 540a in FIG. 88 illustrates forward direction PWM signals 521a and 521b for maximum duty cycle 513.

When circuit 530 is operating in the reverse direction, direction logic signal 537 is low and run logic signal 562 is high. PWM input 538 passes through multiplexer 536b to become signal 521b and PWM input 561 passes through multiplexer 536a to become signal 521a. Graph 540b in FIG. 88 illustrates reverse direction PWM signals 521a and 521b for maximum duty cycle 513.

Signals 521a and 521b are always low when run logic signal 562 is low.

A further circuit embodiment, shown in FIG. 86, is the addition of padding capacitors 533 placed in parallel with the motor piezoelectric actuators. (For example see the piezoelectric plates 18, 20, 22 and 24 shown in FIG. 4.) The padding capacitors 533a and 533b increase the total capacitance of resonant circuits 500a and 500b. The padding capacitors are preferably high quality components with dissipation factor less than two percent and maintain stable capacitance over a wide temperature and voltage range. In the preferred embodiment the ratio of the padding capacitances 533a and 533b to the piezoelectric capacitance 560 is approximately 2:1. The padding capacitor 533 stabilize the total capacitance 502 which stabilizes the resonant frequency $\omega_r$ and the Q of resonant circuit 500 over a wider operation temperature and power level. An additional feature of using padding capacitors 533a and 533b with the motor assembly is that padding capacitance values may be selected for each motor assembly to compensate for small variations in piezoelectric capacitance and maintain a constant total capacitance which makes each motor assembly interchangeable with standard drive electronics with a fixed inductor values.

Figure 90:
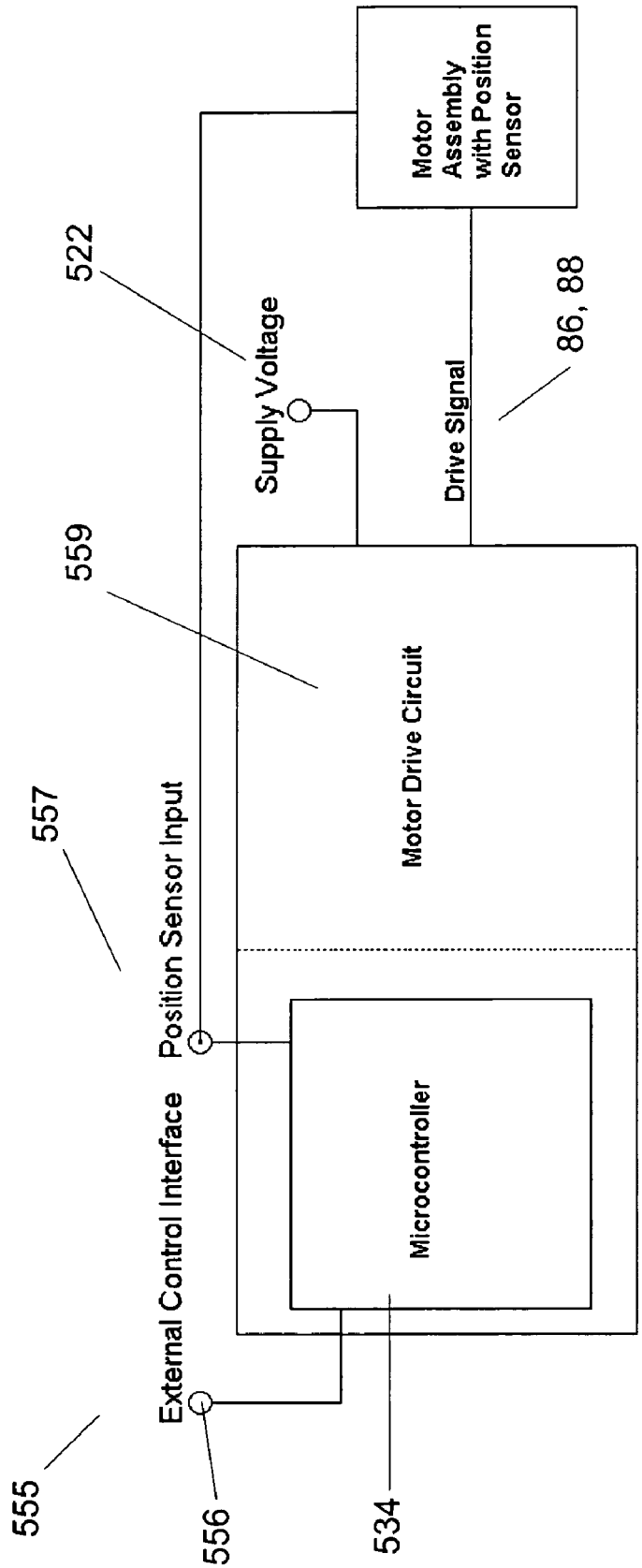

Referring to FIGS. 89 and 90, two control methods for motors 10, 30, 50, 142, 154, 230 and 300 are illustrated. One method is burst control mode the other is amplitude control mode.

For "burst" mode operation the duty cycle 513 is fixed for signals 521a and 521b which fixes the output drive voltages 86 and 88. The motor is turned on and off using run logic signal 562 as shown in FIG. 89a. The motor logic signal 562 is turned on for an ON duration 546 within an interval 547. The interval 547 is comprised of ON duration 546 and OFF duration 604 such that the sum of the ON and OFF duration is equal to the interval 547. In the embodiment depicted in FIG. 89a, each ON duration 546 of square wave 504 is comprised of a plurality of voltage peaks 608. The interval 547 is substantially constant from one plurality of voltage peaks to the next. The ratio of ON duration 546 to the interval 547 varies from about 0 to about 1. In another embodiment, the aforementioned ratio varies from about 0.01 to about 0.5. Individual bursts 546 can also be commanded to produce small steps. In this embodiment the typical interval used is 10 milliseconds and the typical range of duration is 100 microseconds to full time interval 547. Continuous operation of burst mode square wave 504 produces a constant velocity of the motor shaft and changing the duration 546 changes the velocity. Burst mode operation enables high resolution position control without a separate position sensor or a high bandwidth control loop.

For "amplitude" mode operation the duty cycle 513 is adjusted from zero to 0.5 to change the drive voltage amplitudes 86 and 88 which changes the motor velocity. One of the PWM input signals 521a or 521b is shown in FIG. 89b as square wave 504. In amplitude mode, only the duty cycle 513 of the PWM signals are changed. As illustrated in FIG. 89b, voltage peak 600 has a different duty cycle than voltage peak 602. Amplitude mode is generally desired for closed-loop applications where the microcontroller 534 is receiving position feedback 557 (See FIG. 90) because this mode can provide smoother motion, greater precision and minimal overshoot.

Referring to FIG. 90, a commonly used feedback algorithm by those skilled in the art is the proportional/integral/derivative (PID) control loop (For example see U.S. Pat. No. 6,308,113). In this embodiment of a control loop for motors 10, 30, 50, 142, 154, 230 and 300 a variety of position sensors 557 may be used including incremental glass-scale encoders, potentiometers, Hall-effect magnetic sensors, and the like.

Motion commands are fed into the microcontroller 534 through external control interface 556 (e.g. I²C, SPI, RS-232, USB, Ethernet, and the like). Motion commands may include move to absolute position, move distance, move until commanded to stop and stop. Motion commands may also include set acceleration and velocity.

At regular intervals (e.g. every 250 microseconds) the software in the microcontroller 534 queries the motor's current position from the position sensor 557 and calculates the SetPoint (or required position at that point in time) of the motor. Determination of the required position is based on the initial position, how long ago the motor was commanded to move as well as the commanded acceleration, velocity and destination position. The position error is this SetPoint minus the current position as reported by the position sensor. The appropriate output drive amplitude is then calculated in the following manner based on the position error.

Error=SetPoint−CurrentPosition
ErrorChange=Error−LastError
ErrorSum=ErrorSum+Error
LastError=Error
Amplitude=KP*Error+KD*ErrorChange+KI*ErrorSum Where: Amplitude is the required output drive amplitude
 KP is the proportional coefficient
 KD is the differential coefficient
 KI is the integral coefficient The KP, KD and KI coefficients are constants that are calibrated according to the load of the motor and the resolution (counts/unit distance) of the position feedback mechanism 557.

The invention having been fully described, it will be apparent to those skilled in the art that many changes and modifications may be made thereto without departing from the spirit and scope of the appended claims.

We claim:

1. An apparatus comprising a threaded nut with an axis of rotation and, engaged therewith, a threaded shaft with an axial direction and a length, and a vibration system that subjects said threaded nut to ultrasonic vibrations and thereby causing said threaded shaft to rotate and said threaded nut to translate in said axial direction over a portion of said length of said threaded shaft, the vibration system comprising two or more pairs of substantially opposing members, wherein each of the pairs alternatively has one of the substantially opposing members causes one portion of the threaded nut to contact the threaded shaft while the other one of the substantially opposing members causes another portion of the threaded nut to have clearance from the threaded shaft.

2. The apparatus as recited in claim 1, wherein said rotation of said threaded shaft occurs through at least 360 degrees.

3. The apparatus as recited in claim 1, wherein said translation in said axial direction occurs over a distance greater than the amplitude of any single amplitude of said ultrasonic vibration.

4. The apparatus as recited in claim 3, wherein a load is connected to said threaded nut.

5. The apparatus as recited in claim 4, wherein said threaded nut has a nodal point with a first vibration resonance and said load is connected to said threaded nut at said nodal point.

6. The apparatus as recited in claim 5, wherein said threaded nut is comprised of a threaded region which engages said threaded shaft and an oversized region, which does not engage said threaded shaft.

7. The apparatus as recited in claim 6, wherein said oversized region is located at said nodal point.

8. The apparatus as recited in claim 5, wherein said load is comprised of a printed circuit board.

9. The apparatus as recited in claim 8, wherein said printed circuit board is coupled to the vibration system.

10. The apparatus as recited in claim 9, wherein said pairs of substantially opposing members comprise a first pair of piezoelectric plates for generating ultrasonic vibrations in a first direction, and a second pair of piezoelectric plates for generating ultrasonic vibrations in a second direction.

11. The apparatus as recited in claim 10, wherein said first direction and said second direction are orthogonal.

12. The apparatus as recited in claim 8, wherein said load is further comprised of a lens selected from the group consisting of an optical focusing lens and an optical zoom lens.

13. The apparatus as recited in claim 3, further comprising an ultrasound generator for generating said ultrasonic vibrations.

14. The apparatus as recited in claim 13, wherein said ultrasound generator is further comprised of a microcontroller for generating a first pulse width modulated signal and a second pulse width modulated signal.

15. The apparatus as recited in claim 14, further comprising a position sensor for sensing the position of said threaded nut along said length and an electrical connection between said position sensor and said microcontroller for communicating said position of said threaded nut to said microcontroller.

16. The apparatus as recited in claim 15, wherein said microcontroller alters said first and second pulse width modulated signals in response to said communication.

17. The apparatus as recited in claim 14, wherein said first pulse width modulated signal is about 90 degrees out of phase with respect to said second pulse width modulated signal.

18. The apparatus as recited in claim 14, wherein said ultrasonic generator is further comprised of a series resonance circuit with a circuit resonant frequency, wherein said first and second pulse width modulated signals are square signals and have an input frequency, and said threaded nut has a mechanical resonance frequency, and said circuit resonance frequency is substantially equal to said input frequency, and said input frequency is substantially equal to said mechanical resonant frequency.

19. The apparatus as recited in claim 18, wherein said resonant circuit includes a capacitor, said ultrasound generator is comprised of a piezoelectric plate, and said piezoelectric plate functions as said capacitor.

20. The apparatus as recited in claim 19, wherein said ultrasound generator is further comprised of a padding capacitor placed in parallel with said plezoelectric plate.

21. The apparatus as recited in claim 20, wherein said capping capacitor has a padding capacitance, and said piezoelectric plate has a piezoelectric capacitance, wherein the ratio of said padding capacitance to said piezoelectric capacitance is about 2.

22. The apparatus as recited in claim 19, wherein said first and second pulse width modulated signals are transformed from square signals to first and second sinusoidal signals by said resonance circuit.

23. The apparatus as recited in claim 22, further comprising a voltage amplifier such that said first and second pulsed width modulated signals have a first voltage, and said first and second sinusoidal signals have a second voltage, and said second voltage is greater than said first voltage.

24. The apparatus as recited in claim 14, wherein, when said first pulsed width modulated signal precedes said second pulsed width modulated signal, said threaded nut translates in said axial direction toward a first end of said threaded shaft, and, when said second pulsed width modulated signal precedes said first pulsed width modulated signal, said threaded nut translates in said axial direction away from said first end of said threaded shaft.

25. The apparatus as recited in claim 14, wherein said first and second pulse width modulated signals are comprised of a first voltage peak and a second voltage peak, wherein said first voltage peak has a different duty cycle than said second voltage peak.

26. The apparatus as recited in claim 14, wherein said first and second pulse width modulated signals are operating at a constant duty cycle, said first and second pulse width modulated signals are comprised of a plurality of voltage peaks and said plurality of voltage peaks are turned on for an on duration and off for an off duration and sum of the said on duration and the said off duration equals the interval, where said interval is substantially constant and the ratio of the said on duration divided by the said interval is varied between zero and one.

27. The apparatus as recited in claim 19, where in said first pulse width modulated signal has a duty cycle of from about 0 to about 0.5.

28. The apparatus as recited in claim 22, wherein said first and second sinusoidal signals have an amplitude and the velocity of said threaded nut translating over said length is controlled by said amplitude.

29. An apparatus for driving a threaded shaft assembly comprised of
  (a) an optical focusing assembly comprised of a first threaded nut with a first axis of rotation and, engaged therewith, a first threaded shaft with a first axial direction and a length, said focusing assembly is comprised of means for subjecting said first threaded nut to ultrasonic vibrations and thereby causing said first threaded shaft to rotate and said first threaded nut to translate in said first axial direction over a portion of said length of said first threaded shaft, said focusing assembly is connected to said first threaded nut,
  (b) an optical zoom assembly comprised of a second threaded nut with a second axis of rotation and, engaged therewith, a second threaded shaft with a second axial direction and a length, said zoom assembly is comprised of means for subjecting said second threaded nut to ultrasonic vibrations and thereby causing said second threaded shaft to rotate and said second threaded nut to translate in said second axial direction over a portion of said length of said second threaded shaft, said zoom assembly is connected to said second threaded nut.

30. The apparatus as recited in claim 29, wherein said first threaded nut is connected to said optical focusing assembly through a first printed circuit board and said second threaded nut is connected to said optical zoom assembly through a second printed circuit board.

31. The apparatus as recited in claim 30, wherein said first printed circuit board and said second printed circuit board are connected to a means for generating said ultrasonic vibration.

32. The apparatus as recited in claim 31, wherein said optical focusing assembly is comprised of a focusing lens and said optical zoom assembly is comprised of a zooming lens, said focusing lens and said zooming lens are configured such that an optical axis passes through both lenses.

33. The apparatus as recited in claim 32, wherein said optical focusing assembly is comprised of a first linear guide and said optical zoom assembly is comprised of a second linear guide, and said first and second linear guide are parallel to said optical axis.

34. The apparatus as recited in claim 33, wherein said first linear guide, said second linear guide, said first axis of rotation and said second axis of rotation are all coplanar.

35. The apparatus as recited in claim 32, wherein said first threaded shaft is in line with said second threaded shaft.

36. The apparatus as recited in claim 35, further comprising a spring, wherein said first threaded shaft and said second threaded shaft are disposed within and are coaxial with said spring, said spring being connected to said first printed circuit board and said second printed circuit board such that a force is applied to each circuit board.

37. The apparatus as recited in claim 36, wherein the translation of said first threaded nut in said first axial direction causes said optical focusing assembly to translate in said first axial direction, thus adjusting said optical focusing assembly.

38. The apparatus as recited in claim 36, wherein the translation of said second threaded nut in said second axial direction causes said optical zoom assembly to translate in said second axial direction, thus adjusting said optical zoom assembly.

39. An apparatus for driving a threaded shaft assembly comprised of
   (a) an optical focusing assembly comprised of a first threaded nut with a first axis of rotation and, engaged therewith, a first threaded shaft with a first axial direction and a length, said focusing assembly is comprised of means for subjecting said first threaded nut to ultrasonic vibrations and thereby causing said first threaded shaft to rotate about said first axis and said first threaded nut to translate in said first axial direction over a portion of said length of said first threaded shaft, said focusing assembly is connected to said first threaded nut through a first printed circuit board, wherein said translation in said axial direction occurs over a distance greater than the amplitude of any single amplitude of said ultrasonic vibration;
   (b) an optical zoom assembly comprised of a second threaded nut with a second axis of rotation and, engaged therewith, a second threaded shaft with a second axial direction and a length, said focusing assembly is comprised of means for subjecting said second threaded nut to ultrasonic vibrations and thereby causing said second threaded shaft to rotate about said second axis and said second threaded nut to translate in said second axial direction over a portion of said length of said second threaded shaft, said zoom assembly is connected to said second threaded nut through a second printed circuit board, wherein said translation in said axial direction occurs over a distance greater than the amplitude of any single amplitude of said ultrasonic vibration;
   (c) wherein said first printed circuit board is comprised of a first piezoelectric plate for generating said ultrasonic vibrations in a first direction, and a second piezoelectric plate for generating said ultrasonic vibrations in a second direction, a third piezoelectric plate for generating said ultrasonic vibrations in said first direction, and a fourth piezoelectric plate for generating said ultrasonic vibrations in said second direction, wherein said first direction and said second direction are orthogonal.

40. The apparatus as recited in claim 39, wherein said first printed circuit board and said second printed circuit board are rigid printed circuit boards.

41. The apparatus as recited in claim 39, wherein said first printed circuit board and said second printed circuit board are flexible printed circuit boards.

42. The apparatus as recited in claim 39, wherein said first printed circuit board and said second printed circuit board are comprised of a layer of insulating material.

43. The apparatus as recited in claim 42, wherein said layer of insulting material is comprised of an insulator selected from the group consisting of glass-epoxy, ceramic, polytetrafluoroethylene, and combinations thereof.

44. The apparatus as recited in claim 39, wherein said apparatus is disposed within a camera.

45. The apparatus as recited in claim 44, wherein said camera is disposed within a device selected from the group consisting of a mobile phone, a wireless phone, and a personal digital assistant.

\* \* \* \* \*